(12) United States Patent  (10) Patent No.: US 9,152,725 B2
Wong et al.  (45) Date of Patent: Oct. 6, 2015

(54) COMPUTER IMPLEMENTED METHODS AND APPARATUS FOR CONFIGURING AND PERFORMING A CUSTOM RULE TO PROCESS A PREFERENCE INDICATION

(75) Inventors: Matthew Wong, Castro Valley, CA (US); Kim Man Chan, Palo Alto, CA (US)

(73) Assignee: salesforce.com, inc., San Francisco, CA (US)

( * ) Notice: Subject to any disclaimer, the term of this patent is extended or adjusted under 35 U.S.C. 154(b) by 200 days.

(21) Appl. No.: 13/589,335

(22) Filed: Aug. 20, 2012

(65) Prior Publication Data

US 2013/0117353 A1  May 9, 2013

Related U.S. Application Data

(60) Provisional application No. 61/555,553, filed on Nov. 4, 2011.

(51) Int. Cl.
*G06F 17/30* (2006.01)
*G06Q 50/00* (2012.01)

(52) U.S. Cl.
CPC .......... *G06F 17/30867* (2013.01); *G06Q 50/01* (2013.01)

(58) Field of Classification Search
CPC .... G06Q 50/01; G06F 17/30867; G06F 15/16
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Ebrahim Golabbakhsh

(74) *Attorney, Agent, or Firm* — Weaver Austin Villeneuve & Sampson LLP

(57) ABSTRACT

Disclosed are systems, apparatus, methods and computer-readable media for processing a preference indication for a feed item of an information feed. In some implementations, a preference indication associated with a feed item is received. In some instances, it is determined whether the feed item is associated with a custom rule, where the custom rule defines one or more actions to modify information associated with feed items of designated one more content types. In some instances, one or more actions are selected to perform based on an identified content type of the feed item in response to the determination that the feed item is associated with the custom rule.

20 Claims, 27 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 * | 11/2004 | Ritchie et al. ............ 1/1 |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0172127 A1 * | 7/2009 | Srikanth et al. ............ 709/217 |
| 2009/0177744 A1 | 7/2009 | Marlow et al. |
| 2011/0116395 A1 * | 5/2011 | Tsuda ............ 370/252 |
| 2011/0153417 A1 * | 6/2011 | Bernosky ............ 705/14.49 |

(56) References Cited

U.S. PATENT DOCUMENTS

| | | | |
|---|---|---|---|
| 2011/0196923 A1* | 8/2011 | Marcucci et al. | 709/204 |
| 2011/0218958 A1 | 9/2011 | Warshavsky et al. | |
| 2011/0247051 A1 | 10/2011 | Bulumulla et al. | |
| 2011/0288935 A1* | 11/2011 | Elvekrog et al. | 705/14.53 |
| 2011/0295843 A1* | 12/2011 | Ingrassia et al. | 707/723 |
| 2012/0042218 A1 | 2/2012 | Cinarkaya et al. | |
| 2012/0066059 A1* | 3/2012 | Berger | 705/14.49 |
| 2012/0233137 A1 | 9/2012 | Jakobson et al. | |
| 2012/0283855 A1* | 11/2012 | Hoffman et al. | 700/91 |
| 2012/0290407 A1 | 11/2012 | Hubbard et al. | |
| 2012/0290609 A1* | 11/2012 | Britt | 707/769 |
| 2013/0007216 A1* | 1/2013 | Fries et al. | 709/218 |
| 2013/0061267 A1* | 3/2013 | Cansino et al. | 725/43 |
| 2013/0067496 A1* | 3/2013 | Thollot et al. | 719/318 |
| 2013/0103814 A1* | 4/2013 | Carrasco et al. | 709/223 |
| 2013/0110582 A1* | 5/2013 | Starkman | 705/7.29 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0238551 A1* | 9/2013 | Eshleman et al. | 707/602 |
| 2013/0247216 A1 | 9/2013 | Cinarkaya et al. | |
| 2013/0254814 A1* | 9/2013 | Diaz Perez | 725/93 |
| 2014/0359537 A1 | 12/2014 | Jakobson et al. | |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |

* cited by examiner

Event History Table 910

| Event ID 911 | Object ID 912 | Created by ID 913 |
|---|---|---|
| E1 | O615 | U5 |
| E2 | O489 | U101 |

Comment Table 930

| Event ID 931 | Comment 932 | Time/Date 933 |
|---|---|---|
| E37 | " " | 10-21-2010 5:32 PM |
| E37 | " " | 9-17-2010 |

Field Change Table 920

| Event ID 921 | Old value 922 | New value 923 |
|---|---|---|
| E37 | 300 | 400 |
| E37 | 4.23 | 4.10 |

Post Table 950

| Event ID 951 | Post Text 952 | Time/Date 953 |
|---|---|---|
| E69 | " " | 10-11-2010 4:12 PM |
| E90 | " " | 8-12-2010 |

User Subscription Table 940

| User ID 941 | Object ID 942 |
|---|---|
| U819 | O615 |
| U819 | O489 |
| U719 | O615 |

News Feed Table 960

| User ID 961 | Event ID 962 |
|---|---|
| U819 | E37 |
| U819 | E90 |
| U719 | E37 |

*FIG. 9A*

Jason Chan

Album: Thriller — 2304

By: Michael Jackson

2302 —  Comment    Share

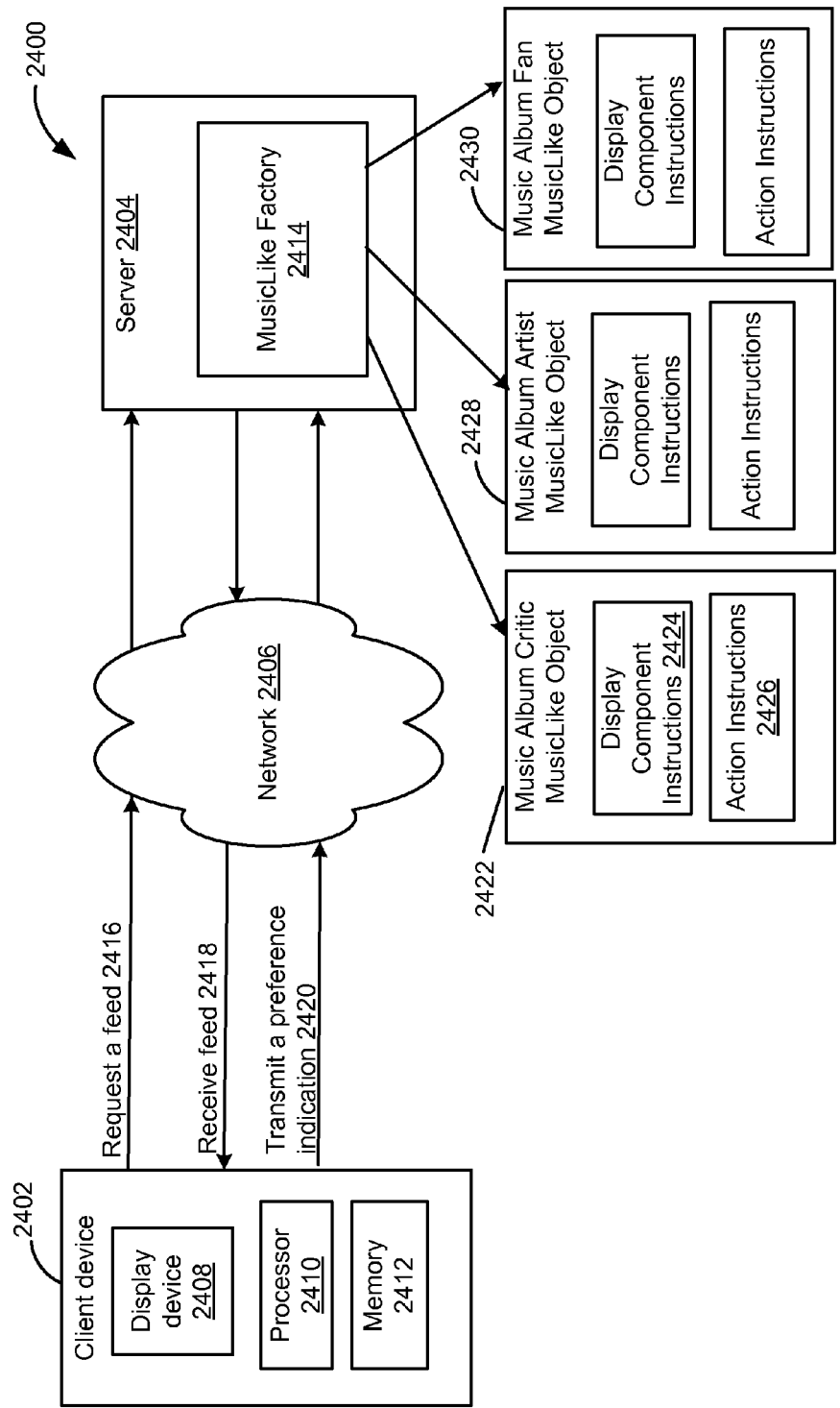

COMPUTER IMPLEMENTED METHODS AND APPARATUS FOR CONFIGURING AND PERFORMING A CUSTOM RULE TO PROCESS A PREFERENCE INDICATION

PRIORITY AND RELATED APPLICATION DATA

This application claims priority to and commonly assigned U.S. Provisional patent application Ser. No. 61/555,553, titled "Method for creating Customized Secondments in a Social Network Environment", by Wong et al., filed on Nov. 4, 2011, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This patent document relates generally to providing on-demand services in an online social network using a database system and, more specifically, to techniques for configuring and performing a preference indication in the online social network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and operations for the disclosed inventive systems, apparatus, and methods for configuring and performing a custom rule to process a preference indication. These drawings in no way limit any changes in form and detail that may be made by one skilled in the art without departing from the spirit and scope of the disclosed implementations.

FIG. 7 shows an example of a group feed on a group page according to some implementations.

FIG. 8 shows an example of a record feed containing a feed tracked update, post, and comments according to some implementations.

FIG. 9A shows an example of a plurality of tables that may be used in tracking events and creating feeds according to some implementations.

FIG. 24 provides an illustration of a custom rule stored as a computer program factory object to process a preference indication, according to some implementations.

DETAILED DESCRIPTION

Figure 1A:
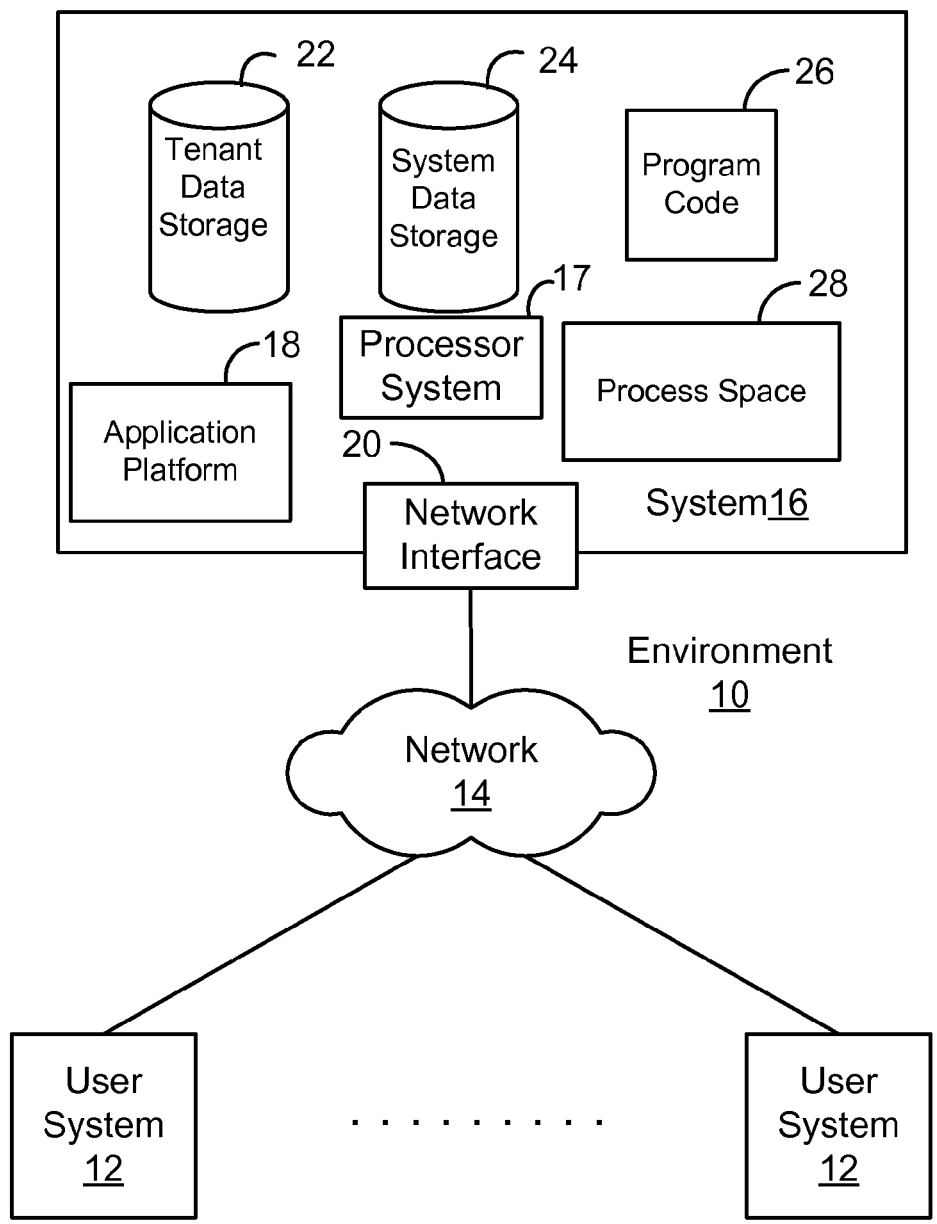
FIG. 1A shows a block diagram of an example of an environment 10 in which an on-demand database service can be used in accordance with some implementations.

Examples of systems, apparatus, and methods according to the disclosed implementations are described in this section. These examples are being provided solely to add context and aid in the understanding of the disclosed implementations. It will thus be apparent to one skilled in the art that implementations may be practiced without some or all of these specific details. In other instances, certain process/method operations, also referred to herein as "blocks," have not been described in detail in order to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various implementations described or referenced herein are directed to different methods, apparatus, systems, and computer-readable storage media for configuring and performing custom rules on an online social network, also referred to herein as a social networking system. One example of an online social network is Chatter®, provided by salesforce.com, inc. of San Francisco, Calif. Online social networks are increasingly becoming a common way to facilitate communication among people and groups of people, any of whom can be recognized as users of a social networking system. Some online social networks can be implemented in various settings, including organizations, e.g., enterprises such as companies or business partnerships, academic institutions, or groups within such an organization. For instance, Chatter® can be used by employee users in a division of a business organization to share data, communicate, and collaborate with each other for various purposes.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to the group feed in accordance with a permissions configuration for the news feed and the group. Information updates in a group context can also include changes to group status information. In some implementations, when data such as posts or comments input from one or more users are submitted to an information feed for a particular user, group, object, or other construct within an online social network, an e-mail notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

Some implementations of the disclosed systems, apparatus, and methods provide a mechanism to configure and perform custom rules to process a preference indication, such as a "like" or a "dislike." A preference indication generally represents that a user likes or supports the content of a feed item. For instance, when a user, Brenda, indicates that she "likes" a feed item including information about Meow cat food, the system performs operations to record that Brenda "likes" Meow cat food, such as updating a database record associated with the feed item. The system may further update the feed item to include a message: "You like this" and/or increment the number of users who like Meow cat food. However, some conventional social networking systems do not provide additional processing of Brenda's preference indication. For example, conventional systems do not assess whether Brenda is a veterinarian. As such, her endorsement of cat food may be of greater importance compared to a user who is a cat owner. In other words, one of the shortcomings of conventional social networking systems is that there are no mechanisms to customize how a preference indication is processed based on the content of a feed item and/or information associated with an entity, such as a user submitting the preference indication, a group and/or a record.

Some of the disclosed implementations are directed to configuring and performing custom rules to process a preference indication. As described in the examples herein, a preference indication may be a "like," "dislike" or any other indication that an entity endorses information associated with a feed item. In some implementations, a custom rule may be configured and performed to process a preference indication based on a content type of a feed item. The content type may be a defined category of information that triggers the custom rule to perform one or more actions in response to receiving a preference indication for a feed item. For example, a content type may be specified as any feed item that is a comment, record update, or other type of information update. In another example, the content type may be designated as any defined category of information such as music, movies, a data object, information about a project, information about a product or service, information about an organization or a feed item including specific keywords. The content type may be designated by a user or automatically identified according to various parameters by custom computer programming language code.

In some implementations, custom rules may be configured and performed to process a preference indication based on information associated with an entity. An entity may be a user, a group, a record, or other construct in the online social network, as described in the examples herein. For example, a custom rule may be configured to perform different actions based on whether a preference indication is received from a user, a group or a record.

In another example, a custom rule may be configured to perform different actions to process a preference indication based on an entity's profile information. For instance, a custom rule is configured to process a preference indication based on a user's role in a corporate organization. If a user is a Director of a sales team at ABC Corporation and "likes" a feed item including information about a recent purchase order, the system may perform one or more actions to process the user's "like" based on the custom rule. In this example, the custom rule may be configured to create a record for the new purchase order and send a communication (e.g., an email, an information update on a feed, a text message, an automated phone call, a tweet) to the members of the sales team that the Director "liked" the purchase order. A custom rule may designate various types of entity information. The entity information may be designated by a user, defined by custom computer programming language code, or created by the system.

In some implementations, custom rules may be configured and performed to process a preference indication based on various combinations of information. For example, a custom rule may be configured to process a preference indication based on a content type of a feed item and based on information associated with an entity.

In some implementations, one or more actions may be performed when a preference indication is detected. The action may include modifying a feed item, creating a feed item, creating or altering a data object, removing a data object, sending a message, or performing any other action capable of being performed by the system.

In some implementations, the one or more actions may be configured to modify information associated with one or more related feed items. Various relevance measures may be applied to determine whether one or more feed items are related. For instance, it may be determined whether the content type of one or more feed items is the same as the content type of the feed item that received a preference indication. If the content type is the same, the one or more feed items are determined to be related and a preference indication is associated with the one or more related feed items.

In an illustrative example, a MusicLike custom rule is configured to process feed items that include content about music albums. For instance, when Chet indicates that he "likes" Michael Jackson's Thriller album, the system compares the content of the feed item and determines that a music album is a content type that is associated with the MusicLike rule. Then, the system performs the one or more actions designated by the MusicLike rule. In this example, the system determines whether other feed items in an information feed or in the online social network include songs from the Thriller album, such as "Thriller," "Billie Jean" and "Beat It." If a feed item includes a song from the Thriller music album, then Chet's "like" is automatically associated with feed items including the songs "Thriller," "Billie Jean" and "Beat It." That is, each feed item including a song from the Thriller album is updated to indicate that Chet also "likes" the content included in those feed items. As such, the MusicLike rule provides a mechanism for a user to endorse one or more related feed items without requiring the user to click on each feed item, thereby saving time and streamlining the process of endorsing feed items in an information feed.

Various other relevance measures may be applied to determine whether one or more feed items are related. For example, to determine whether one or more feed items are related, it may be determined whether an entity follows the one or more feed items. In another example, it may be determined whether an entity's profile information includes information related to further feed items in an information feed. As such, many variations and combinations of relevance measures may be applied to determine whether one or more feed items are related as further described herein. Such relevance measures can be weighted and compared with numerical thresholds to determine whether one or more feed items are related. The selection of relevance measures and weights applied in association with each relevance measure may be defined by a user, defined by custom computer programming language code, or automatically generated as further described herein.

These and other implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to, magnetic media such as hard disks, floppy disks, and magnetic tape; optical media such as CD-ROM disks; magneto-optical media; and hardware devices that are specially configured to store program instructions, such as read-only memory ("ROM") devices and random access memory ("RAM") devices. These and other features of the disclosed implementations will be described in more detail below with reference to the associated drawings.

The term "multi-tenant database system" can refer to those systems in which various elements of hardware and software of a database system may be shared by one or more customers. For example, a given application server may simultaneously process requests for a great number of customers, and a given database table may store rows of data such as feed items for a potentially much greater number of customers. The term "query plan" generally refers to one or more operations used to access information in a database system.

A "user profile" or "user's profile" is generally configured to store and maintain data about a given user of the database system. The data can include general information, such as name, title, phone number, a photo, a biographical summary, and a status, e.g., text describing what the user is currently doing. As mentioned below, the data can include messages created by other users. Where there are multiple tenants, a user is typically associated with a particular tenant. For example, a user could be a salesperson of a company, which is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company.

As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "information feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different information feeds. A second user following a first user and a record can receive the feed items associated with the first user and the record for display in the second user's news feed, which is another type of information feed. In some implementations, the feed items from any number of followed users and records can be combined into a single information feed of a particular user.

As examples, a feed item can be a message, such as a user-generated post of text data, and a feed tracked update to a record or profile, such as a change to a field of the record. Feed tracked updates are described in greater detail below. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a graphical user interface (GUI), for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group. In one implementation, there is only one status for a record.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Messages and feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes any feed item about any user in the group. In some implementations, the group feed includes feed items that are about the group as a whole. In one implementation, the feed items for a group are only posts and comments.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" is a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

I. General Overview

Systems, apparatus, and methods are provided for implementing enterprise level social and business information networking. Such implementations can provide more efficient use of a database system. For instance, a user of a database system may not easily know when important information in the database has changed, e.g., about a project or client. Implementations can provide feed tracked updates about such changes and other events, thereby keeping users informed.

By way of example, a user can update a record, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed right to the manager's feed page or other page.

Next, mechanisms and methods for providing systems implementing enterprise level social and business information networking will be described with reference to several implementations. First, an overview of an example of a database system is described, and then examples of tracking events for a record, actions of a user, and messages about a user or record are described. Various implementations about the data structure of feeds, customizing feeds, user selection of records and users to follow, generating feeds, and displaying feeds are also described.

II. System Overview

FIG. 1A shows a block diagram of an example of an environment 10 in which an on-demand database service can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

Environment 10 is an environment in which an on-demand database service exists. User system 12 may be implemented as any computing device(s) or other data processing apparatus such as a machine or system that is used by a user to access a database system 16. For example, any of user systems 12 can be a handheld computing device, a mobile phone, a laptop computer, a work station, and/or a network of such computing devices. As illustrated in FIG. 1A (and in more detail in FIG. 1B) user systems 12 might interact via a network 14 with an on-demand database service, which is implemented in the example of FIG. 1A as database system 16.

An on-demand database service, implemented using system 16 by way of example, is a service that is made available to outside users, who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the "Internet" with a capital "I." The Internet will be used in many of the examples herein. However, it should be understood that the networks that the present implementations might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 1A, implements a web-based customer relationship management (CRM) system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 1B:
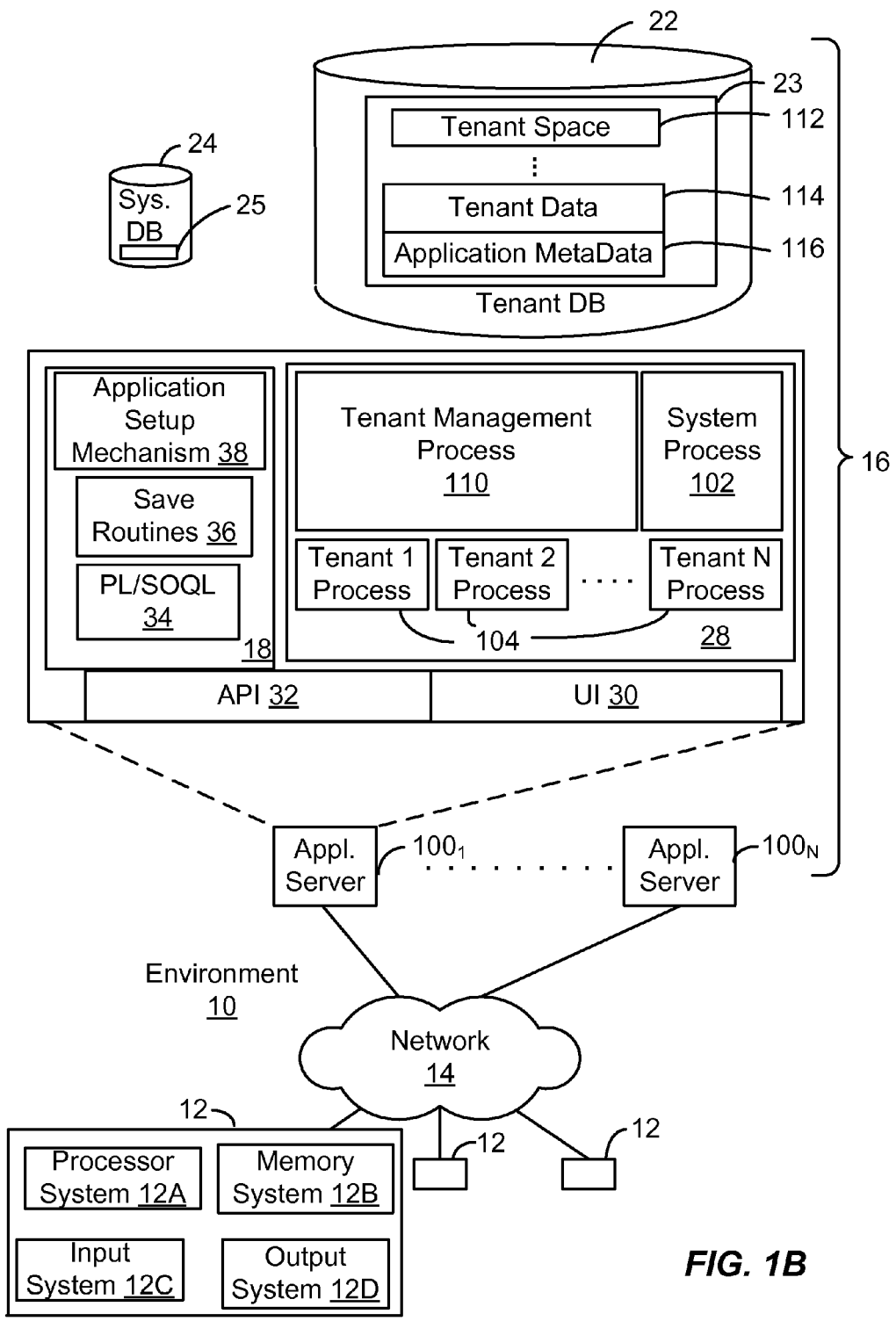
FIG. 1B shows a block diagram of an example of some implementations of elements of FIG. 1A and various possible interconnections between these elements.

One arrangement for elements of system 16 is shown in FIGS. 1A and 1B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) of the computing device in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to a computing device or system, including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 1B shows a block diagram of an example of some implementations of elements of FIG. 1A and various possible interconnections between these elements. That is, FIG. 1B also illustrates environment 10. However, in FIG. 1B elements of system 16 and various interconnections in some implementations are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 100₁-100N, system process space 102, tenant process spaces 104, tenant management process space 110, tenant storage space 112, user storage 114, and application metadata 116. In other implementations, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to communicate with tenant data storage 22 and the tenant data 23 therein, and system data storage 24 and the system data 25 therein to serve requests of user systems 12. The tenant data 23 might be divided into individual tenant storage spaces 112, which can be either a physical arrangement and/or a logical arrangement of data. Within each tenant storage space 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage space 112. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 100₁ might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain implementations, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one implementation, therefore, an interface system implementing a load balancing function (e.g., an F5 Big-IP load balancer) is communicably coupled between the application servers 100 and the user systems 12 to distribute requests to the application servers 100. In one implementation, the load balancer uses a least connections algorithm to route user requests to the application servers 100. Other examples of load balancing algorithms, such as round robin and observed response time, also can be used. For example, in certain implementations, three consecutive requests from the same user could hit three different application servers 100, and three requests from different users could hit the same application server 100. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 100 to request and update system-level and tenant-level data from system 16 that may involve sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779, 039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
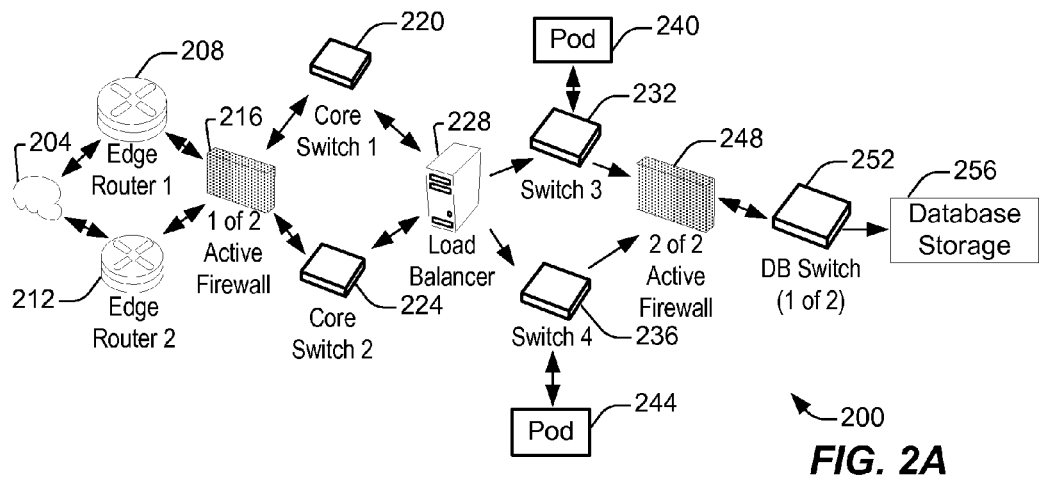
FIG. 2A shows a system diagram illustrating an example of architectural components of an on-demand database service environment 200 according to some implementations.

FIG. 2A shows a system diagram illustrating an example of architectural components of an on-demand database service environment 200 according to some implementations. A client machine located in the cloud 204, generally referring to one or more networks in combination, as described herein, may communicate with the on-demand database service environment via one or more edge routers 208 and 212. A client machine can be any of the examples of user systems 12 described above. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand database service environment may communicate with a database storage 256 via a database firewall 248 and a database switch 252.

Figure 2B:
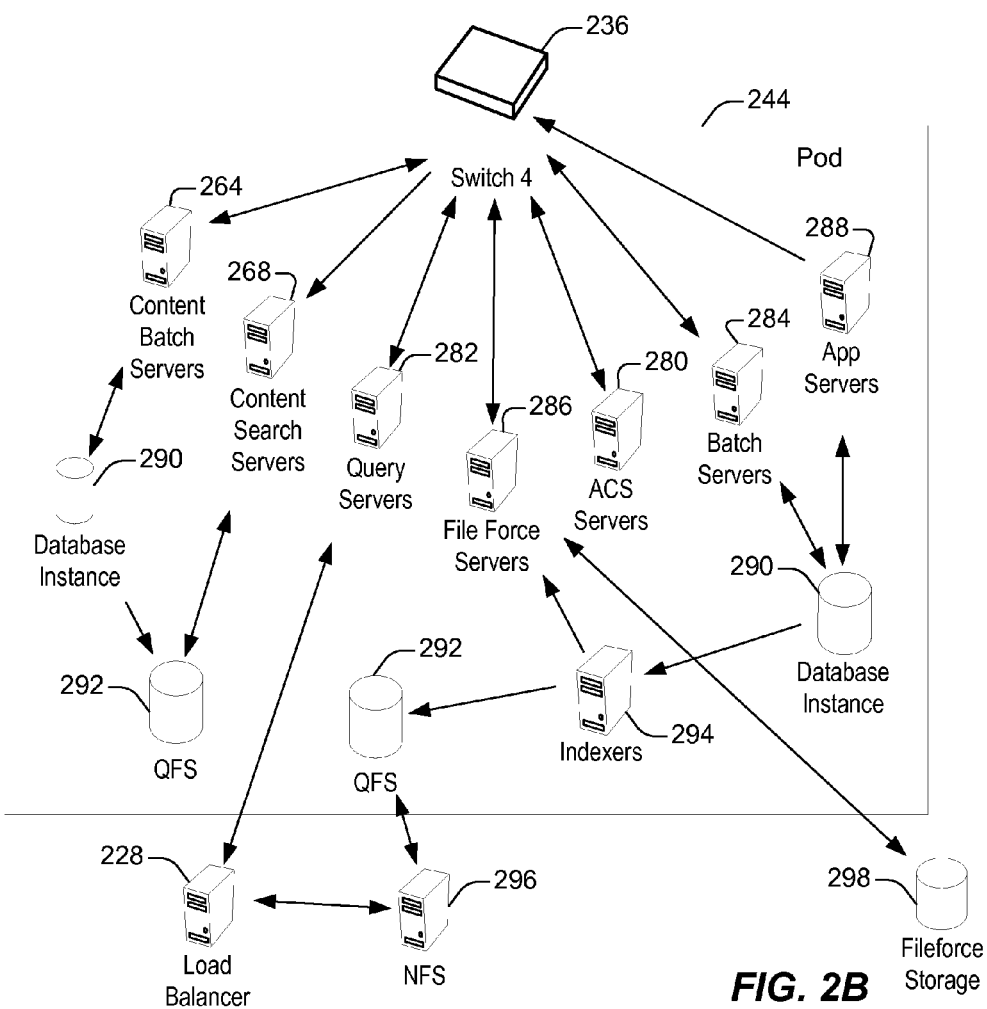
FIG. 2B shows a system diagram further illustrating an example of architectural components of an on-demand database service environment according to some implementations.

As shown in FIGS. 2A and 2B, accessing an on-demand database service environment may involve communications transmitted among a variety of different hardware and/or software components. Further, the on-demand database service environment 200 is a simplified representation of an actual on-demand database service environment. For example, while only one or two devices of each type are shown in FIGS. 2A and 2B, some implementations of an on-demand database service environment may include anywhere from one to many devices of each type. Also, the on-demand database service environment need not include each device shown in FIGS. 2A and 2B, or may include additional devices not shown in FIGS. 2A and 2B.

Moreover, one or more of the devices in the on-demand database service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand database service environment to access services provided by the on-demand database service environment. For example, client machines may access the on-demand database service environment to retrieve, store, edit, and/or process information.

In some implementations, the edge routers 208 and 212 route packets between the cloud 204 and other components of the on-demand database service environment 200. The edge routers 208 and 212 may employ the Border Gateway Protocol (BGP). The BGP is the core routing protocol of the Internet. The edge routers 208 and 212 may maintain a table of IP networks or 'prefixes', which designate network reachability among autonomous systems on the Internet.

In one or more implementations, the firewall 216 may protect the inner components of the on-demand database service environment 200 from Internet traffic. The firewall 216 may block, permit, or deny access to the inner components of the on-demand database service environment 200 based upon a set of rules and other criteria. The firewall 216 may act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 may be configured as network bridges that quickly route data between different components within the on-demand database service environment. In some implementations, the use of two or more core switches 220 and 224 may provide redundancy and/or reduced latency.

In some implementations, the pods 240 and 244 may perform the core data processing and service functions provided by the on-demand database service environment. Each pod may include various types of hardware and/or software computing resources. An example of the pod architecture is discussed in greater detail with reference to FIG. 2B.

In some implementations, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some implementations, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some implementations, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some implementations, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some implementations, communication with the database storage 256 may be conducted via the database switch 252. The multi-tenant database storage 256 may include more than one hardware and/or software components for handling database queries. Accordingly, the database switch 252 may direct database queries transmitted by other components of the on-demand database service environment (e.g., the pods 240 and 244) to the correct components within the database storage 256.

In some implementations, the database storage 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram further illustrating an example of architectural components of an on-demand database service environment according to some implementations. The pod 244 may be used to render services to a user of the on-demand database service environment 200. In some implementations, each pod may include a variety of servers and/or other systems. The pod 244 includes one or more content batch servers 264, content search servers 268, query servers 282, file force servers 286, access control system (ACS) servers 280, batch servers 284, and app servers 288. Also, the pod 244 includes database instances 290, quick file systems (QFS) 292, and indexers 294. In one or more implementations, some or all communication between the servers in the pod 244 may be transmitted via the switch 236.

In some implementations, the app servers 288 may include a hardware and/or software framework dedicated to the execution of procedures (e.g., programs, routines, scripts) for supporting the construction of applications provided by the on-demand database service environment 200 via the pod 244. In some implementations, the hardware and/or software framework of an app server 288 is configured to execute operations of the services described herein, including performance of the blocks of methods described with reference to FIGS. 15-24. In alternative implementations, two or more app servers 288 may be included and cooperate to perform such methods, or one or more other servers described herein can be configured to perform the disclosed methods.

The content batch servers 264 may handle requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand database service environment.

The file force servers 286 may manage requests for information stored in the Fileforce storage 298. The Fileforce storage 298 may store information such as documents, images, and basic large objects (BLOBs). By managing requests for information using the file force servers 286, the image footprint on the database may be reduced.

The query servers 282 may be used to retrieve information from one or more file systems. For example, the query system 282 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may call upon various hardware and/or software resources. In some implementations, the ACS servers 280 may control access to data, hardware resources, or software resources.

In some implementations, the batch servers 284 may process batch jobs, which are used to run tasks at specified times. Thus, the batch servers 284 may transmit instructions to other servers, such as the app servers 288, to trigger the batch jobs.

In some implementations, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some implementations, one or more query servers 282 may communicate with the NFS 296 to retrieve and/or update information stored outside of the pod 244. The NFS 296 may allow servers located in the pod 244 to access information to access files over a network in a manner similar to how local storage is accessed.

In some implementations, queries from the query servers 222 may be transmitted to the NFS 296 via the load balancer 228, which may distribute resource requests over various resources available in the on-demand database service environment. The NFS 296 may also communicate with the QFS 292 to update the information stored on the NFS 296 and/or to provide information to the QFS 292 for use by servers located within the pod 244.

In some implementations, the pod may include one or more database instances 290. The database instance 290 may transmit information to the QFS 292. When information is transmitted to the QFS, it may be available for use by servers within the pod 244 without using an additional database call.

In some implementations, database information may be transmitted to the indexer 294. Indexer 294 may provide an index of information available in the database 290 and/or QFS 292. The index information may be provided to file force servers 286 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update to the record. For example, a vendor may negotiate a new price with a salesperson of company X, where the salesperson is a user associated with tenant Y. As part of creating a new invoice or for accounting purposes, the salesperson can change the price saved in the database. It may be important for co-workers to know that the price has changed. The salesperson could send an e-mail to certain people, but this is onerous and the salesperson might not e-mail all of the people who need to know or want to know. Accordingly, some implementations of the disclosed techniques can inform others (e.g., co-workers) who want to know about an update to a record automatically.

Figure 3:
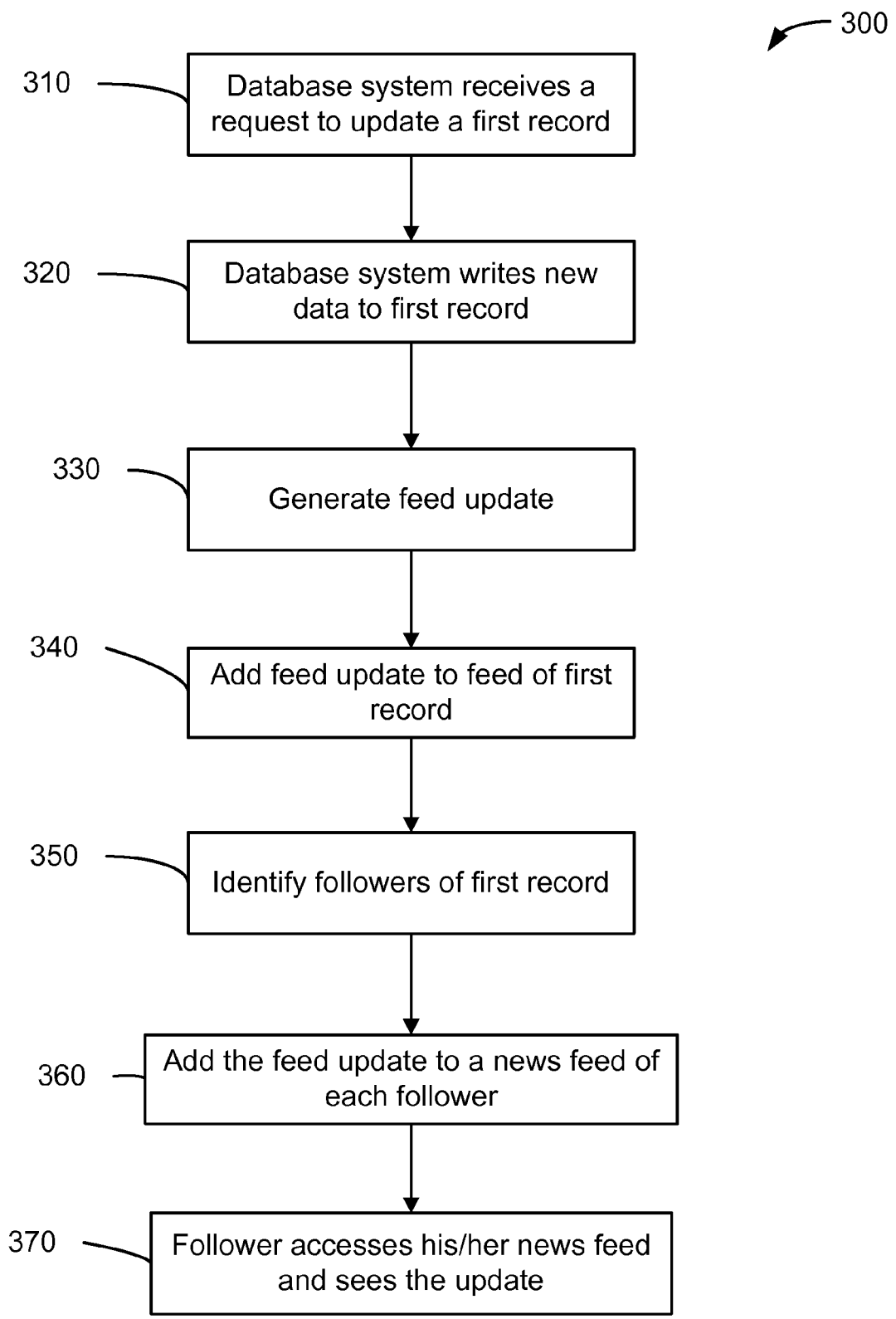
FIG. 3 shows a flowchart of an example of a method 300 for tracking updates to a record stored in a database system, performed in accordance with some implementations.

FIG. 3 shows a flowchart of an example of a method 300 for tracking updates to a record stored in a database system, performed in accordance with some implementations. Method 300 (and other methods described herein) may be implemented at least partially with multi-tenant database system 16, e.g., by one or more processors configured to receive or retrieve information, process the information, store results, and transmit the results. In other implementations, method 300 may be implemented at least partially with a single tenant database system. In various implementations, blocks may be omitted, combined, or split into additional blocks for method 300, as well as for other methods described herein.

In block 310, the database system receives a request to update a first record. In one implementation, the request is received from a first user. For example, a user may be accessing a page associated with the first record, and may change a displayed field and hit save. In another implementation, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other implementations, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type to another (e.g., converting a lead to an opportunity), closing a record (e.g., a case type record), and potentially any other state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In block 320, the database system writes new data to the first record. In one implementation, the new data may include a new value that replaces old data. For example, a field is updated with a new value. In another implementation, the new data can be a value for a field that did not contain data before. In yet another implementation, the new data could be a flag, e.g., for a status of the record, which can be stored as a field of the record.

In some implementations, a "field" can also include records, which are child objects of the first record in a parent-child hierarchy. A field can alternatively include a pointer to a child record. A child object itself can include further fields. Thus, if a field of a child object is updated with a new value, the parent record also can be considered to have a field changed. In one example, a field could be a list of related child objects, also called a related list.

In block 330, a feed tracked update is generated about the update to the record. In one implementation, the feed tracked update is created in parts for assembling later into a display version. For example, event entries can be created and tracked in a first table, and changed field entries can be tracked in another table that is cross-referenced with the first table. More specifics of such implementations are provided later, e.g., with respect to FIG. 9A. In another implementation, the feed tracked update is automatically generated by the database system. The feed tracked update can convey in words that the first record has been updated and provide details about what was updated in the record and who performed the update. In some implementations, a feed tracked update is generated for only certain types of event and/or updates associated with the first record.

In one implementation, a tenant (e.g., through an administrator) can configure the database system to create (enable) feed tracked updates only for certain types of records. For example, an administrator can specify that records of designated types such as accounts and opportunities are enabled. When an update (or other event) is received for the enabled record type, then a feed tracked update would be generated. In another implementation, a tenant can also specify the fields of a record whose changes are to be tracked, and for which feed tracked updates are created. In one aspect, a maximum number of fields can be specified for tracking, and may include custom fields. In one implementation, the type of change can also be specified, for example, that the value change of a field is to be larger than a threshold (e.g., an absolute amount or a percentage change). In yet another implementation, a tenant can specify which events are to cause a generation of a feed tracked update. Also, in one implementation, individual users can specify configurations specific to them, which can create custom feeds as described in more detail below.

In one implementation, changes to fields of a child object are not tracked to create feed tracked updates for the parent record. In another implementation, the changes to fields of a child object can be tracked to create feed tracked updates for the parent record. For example, a child object of the parent type can be specified for tracking, and certain fields of the child object can be specified for tracking. As another example, if the child object is of a type specified for tracking, then a tracked change for the child object is propagated to parent records of the child object.

In block 340, the feed tracked update is added to a feed for the first record. In one implementation, adding the feed tracked update to a feed can include adding events to a table (which may be specific to a record or be for all or a group of objects), where a display version of a feed tracked update can be generated dynamically and presented in a GUI as a feed item when a user requests a feed for the first record. In another implementation, a display version of a feed tracked update can be added when a record feed is stored and maintained for a record. As mentioned above, a feed may be maintained for only certain records. In one implementation, the feed of a record can be stored in the database associated with the record. For example, the feed can be stored as a field (e.g., as a child object) of the record. Such a field can store a pointer to the text to be displayed for the feed tracked update.

In some implementations, only the current feed tracked update (or other current feed item) may be kept or temporarily stored, e.g., in some temporary memory structure. For example, a feed tracked update for only a most recent change to any particular field is kept. In other implementations, many previous feed tracked updates may be kept in the feed. A time and/or date for each feed tracked update can be tracked. Herein, a feed of a record is also referred to as an entity feed, as a record is an instance of a particular entity object of the database.

In block 350, followers of the first record can be identified. A follower is a user following the first record, such as a subscriber to the feed of the first record. In one implementation, when a user requests a feed of a particular record, such an identification of block 350 can be omitted. In another implementation where a record feed is pushed to a user (e.g., as part of a news feed), then the user can be identified as a follower of the first record. Accordingly, this block can include the identification of records and other objects being followed by a particular user.

In one implementation, the database system can store a list of the followers for a particular record. In various implementations, the list can be stored with the first record or associated with the record using an identifier (e.g., a pointer) to retrieve the list. For example, the list can be stored in a field of the first record. In another implementation, a list of the records that a user is following is used. In one implementation, the database system can have a routine that runs for each user, where the routine polls the records in the list to determine if a new feed tracked update has been added to a feed of the record. In another implementation, the routine for the user can be running at least partially on a user device, which contacts the database to perform the polling.

In block 360, in one implementation, the feed tracked update can be stored in a table, as described in greater detail below. When the user opens a feed, an appropriate query is sent to one or more tables to retrieve updates to records, also described in greater detail below. In some implementations, the feed shows feed tracked updates in reverse chronological order. In one implementation, the feed tracked update is pushed to the feed of a user, e.g., by a routine that determines the followers for the record from a list associated with the record. In another implementation, the feed tracked update is pulled to a feed, e.g., by a user device. This pulling may occur when a user requests the feed, as occurs in block 370. Thus, these actions may occur in a different order. The creation of the feed for a pull may be a dynamic creation that identifies records being followed by the requesting user, generates the display version of relevant feed tracked updates from stored information (e.g., event and field change), and adds the feed tracked updates into the feed. A feed of feed tracked updates of records and other objects that a user is following is also generally referred to herein as a news feed, which can be a subset of a larger information feed in which other types of information updates appear, such as posts.

In yet another implementation, the feed tracked update could be sent as an e-mail to the follower, instead of in a feed. In one implementation, e-mail alerts for events can enable people to be e-mailed when certain events occur. In another implementation, e-mails can be sent when there are posts on a user profile and posts on entities to which the user subscribes. In one implementation, a user can turn on/off email alerts for all or some events. In an implementation, a user can specify what kind of feed tracked updates to receive about a record that the user is following. For example, a user can choose to only receive feed tracked updates about certain fields of a record that the user is following, and potentially about what kind of update was performed (e.g., a new value input into a specified field, or the creation of a new field).

In block 370, a follower can access his/her news feed to see the feed tracked update. In one implementation, the user has just one news feed for all of the records that the user is following. In one aspect, a user can access his/her own feed by selecting a particular tab or other object on a page of an interface to the database system. Once selected the feed can be provided as a list, e.g., with an identifier (e.g., a time) or including some or all of the text of the feed tracked update. In another implementation, the user can specify how the feed tracked updates are to be displayed and/or sent to the user. For example, a user can specify a font for the text, a location of where the feed can be selected and displayed, amount of text to be displayed, and other text or symbols to be displayed (e.g., importance flags).

Figure 4:
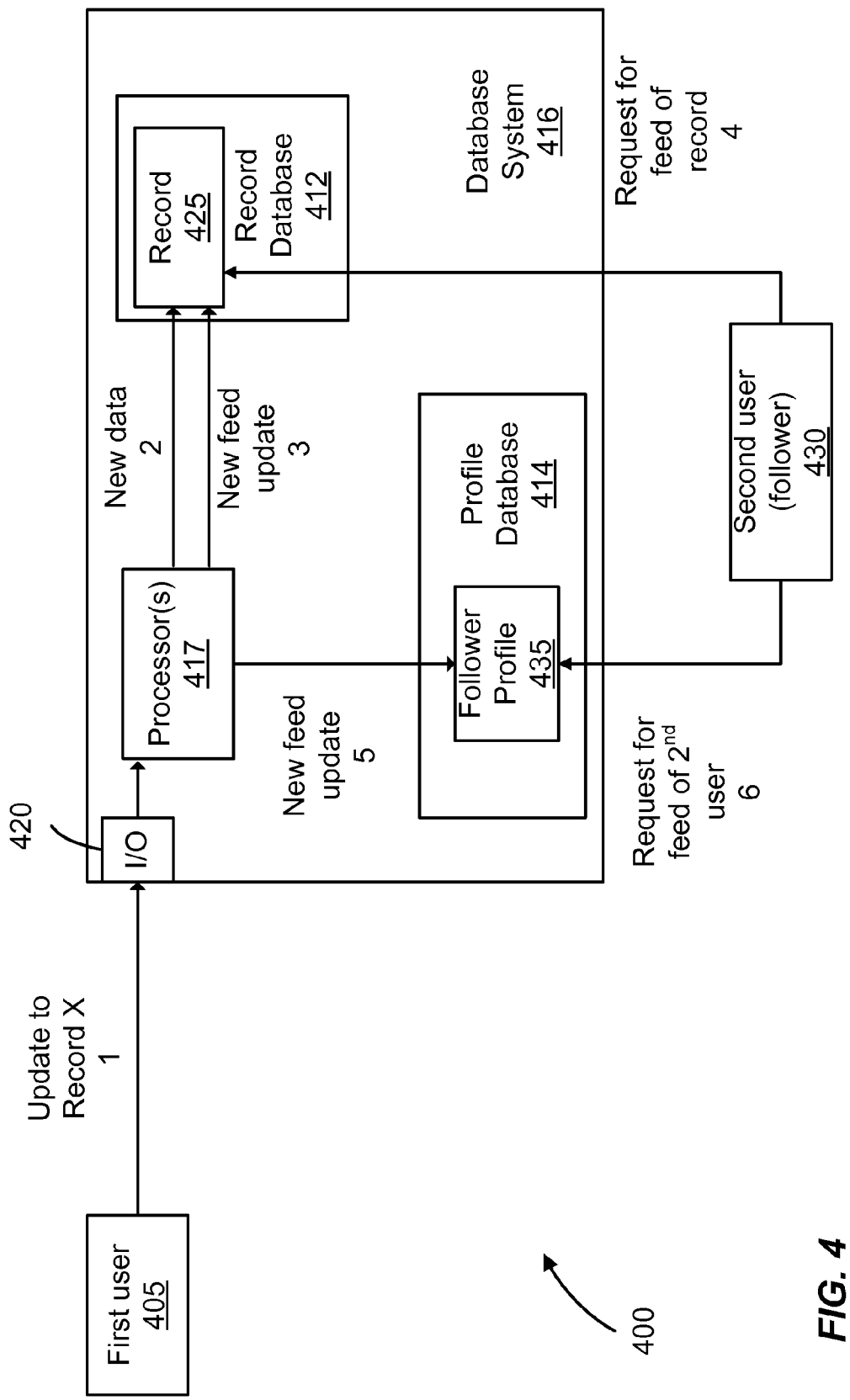
FIG. 4 shows a block diagram of an example of components of a database system configuration 400 performing a method for tracking an update to a record according to some implementations.

FIG. 4 shows a block diagram of an example of components of a database system configuration 400 performing a method for tracking an update to a record according to some implementations. Database system configuration 400 can perform implementations of method 300, as well as implementations of other methods described herein.

A first user 405 sends a request 1 to update record 425 in database system 416.

Although an update request is described, other events that are being tracked are equally applicable. In various implementations, the request 1 can be sent via a user interface (e.g., 30 of FIG. 1B) or an application program interface (e.g., API 32). An I/O port 420 can accommodate the signals of request 1 via any input interface, and send the signals to one or more processors 417. The processor 417 can analyze the request and determine operations to be performed. Herein, any reference to a processor 417 can refer to a specific processor or any set of processors in database system 416, which can be collectively referred to as processor 417.

Processor 417 can determine an identifier for record 425, and send commands with the new data 2 of the request to record database 412 to update record 425. In one implementation, record database 412 is where tenant storage space 112 of FIG. 1B is located. The request 1 and new data commands 2 can be encapsulated in a single write transaction sent to record database 412. In one implementation, multiple changes to records in the database can be made in a single write transaction.

Processor 417 can also analyze request 1 to determine whether a feed tracked update is to be created, which at this point may include determining whether the event (e.g., a change to a particular field) is to be tracked. This determination can be based on an interaction (i.e., an exchange of data) with record database 412 and/or other databases, or based on information stored locally (e.g., in cache or RAM) at processor 417. In one implementation, a list of record types that are being tracked can be stored. The list may be different for each tenant, e.g., as each tenant may configure the database system to its own specifications. Thus, if the record 425 is of a type not being tracked, then the determination of whether to create a feed tracked update can stop there.

The same list or a second list (which can be stored in a same location or a different location) can also include the fields and/or events that are tracked for the record types in the first list. This list can be searched to determine if the event is being tracked. A list may also contain information having the granularity of listing specific records that are to be tracked (e.g., if a tenant can specify the particular records to be tracked, as opposed to just type).

As an example, processor 417 may obtain an identifier associated with record 425 (e.g., obtained from request 1 or database 412), potentially along with a tenant identifier, and cross-reference the identifier with a list of records for which feed tracked updates are to be created. Specifically, the record identifier can be used to determine the record type and a list of tracked types can be searched for a match. The specific record may also be checked if such individual record tracking was enabled. The name of the field to be changed can also be used to search a list of tracking-enabled fields. Other criteria besides field and events can be used to determine whether a feed tracked update is created, e.g., type of change in the field. If a feed tracked update is to be generated, processor 417 can then generate the feed tracked update.

In some implementations, a feed tracked update is created dynamically when a feed (e.g., the entity feed of record 425) is requested. Thus, in one implementation, a feed tracked update can be created when a user requests the entity feed for record 425. In this implementation, the feed tracked update may be created (e.g., assembled), including re-created, each time the entity feed is to be displayed to any user. In one implementation, one or more event history tables can keep track of previous events so that the feed tracked update can be re-created.

In another implementation, a feed tracked update can be created at the time the event occurs, and the feed tracked update can be added to a list of feed items. The list of feed items may be specific to record 425, or may be an aggregate of feed items including feed items for many records. Such an aggregate list can include a record identifier so that the feed items for the entity feed of record 425 can be easily retrieved. For example, after the feed tracked update has been generated, processor 417 can add the new feed tracked update 3 to a feed of record 425. As mentioned above, in one implementation, the feed can be stored in a field (e.g., as a child object) of record 425. In another implementation, the feed can be stored in another location or in another database, but with a link (e.g., a connecting identifier) to record 425. The feed can be organized in various ways, e.g., as a linked list, an array, or other data structure.

A second user 430 can access the new feed tracked update 3 in various ways.

In one implementation, second user 430 can send a request 4 for the record feed. For example, second user 430 can access a home page (detail page) of the record 425 (e.g., with a query or by browsing), and the feed can be obtained through a tab, button, or other activation object on the page. The feed can be displayed on the screen or downloaded.

In another implementation, processor 417 can add the new feed tracked update 5 to a feed (e.g., a news feed) of a user that is following record 425. In one implementation, processor 417 can determine each of the followers of record 425 by accessing a list of the users that have been registered as followers. This determination can be done for each new event (e.g., update 1). In another implementation, processor 417 can poll (e.g., with a query) the records that second user 430 is following to determine when new feed tracked updates (or other feed items) are available. Processor 417 can use a follower profile 435 of second user 430 that can contain a list of the records that the second user 430 is following. Such a list can be contained in other parts of the database as well. Second user 430 can then send a request 6 to his/her profile 435 to obtain a feed, which contains the new feed tracked update. The user's profile 435 can be stored in a profile database 414, which can be the same or different than database 412.

In some implementations, a user can define a news feed to include new feed tracked updates from various records, which may be limited to a maximum number. In one implementation, each user has one news feed. In another implementation, the follower profile 435 can include the specifications of each of the records to be followed (with the criteria for what feed tracked updates are to be provided and how they are displayed), as well as the feed.

Some implementations can provide various types of record (entity) feeds. Entity Feeds can exist for record types like account, opportunity, case, and contact. An entity feed can tell a user about the actions that people have taken on that particular record or on one its related records. The entity feed can include who made the action, which field was changed, and the old and new values. In one implementation, entity feeds can exist on all supported records as a list that is linked to the specific record. For example, a feed could be stored in a field that allows lists (e.g., linked lists) or as a child object.

IV. Tracking Actions of a User

In addition to knowing about events associated with a particular record, it can be helpful for a user to know what a particular user is doing. In particular, it might be nice to know what the user is doing without the user having to generate the feed tracked update (e.g., a user submitting a synopsis of what the user has done). Accordingly, implementations can automatically track actions of a user that trigger events, and feed tracked updates can be generated for certain events.

Figure 5:
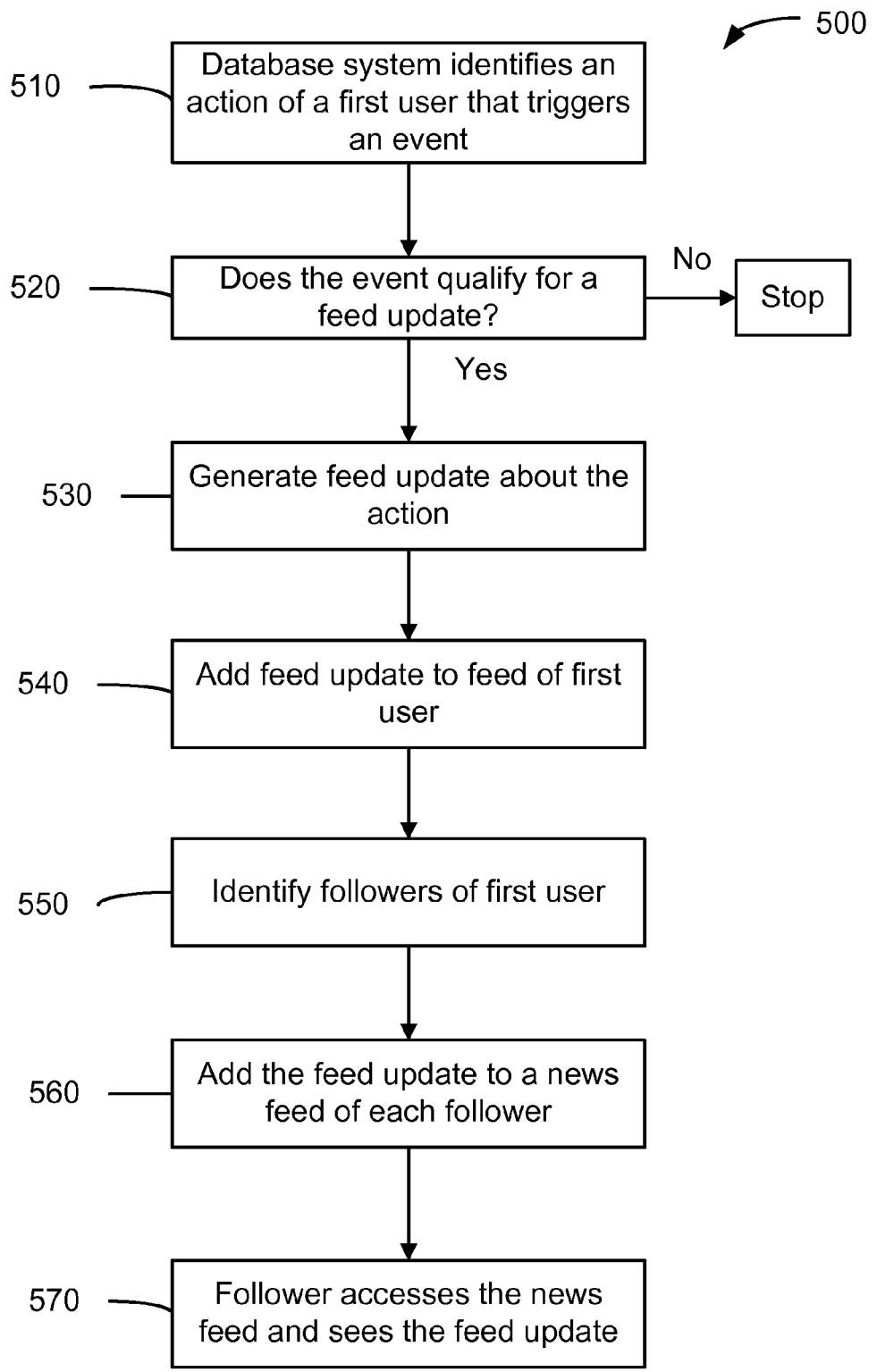
FIG. 5 shows a flowchart of an example of a method 500 for tracking actions of a user of a database system, performed in accordance with some implementations.

FIG. 5 shows a flowchart of an example of a method 500 for tracking actions of a user of a database system, performed in accordance with some implementations. Method 500 may be performed in addition to method 300. The operations of method 300, including order of blocks, can be performed in conjunction with method 500 and other methods described herein. Thus, a feed can be composed of changes to a record and actions of users.

In block 510, a database system (e.g., 16 of FIGS. 1A and 1B) identifies an action of a first user. In one implementation, the action triggers an event, and the event is identified. For example, the action of a user requesting an update to a record can be identified, where the event is receiving a request or is the resulting update of a record. The action may thus be defined by the resulting event. In another implementation, only certain types of actions (events) are identified. Which actions are identified can be set as a default or can be configurable by a tenant, or even configurable at a user level. In this way, processing effort can be reduced since only some actions are identified.

In block 520, it is determined whether the event qualifies for a feed tracked update. In one implementation, a predefined list of events (e.g., as mentioned herein) can be created so that only certain actions are identified. In one implementation, an administrator (or other user) of a tenant can specify the type of actions (events) for which a feed tracked update is to be generated. This block may also be performed for method 300.

In block 530, a feed tracked update is generated about the action. In an example where the action is an update of a record, the feed tracked update can be similar or the same as the feed tracked update created for the record. The description can be altered though to focus on the user as opposed to the record. For example, "John D. has closed a new opportunity for account XYZ" as opposed to "an opportunity has been closed for account XYZ."

In block 540, the feed tracked update is added to a profile feed of the first user when, e.g., the user clicks on a tab to open a page in a browser program displaying the feed. In one implementation, a feed for a particular user can be accessed on a page of the user's profile, in a similar manner as a record feed can be accessed on a detail page of the record. In another implementation, the first user may not have a profile feed and the feed tracked update may just be stored temporarily before proceeding. A profile feed of a user can be stored associated with the user's profile. This profile feed can be added to a news feed of another user.

In block 550, followers of the first user are identified. In one implementation, a user can specify which type of actions other users can follow. Similarly, in one implementation, a follower can select what actions by a user the follower wants to follow. In an implementation where different followers follow different types of actions, which users are followers of that user and the particular action can be identified, e.g., using various lists that track what actions and criteria are being followed by a particular user. In various implementations, the followers of the first user can be identified in a similar manner as followers of a record, as described above for block 350.

In block 560, the feed tracked update is added to a news feed of each follower of the first user when, e.g., the follower clicks on a tab to open a page displaying the news feed. The feed tracked update can be added in a similar manner as the feed items for a record feed. The news feed can contain feed tracked updates both about users and records. In another implementation, a user can specify what kind of feed tracked updates to receive about a user that the user is following. For example, a user could specify feed tracked updates with particular keywords, of certain types of records, of records owned or created by certain users, particular fields, and other criteria as mentioned herein.

In block 570, a follower accesses the news feed and sees the feed tracked update. In one implementation, the user has just one news feed for all of the records that the user is following. In another implementation, a user can access his/her own feed (i.e. feed about his/her own actions) by selecting a particular tab or other object on a page of an interface to the database system. Thus, a feed can include feed tracked updates about what other users are doing in the database system. When a user becomes aware of a relevant action of another user, the user can contact the co-worker, thereby fostering teamwork.

V. Generation of a Feed Tracked Update

As described above, some implementations can generate text describing events (e.g., updates) that have occurred for a record and actions by a user that trigger an event. A database system can be configured to generate the feed tracked updates for various events in various ways.

A. Which Events to generate a feed tracked update

In a database system, there are various events that can be detected. However, the operator of the database system and/or a tenant may not want to detect every possible event as this could be costly with regards to performance. Accordingly, the operator and/or the tenant can configure the database system to only detect certain events. For example, an update of a record may be an event that is to be detected.

Out of the events that are detected, a tenant (including a specific user of the tenant) may not want a feed tracked update about each detected event. For example, all updates to a record may be identified at a first level. Then, based on specifications of an administrator and/or a specific user of a tenant, another level of inquiry can be made as to whether a feed tracked update is to be generated about the detected event. For example, the events that qualify for a feed tracked update can be restricted to changes for only certain fields of the record, and can differ depending on which user is receiving the feed. In one implementation, a database system can track whether an event qualifies for a feed tracked update for any user, and once the feed tracked update is generated, it can be determined who is to receive the feed tracked update.

Supported events (events for which a feed tracked update is generated) can include actions for standard fields, custom fields, and standard related lists. Regarding standard fields, for the entity feed and the profile feed, a standard field update can trigger a feed tracked update to be presented in that feed. In one implementation, which standard field can create a feed tracked update can be set by an administrator to be the same for every user. In another implementation, a user can set which standard fields create a feed tracked update for that user's news feed. Custom fields can be treated the same or differently than standard fields.

The generation of a feed item can also depend on a relationship of an object to other objects (e.g., parent-child relationships). For example, if a child object is updated, a feed tracked update may be written to a feed of a parent of the child object. The level of relationship can be configured, e.g., only 1 level of separation (i.e. no grandparent-grandchild relationship). Also, in one implementation, a feed tracked update is generated only for objects above the objects being updated, i.e., a feed tracked update is not written for a child when the parent is updated.

In some implementations, for related lists of a record, a feed tracked update is written to its parent record (1 level only) when the related list item is added, and not when the list item is changed or deleted. For example: user A added a new opportunity XYZ for account ABC. In this manner, entity feeds can be controlled so as not to be cluttered with feed tracked updates about changes to their related items. Any changes to the related list item can be tracked on their own entity feed, if that related list item has a feed on it. In this implementation, if a user wants to see a feed of the related list item then the user can subscribe to it. Such a subscription might be when a user cares about a specific opportunity related to a specific account. A user can also browse to that object's entity feed. Other implementations can create a feed tracked update when a related entity is changed or deleted.

In one implementation, an administrator (of the system or of a specific tenant) can define which events of which related objects are to have feed tracked updates written about them in a parent record. In another implementation, a user can define which related object events to show. In one implementation, there are two types of related lists of related objects: first class lookup and second class lookup. Each of the records in the related lists can have a different rule for whether a feed tracked update is generated for a parent record. Each of these related lists can be composed as custom related lists. In various implementations, a custom related list can be composed of custom objects; the lists can contain a variety of records or items (e.g., not restricted to a particular type of record or item), and can be displayed in a customized manner.

In one implementation, a first class lookup contains records of a child record that can exist by itself. For example, the contacts on an account exist as a separate record and also as a child record of the account. In another implementation, a record in a first class lookup can have its own feed, which can be displayed on its detail page.

In one implementation, a second class lookup can have line items existing only in the context of their parent record (e.g., activities on an opportunity, contact roles on opportunity/contact). In one implementation, the line items are not objects themselves, and thus there is no detail page, and no place to put a feed. In another implementation, a change in a second class lookup can be reported on the feed of the parent.

Some implementations can also create feed tracked updates for dependent field changes. A dependent field change is a field that changes value when another field changes, and thus the field has a value that is dependent on the value of the other field. For example, a dependent field might be a sum (or other formula) that totals values in other fields, and thus the dependent field would change when one of the fields being summed changes. Accordingly, in one implementation, a change in one field could create feed tracked updates for multiple fields. In other implementations, feed tracked updates are not created for dependent fields.

B. How the Feed Tracked Update is Generated

After it is determined that a feed tracked update is going to be generated, some implementations can also determine how the feed tracked update is generated. In one implementation, different methods can be used for different events, e.g., in a similar fashion as for the configurability of which events feed tracked updates are generated. A feed tracked update can also include a description of multiple events (e.g., john changed the account status and amount).

In one implementation, the feed tracked update is a grammatical sentence, thereby being easily understandable by a person. In another implementation, the feed tracked update provides detailed information about the update. In various examples, an old value and new value for a field may be included in the feed tracked update, an action for the update may be provided (e.g., submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g., a request to update). For example, the subject may be the user, the record, or a field being added or changed. The verb can be based on the action requested by the user, which can be selected from a list of verbs (which may be provided as defaults or input by an administrator of a tenant). In one implementation, feed tracked updates can be generic containers with formatting restrictions, As an example of a feed tracked update for a creation of a new record, "Mark Abramowitz created a new Opportunity for IBM-20,000 laptops with Amount as $3.5M and Sam Palmisano as Decision Maker." This event can be posted to the profile feed for Mark Abramowitz and the entity feed for record of Opportunity for IBM-20,000 laptops. The pattern can be given by (AgentFullName) created a new (ObjectName)(RecordName) with [(FieldName) as (FieldValue) [,/and]]*[[added/changed/removed](RelatedListRecordName)[as/to/as](RelatedListRecordValue) [,/and]]*. Similar patterns can be formed for a changed field (standard or custom) and an added child record to a related list.

VI. Tracking Commentary from or about a User

Some implementations can also have a user submit text, instead of the database system generating a feed tracked update. As the text is submitted as part or all of a message by a user, the text can be about any topic. Thus, more information than just actions of a user and events of a record can be conveyed. In one implementation, the messages can be used to ask a question about a particular record, and users following the record can provide comments and responses.

Figure 6:
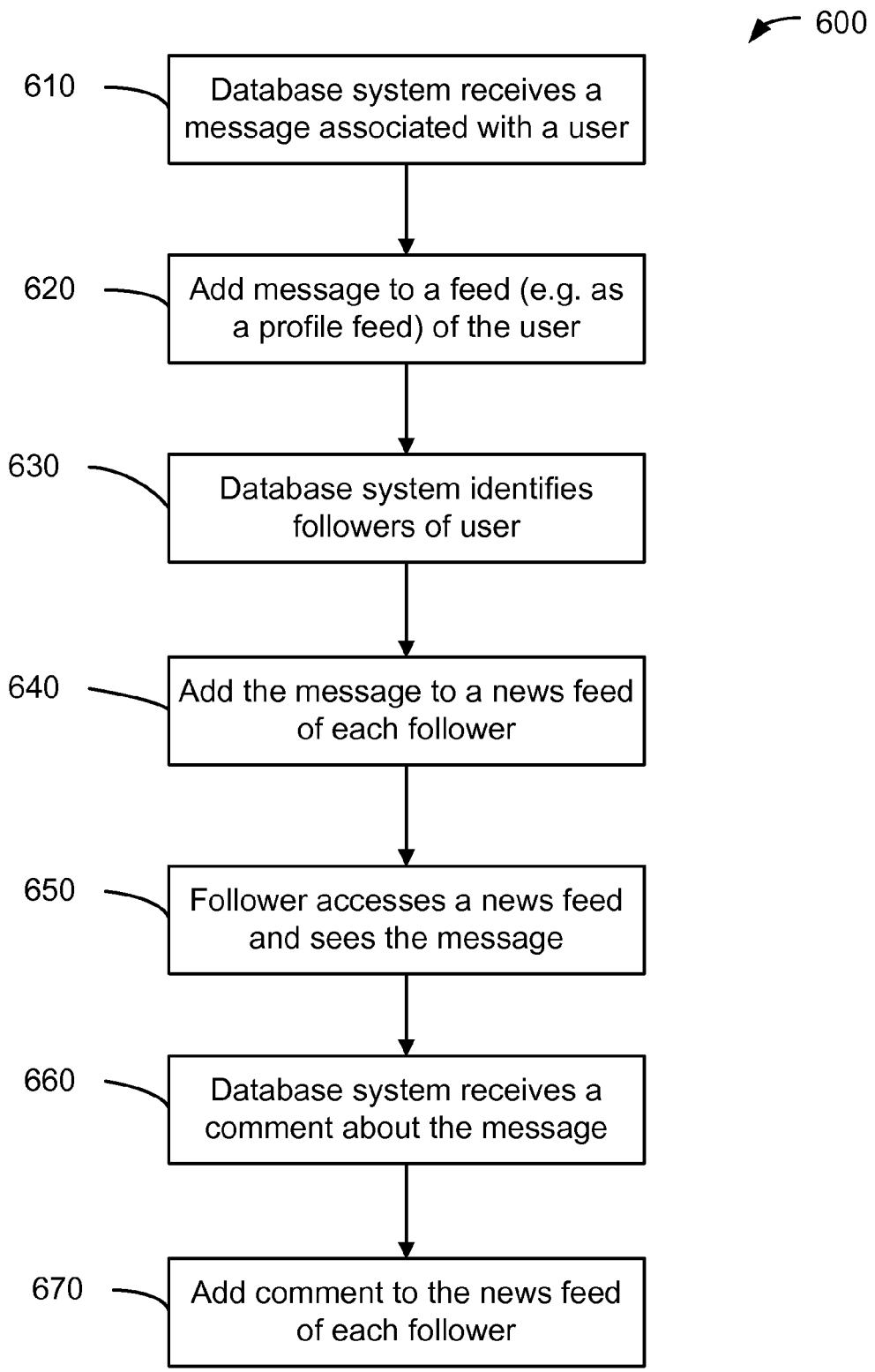
FIG. 6 shows a flowchart of an example of a method 600 for creating a news feed from messages created by a user about a record or another user, performed in accordance with some implementations.

FIG. 6 shows a flowchart of an example of a method 600 for creating a news feed from messages created by a user about a record or another user, performed in accordance with some implementations. In one implementation, method 600 can be combined with methods 300 and 500. In one aspect, a message can be associated with the first user when the first user creates the message (e.g., a post or comment about a record or another user). In another aspect, a message can be associated with the first user when the message is about the first user (e.g., posted by another user on the first user's profile feed).

In block 610, the database system receives a message (e.g., a post or status update) associated with a first user. The message (e.g., a post or status update) can contain text and/or multimedia content submitted by another user or by the first user. In one implementation, a post is for a section of the first user's profile page where any user can add a post, and where multiple posts can exist. Thus, a post can appear on the first user's profile page and can be viewed when the first user's profile is visited. For a message about a record, the post can appear on a detail page of a record. Note the message can appear in other feeds as well. In another implementation, a status update about the first user can only be added by the first user. In one implementation, a user can only have one status message.

In block 620, the message is added to a table, as described in greater detail below. When the feed is opened, a query filters one or more tables to identify the first user, identify other persons that the user is following, and retrieve the message. Messages and record updates are presented in a combined list as the feed. In this way, in one implementation, the message can be added to a profile feed of the first user, which is associated (e.g., as a related list) with the first user's profile. In one implementation, the posts are listed indefinitely. In another implementation, only the most recent posts (e.g., last 50) are kept in the profile feed. Such implementations can also be employed with feed tracked updates. In yet another implementation, the message can be added to a profile of the user adding the message.

In block 630, the database system identifies followers of the first user. In one implementation, the database system can identify the followers as described above for method 500. In various implementations, a follower can select to follow a feed about the actions of the first user, messages about the first user, or both (potentially in a same feed).

In block 640, the message is added to a news feed of each follower. In one implementation, the message is only added to a news feed of a particular follower if the message matches some criteria, e.g., the message includes a particular keyword or other criteria. In another implementation, a message can be deleted by the user who created the message. In one implementation, once deleted by the author, the message is deleted from all feeds to which the message had been added.

In block 650, the follower accesses a news feed and sees the message. For example, the follower can access a news feed on the follower's own profile page. As another example, the follower can have a news feed sent to his/her own desktop without having to first go to a home page.

In block 660, the database system receives a comment about the message. The database system can add the comment to a feed of the same first user, much as the original message was added. In one implementation, the comment can also be added to a feed of a second user who added the comment. In one implementation, users can also reply to the comment. In another implementation, users can add comments to a feed tracked update, and further comments can be associated with the feed tracked update. In yet another implementation, making a comment or message is not an action to which a feed tracked update is created. Thus, the message may be the only feed item created from such an action.

In one implementation, if a feed tracked update or post is deleted, its corresponding comments are deleted as well. In another implementation, new comments on a feed tracked update or post do not update the feed tracked update timestamp. Also, the feed tracked update or post can continue to be shown in a feed (profile feed, record feed, or news feed) if it has had a comment within a specified timeframe (e.g., within the last week). Otherwise, the feed tracked update or post can be removed in an implementation.

In some implementations, all or most feed tracked updates can be commented on. In other implementations, feed tracked updates for certain records (e.g., cases or ideas) are not commentable. In various implementations, comments can be made for any one or more records of opportunities, accounts, contacts, leads, and custom objects.

In block 670, the comment is added to a news feed of each follower. In one implementation, a user can make the comment within the user's news feed. Such a comment can propagate to the appropriate profile feed or record feed, and then to the news feeds of the following users. Thus, feeds can include what people are saying, as well as what they are doing. In one aspect, feeds are a way to stay up-to-date (e.g., on users, opportunities, etc.) as well as an opportunity to reach out to co-workers/partners and engage them around common goals.

In some implementations, users can rate feed tracked updates or messages (including comments). A user can choose to prioritize a display of a feed so that higher rated feed items show up higher on a display. For example, in an implementation where comments are answers to a specific question, users can rate the different status posts so that a best answer can be identified. As another example, users are able to quickly identify feed items that are most important as those feed items can be displayed at a top of a list. The order of the feed items can be based on an importance level (which can be determined by the database system using various factors, some of which are mentioned herein) and based on a rating from users. In one implementation, the rating is on a scale that includes at least 3 values. In another implementation, the rating is based on a binary scale.

Besides a profile for a user, a group can also be created. In various implementations, the group can be created based on certain criteria that are common to the users, can be created by inviting users, or can be created by receiving requests to join from a user. In one implementation, a group feed can be created, with messages being added to the group feed when someone adds a message to the group as a whole. For example, a group page may have a section for posts. In another implementation, a message can be added to a group feed when a message is added about any one of the members. In yet another implementation, a group feed can include feed tracked updates about actions of the group as a whole (e.g., when an administrator changes data in a group profile or a record owned by the group), or about actions of an individual member.

Figure 7:
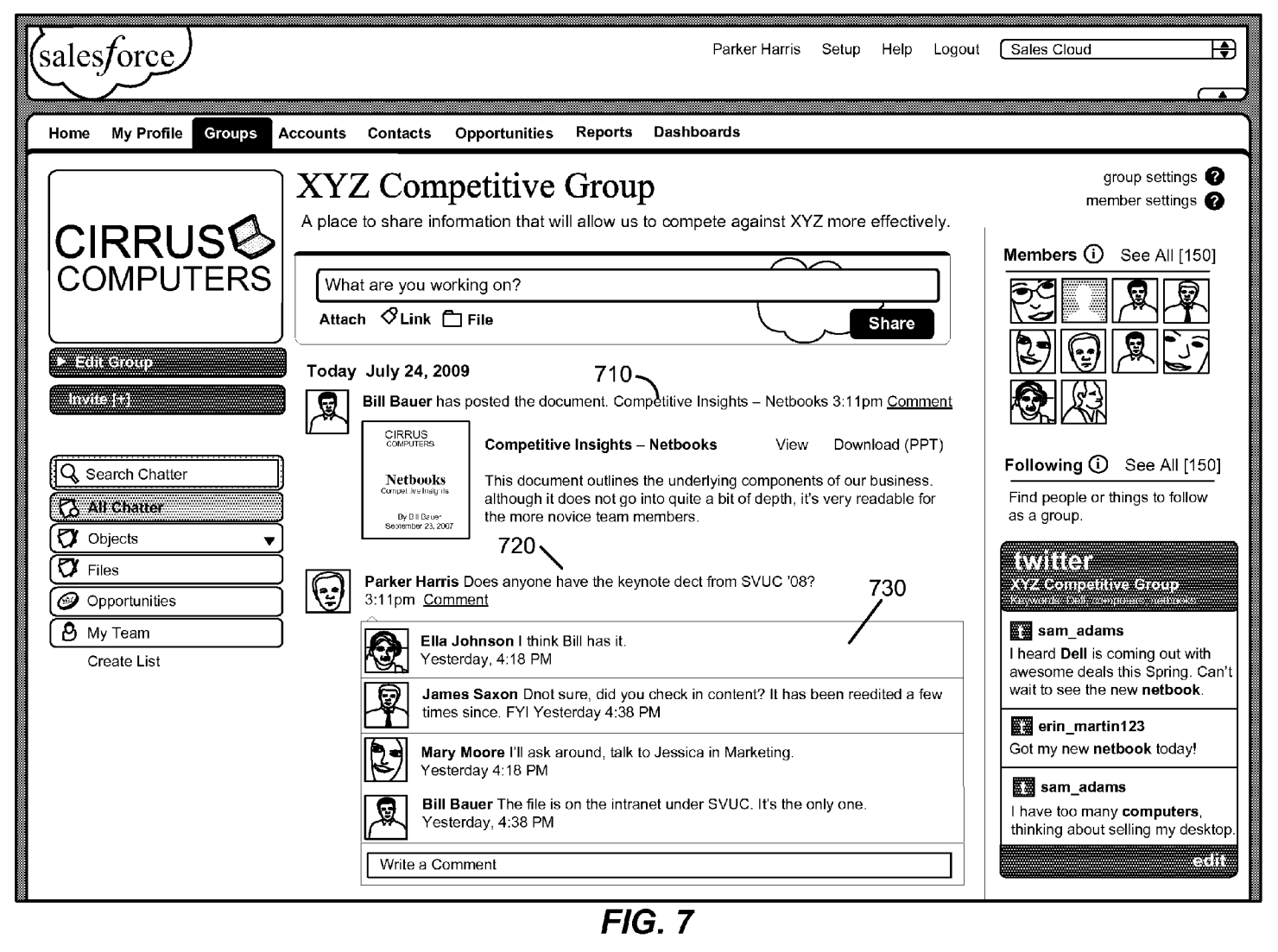

FIG. 7 shows an example of a group feed on a group page according to some implementations. As shown, a feed item 710 shows that a user has posted a document to the group object. The text "Bill Bauer has posted the document Competitive Insights" can be generated by the database system in a similar manner as feed tracked updates about a record being changed. A feed item 720 shows a post to the group, along with comments 730 from Ella Johnson, James Saxon, Mary Moore and Bill Bauer.

Figure 8:
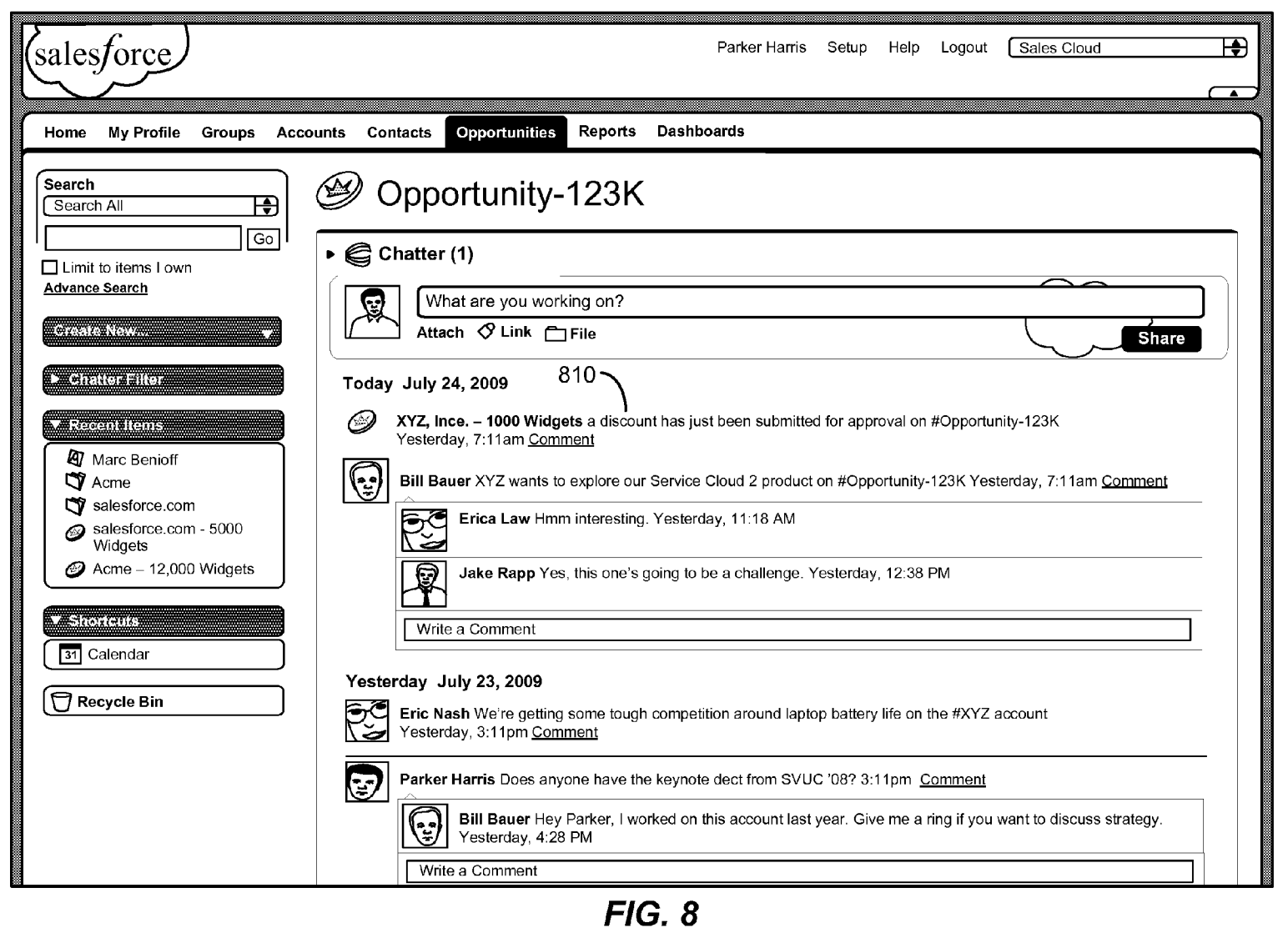

FIG. 8 shows an example of a record feed containing a feed tracked update, post, and comments according to some implementations. Feed item 810 shows a feed tracked update based on the event of submitting a discount for approval. Other feed items show posts, e.g., from Bill Bauer, that are made to the record and comments, e.g., from Erica Law and Jake Rapp, that are made on the posts.

VII. Infrastructure for a Feed

A. Tables Used to Create a Feed

FIG. 9A shows an example of a plurality of feed tracked update tables that may be used in tracking events and creating feeds according to some implementations. The tables of FIG. 9A may have entries added, or potentially removed, as part of tracking events in the database from which feed items are creates or that correspond to feed items. In one implementation, each tenant has its own set of tables that are created based on criteria provided by the tenant.

An event history table 910 can provide a feed tracked update of events from which feed items are created. In one aspect, the events are for objects that are being tracked. Thus, table 910 can store and change feed tracked updates for feeds, and the changes can be persisted. In various implementations, event history table 910 can have columns of event ID 911, object ID 912 (also called parent ID), and created by ID 913. The event ID 911 can uniquely identify a particular event and can start at 1 (or other number or value).

Each new event can be added chronologically with a new event ID, which may be incremented in order. An object ID 912 can be used to track which record or user's profile is being changed. For example, the object ID can correspond to the record whose field is being changed or the user whose feed is receiving a post. The created by ID 913 can track the user who is performing the action that results in the event, e.g., the user that is changing the field or that is posting a message to the profile of another user.

In some other implementations, event history table 910 can have one or more of the following variables with certain attributes: ORGANIZATION_ID being CHAR(15 BYTE), FEEDS_ENTITY_HIFEED TRACKED UPDATE_ID being CHAR(15 BYTE), PARENT_ID being CHAR(15 BYTE), CREATED_BY being CHAR(15 BYTE), CREATED_DATE being a variable of type DATE, DIVISION being a NUMBER, KEY_PREFIX being CHAR(3 BYTE), and DELETED being CHAR(1 BYTE). The parent ID can provide an ID of a parent object in case the change is promulgated to the parent. The key prefix can provide a key that is unique to a group of records, e.g., custom records (objects). The deleted variable can indicate that the feed items for the event are deleted, and thus the feed items are not generated. In one implementation, the variables for each event entry or any entry in any of the tables may not be nullable. In another implementation, all entries in the event history table 910 are used to create feed items for only one object, as specified by the object ID 912. For example, one feed tracked update cannot communicate updates on two records, such as updates of an account field and an opportunity field.

In one implementation, a name of an event can also be stored in table 910. In one implementation, a tenant can specify events that they want tracked. In an implementation, event history table 910 can include the name of the field that changed (e.g., old and new values). In another implementation, the name of the field, and the values, are stored in a separate table. Other information about an event (e.g., text of comment, feed tracked update, post or status update) can be stored in event history table 910, or in other tables, as is now described.

A field change table 920 can provide a feed tracked update of the changes to the fields. The columns of table 920 can include an event ID 921 (which correlates to the event ID 911), an old value 922 for the field, and the new value 923 for the field. In one implementation, if an event changes more than one field value, then there can be an entry for each field changed. As shown, event ID 921 has two entries for event E37.

In some other implementations, field change table 920 can have one or more of the following variables with certain attributes: ORGANIZATION_ID being CHAR(15 BYTE), FEEDS_ENTITY_HIFEED TRACKED UPDATE_FIELDS_ID being CHAR(15 BYTE) and identifying each entry, FEEDS_ENTITY_HIFEED TRACKED UPDATE_ID being CHAR(15 BYTE), FIELD_KEY being VARCHAR2(120 BYTE), DATA_TYPE being CHAR(1 BYTE), OLDVAL_STRING VARCHAR2 being (765 BYTE), NEWVAL_STRING being VARCHAR2(765 BYTE), OLDVAL_FIRST_NAME being VARCHAR2(765 BYTE), NEWVAL_FIRST_NAME being VARCHAR2(765 BYTE), OLDVAL_LAST_NAME being VARCHAR2(765 BYTE), NEWVAL_LAST_NAME being VARCHAR2(765 BYTE), OLDVAL_NUMBER being NUMBER, NEWVAL_NUMBER being NUMBER, OLDVAL_DATE being DATE, NEWVAL_DATE being DATE, and DELETED being CHAR(1 BYTE). In one implementation, one or more of the variables for each entry in any of the tables may be nullable.

In one implementation, the data type variable (and/or other variables) is a non-API-insertable field. In another implementation, variable values can be derived from the record whose field is being changed. Certain values can be transferred into typed columns old/new value string, old/new value number or old/new value date depending upon the derived values. In another implementation, there can exist a data type for capturing add/deletes for child objects. The child ID can be tracked in the foreign-key column of the record. In yet another implementation, if the field name is pointing to a field in the parent entity, a field level security (FLS) can be used when a user attempts to a view a relevant feed item. Herein, security levels for objects and fields are also called access checks and determinations of authorization. In one aspect, the access can be for create, read, write, update, or delete of objects.

In one implementation, the field name (or key) can be either a field name of the entity or one of the values in a separate list. For example, changes that do not involve the update of an existing field (e.g., a close or open) can have a field name specified in an enumerated list. This enumerated list can store "special" field name sentinel values for non-update actions that a tenant wants to track. In one aspect, the API just surfaces these values and the caller has to check the enumerated values to see if it is a special field name.

A comment table 930 can provide a feed tracked update of the comments made regarding an event, e.g., a comment on a post or a change of a field value. The columns of table 930 can include an event ID 921 (which correlates to the event ID 911), the comment column 932 that stores the text of the comment, and the time/date 933 of the comment. In one implementation, there can be multiple comments for each event. As shown, event ID 921 has two entries for event E37.

In some other implementations, comment table 930 can have one or more of the following variables with certain attributes: ORGANIZATION_ID being CHAR(15 BYTE), FEEDS_COMMENTS_ID being CHAR(15 BYTE) and uniquely identifying each comment, PARENT_ID being CHAR(15 BYTE), CREATED_BY being CHAR(15 BYTE), CREATED_DATE being DATE, COMMENTS being VARCHAR2(420 BYTE), and DELETED being CHAR(1 BYTE).

A user subscription table 940 can provide a list of the objects being followed (subscribed to) by a user. In one implementation, each entry has a user ID 941 of the user doing the following and one object ID 942 corresponding to the object being followed. In one implementation, the object being followed can be a record or a user. As shown, the user with ID U819 is following object IDs O615 and O489. If user U819 is following other objects, then additional entries may exist for user U819. Also as shown, user U719 is also following object O615. The user subscription table 940 can be updated when a user adds or deletes an object that is being followed.

In some other implementations, user subscription table 940 can be composed of two tables (one for records being followed and one for users being followed). One table can have one or more of the following variables with certain attributes: ORGANIZATION_ID being CHAR(15 BYTE), ENTITY_SUBSCRIPTION_ID being CHAR(15 BYTE), PARENT_ID being CHAR(15 BYTE), CREATED_BY being CHAR(15 BYTE), CREATED_DATE being DATE, and DELETED being CHAR(1 BYTE). Another table can have one or more of the following variables with certain attributes: ORGANIZATION_ID being CHAR(15 BYTE), USER_SUBSCRIPTIONS_ID being CHAR(15 BYTE), USER_ID being CHAR(15 BYTE), CREATED_BY being CHAR(15 BYTE), and CREATED_DATE being DATE.

In one implementation, regarding a profile feed and a news feed, these are read-only views on the event history table 910 specialized for these feed types. Conceptually the news feed can be a semi join between the user subscription table 940 and the event history table 910 on the object IDs 912 and 942 for the user. In one aspect, these entities can have polymorphic parents and can be subject to a number of restrictions detailed herein, e.g., to limit the cost of sharing checks.

In one implementation, entity feeds are modeled in the API as a feed associate entity (e.g., AccountFeed, CaseFeed, etc). A feed associate entity includes information composed of events (e.g., event IDs) for only one particular record type. Such a list can limit the query (and sharing checks) to a specific record type. In one aspect, this structuring of the entity feeds can make the query run faster. For example, a request for a feed of a particular account can include the record type of account. In one implementation, an account feed table can then be searched, where the table has account record IDs and corresponding event IDs or pointers to particular event entries in event history table 910. Since the account feed table only contains some of the records (not all), the query can run faster.

In one implementation, there may be objects with no events listed in the event history table 910, even though the record is being tracked. In this case, the database service can return a result indicating that no feed items exist.

In another implementation, tables can also exist for audit tracking, e.g., to examine that operations of the system (e.g., access checks) are performing accurately. In one implementation, audit change-event history tables can be persisted (e.g., in bulk) synchronously in the same transaction as feed events are added to event history table 910. In another implementation, entries to the two sets of table can be persisted in asynchronous manner (e.g., by forking a bulk update into a separate java thread). In one aspect, some updates to any of the tables can get lost if the instance of the table goes down while the update has not yet finished. This asynchronous manner can limit an impact performance on save operations. In some implementations, a field "persistence type" (tri state: AUDIT, FEEDS or BOTH) can be added to capture user preferences, as opposed to being hard coded.

B. Feed Item

A feed item can represent an individual field change of a record, creation and deletion of a record, or other events being tracked for a record or a user. In one implementation, all of the feed items in a single transaction (event) can be grouped together and have the same event ID. A single transaction relates to the operations that can be performed in a single communication with the database. In another implementation where a feed is an object of the database, a feed item can be a child of a profile feed, news feed, or entity feed. If a feed item is added to multiple feeds, the feed item can be replicated as a child of each feed to which the feed item is added.

In one implementation, a feed item is visible only when its parent feed is visible, which can be the same as needing read access on the feed's parent (which can be by the type of record or by a specific record). The feed item's field may be only visible when allowed under field-level security (FLS). Unfortunately, this can mean that the parent feed may be visible, but the child may not be because of FLS. Such access rules are described in more detail below. In one implementation, a feed item can be read-only. In this implementation, after being created, the feed item cannot be changed.

In multi-currency organizations, a feed item can have an extra currency code field. This field can give the currency code for the currency value in this field. In one aspect, the value is undefined when the data type is anything other than currency.

C. Feed Comment

In some implementations, a comment exists as an item that depends from feed tracked updates, posts, status updates, and other items that are independent of each other. Thus, a feed comment object can exist as a child object of a feed item object. For example, comment table 930 can be considered a child table of event history table 910. In one implementation, a feed comment can be a child of a profile feed, news feed, or entity feed that is separate from other feed items.

In various implementations, a feed comment can have various permissions for the following actions. For read permission, a feed comment can be visible if the parent feed is visible. For create permission, if a user has access to the feed (which can be tracked by the ID of the parent feed), the user can add a comment. For delete, only a user with modify all data permission or a user who added the comment can delete the comment. Also delete permission can involve access on the parent feed. An update of a comment can be restricted, and thus not be allowed.

In one implementation, regarding a query restriction, a feed comment cannot be queried directly, but can be queried only via the parent feed. An example is "select id, parentid, (select . . . from feedcomment) from entityfeed". In another implementation, a feed comment can be directly queries, e.g., by querying comment table 930. A query could include the text of a comment or any other column of the table.

In another implementation, regarding soft delete behavior, a feed comment table does not have a soft delete column. A soft delete allows an undelete action. In one implementation, a record can have a soft delete. Thus, when the record is deleted, the feed (and its children) can be soft deleted. Therefore, in one aspect, a feed comment cannot be retrieved via the "query" verb (which would retrieve only the comment), but can be retrieved via "queryAll" verb though. An example is queryAll("select id, (select id, commentbody from feedcomments) from accountfeed where parentid='001x000xxx3MkADAA0'"); // where '001x000xxx3MkADAA0' has been soft deleted. When a hard delete (a physical delete) happens, the comment can be hard deleted from the database.

In one implementation, regarding an implicit delete, feeds with comments are not deleted by a reaper (a routine that performs deletion). In another implementation, a user cannot delete a feed. In yet another implementation, upon lead convert (e.g., to an opportunity or contact), the feed items of the lead can be hard deleted. This implementation can be configured to perform such a deletion for any change in record type. In various implementations, only the comments are hard deleted upon a lead convert, other convert, or when the object is deleted (as mentioned above).

In one implementation, viewing a feed pulls up the most recent messages or feed tracked updates (e.g., 25) and searches the most recent (e.g., 4) comments for each feed item. The comments can be identified via the comment table 930. In one implementation, a user can request to see more comments, e.g., by selecting a see more link.

In some implementations, user feeds and/or entity feeds have a last comment date field. In various implementations, the last comment date field is stored as a field of a record or a user profile. For feeds with no comments, this can be the same as the created date. Whenever a new comment is created, the associated feed's last comment date can be updated with the created date of the comment. The last comment date is unchanged if a feed comment is deleted. A use case is to allow people to order their queries to see the feeds, which have been most recently commented on.

D. Creating Custom Feeds by Customizing the Event History Table

In some implementations, a tenant (e.g., through an administrator) or a specific user of a tenant can specify the types of events for which feed items are created. A user can add more events or remove events from a list of events that get added to the event history table 910. In one implementation, a trigger can be added as a piece of code, rule, or item on a list for adding a custom event to the event history table 910. These custom events can provide customers the ability to create their own custom feeds and custom feed items to augment or replace implicitly generated feeds via event history table 910. Implicitly generated feed data can be created when feed-tracking is enabled for certain entities/field-names. In one implementation, in order to override implicit feeds, feed tracking can be turned off and then triggers can be defined by the user to add events to the event history table 910. In other implementations, users are not allowed to override the default list of events that are added to table 910, and thus cannot define their own triggers for having events tracked.

For example, upon lead convert or case close, a default action to be taken by the system may be to add multiple events to event history table 910. If a customer (e.g., a tenant or a specific user) does not want each of these events to show up as feed items, the customer can turn off tracking for the entities and generate custom feeds by defining customized triggers (e.g., by using an API) upon the events. As another example, although data is not changed, a customer may still want to track an action on a record (e.g., status changes if not already being tracked, views by certain people, retrieval of data, etc.).

In one implementation, if a user does not want a feed item to be generated upon every change on a given field, but only if the change exceeds a certain threshold or range, then such custom feeds can be conditionally generated with the customized triggers. In one implementation, the default tracking for the record or user may be turned off for this customization so that the events are only conditionally tracked. In another implementation, a trigger can be defined that deletes events that are not desired, so that default tracking can still be turned on for a particular object type. Such conditional tracking can be used for other events as well.

In some implementations, defining triggers to track certain events can be done as follows. A user can define an object type to track. This object type can be added to a list of objects that can be tracked for a particular tenant. The tenant can remove object types from this list as well. Custom objects and standard objects can be on the list, which may, for example, be stored in cache or RAM of a server or in the database. Generally only one such list exists for a tenant, and users do not have individual lists for themselves, although in some implementations, they may particularly when the number of users in a tenant is small.

In one implementation, a tenant can select which records of an object type are to be tracked. In another implementation, once an object type is added to the tracking list of object types, then all records of that type are tracked. The tenant can then specify the particulars of how the tracking is to be performed. For example, the tenant can specify triggers as described above, fields to be tracked, or any of the customizations mentioned herein.

In some implementations, when a feed is defined as an object in the database (e.g., as a child object of entity records that can be tracked), a particular instance of the feed object (e.g., for a particular record) can be create-able and delete-able. In one implementation, if a user has access to a record then the user can customize the feed for the record. In one implementation, a record may be locked to prevent customization of its feed.

One method of creating a custom feed for users of a database system according to implementations is now described. Any of the following blocks can be performed wholly or partially with the database system, and in particular by one or more processor of the database system.

In block A, one or more criteria specifying which events are to be tracked for possible inclusion into a feed to be displayed are received from a tenant. In block B, data indicative of an event is received. In block C, the event is analyzed to determine if the criteria are satisfied. In block D, if the criteria are satisfied, at least a portion of the data is added to a table (e.g., one or more of the tables in FIG. 9A) that tracks events for inclusion into at least one feed for a user of the tenant. The feed in which feed items of an event may ultimately be displayed can be a news feed, record feed, or a profile feed.

E. Creating Custom Feeds with Filtering

After feed items have been generated, they can be filtered so that only certain feed items are displayed, which may be tailored to a specific tenant and/or user. In one implementation, a user can specify changes to a field that meet certain criteria for the feed item to show up in a feed displayed to the user, e.g., a news feed or even an entity feed displayed directly to the user. In one implementation, the criteria can be combined with other factors (e.g., number of feed items in the feed) to determine which feed items to display. For instance, if a small number of feed items exist (e.g., below a threshold), then all of the feed items may be displayed.

In one implementation, a user can specify the criteria via a query on the feed items in his/her new feed, and thus a feed may only return objects of a certain type, certain types of events, feed tracked updates about certain fields, and other criteria mentioned herein. Messages can also be filtered according to some criteria, which may be specified in a query. Such an added query can be added onto a standard query that is used to create the news feed for a user. A first user could specify the users and records that the first user is following in this manner, as well as identify the specific feed items that the first user wants to follow. The query could be created through a graphical interface or added by a user directly in a query language. Other criteria could include receiving only posts directed to a particular user or record, as opposed to other feed items.

In one implementation, the filters can be run by defining code triggers, which run when an event, specific or otherwise, occurs. The trigger could then run to perform the filtering at the time the event occurs or when a user (who has certain defined triggers, that is configured for a particular user) requests a display of the feed. A trigger could search for certain terms (e.g., vulgar language) and then remove such terms or not create the feed item. A trigger can also be used to send the feed item to a particular person (e.g., an administrator) who does not normally receive the feed item were it not for the feed item containing the flagged terms.

F. Access Checks

In one implementation, a user can access a feed of a record if the user can access the record. The security rules for determining whether a user has access to a record can be performed in a variety of ways, some of which are described in commonly assigned U.S. Pat. No. 8,095,531, titled METHODS AND SYSTEMS FOR CONTROLLING ACCESS TO CUSTOM OBJECTS IN A DATABASE, by Weissman et al., issued on Jan. 10, 2012, and hereby incorporated by reference in its entirety and for all purposes. For example, a security level table can specify whether a user can see a particular type of record and/or particular records. In one implementation, a hierarchy of positions within a tenant is used. For example, a manager can inherit the access levels of employees that the manager supervises. Field level security (FLS) can also be used to determine whether a particular feed tracked update about an update to a field can be seen by the user. The field change table 920 can be used to identify a field name or field ID, and then whether the user has read access to that field can be determined from an FLS table. For example, if a user could not see a field of a social security number, the feed of the user provided to the user would not include any feed items related to the social security number field.

In one implementation, a user can edit a feed of a record if the user has access to the record, e.g., deleting or editing a feed item. In another implementation, a user (besides an administrator) cannot edit a feed item, except for performing an action from which a feed item can be created. In one example, a user is first has to have access to a particular record and field for a feed item to be created based on an action of the user. In this case, an administrator can be considered to be a user with MODIFY-ALL-DATA security level. In yet another implementation, a user who created the record can edit the feed.

G. Posts

In one implementation, the text of posts are stored in a child table (post table 950), which can be cross-referenced with event history table 910. Post table 950 can include event ID 951 (to cross-reference with event ID 911), post text 952 to store the text of the post, and time/date 953. An entry in post table 950 can be considered a feed post object. Posts for a record can also be subject to access checks. In one implementation, if a user can view a record then all of the posts can be seen, i.e. there is not an additional level of security check as there is for FLS. In another implementation, an additional security check could be done, e.g., by checking on whether certain keywords (or phrases) exist in the post. For instance, a post may not be not provided to specified users if a certain keyword exists, or only provided to specified users if a keyword exists. In another implementation, a table can exist for status updates.

VIII. Subscribing to Users and Records to Follow

As described above, a user can follow users, groups, and records. Implementations can provide mechanisms for a user to manage which users, groups, and records that the user is currently following. In one implementation, a user can be limited to the number of users and records (collectively or separately) that the user can follow. For example, a user may be restricted to only following 10 users and 15 records, or as another example, 25 total. Alternatively, the user may be permitted to follow more or less users.

In one implementation, a user can go to a page of a record and then select to follow that object (e.g., with a button marked "follow" or "join"). In another implementation, a user can search for a record and have the matching records show up in a list. The search can include criteria of records that the user might want to follow. Such criteria can include the owner, the creation date, last comment date, and numerical values of particular fields (e.g., an opportunity with a value of more than $10,000).

A follow button (or other activation object) can then reside next to each record in the resulting list, and the follow button can be selected to start following the record. Similarly, a user can go to a profile page of a user and select to follow the user, or a search for users can provide a list, where one or more users can be selected for following from the list. The selections of subscribing and unsubscribing can add and delete rows in table 920.

In some implementations, a subscription center acts as a centralized place in a database application (e.g., application platform 18) to manage which records a user subscribes to, and which field updates the user wants to see in feed tracked updates. The subscription center can use a subscription table to keep track of the subscriptions of various users. In one implementation, the subscription center shows a list of all the items (users and records) a user is subscribed to. In another implementation, a user can unsubscribe to subscribed objects from the subscription center.

A. Automatic Subscription

In one implementation, an automatic subscription feature can ensure that a user is receiving certain feeds. In this manner, a user does not have to actively select certain objects to follow. Also, a tenant can ensure that a user is following objects that the user needs to be following.

In various implementations for automatically following users, a default for small organizations can be to follow everyone. For big organizations, the default can be to follow a manager and peers. If a user is a manager, the default can be to follow the manager's supervisor, peers, and people that the manager supervises (subordinates). In other implementations for automatically following records, records that the user owns may be automatically followed and/or records recently viewed (or changed) may be automatically followed.

In one example, a new record is created. The owner (not necessarily the user who created the entity) is subscribed to the entity. If ownership is changed, the new owner may automatically be subscribed to follow the entity. Also, after a lead convert, the user doing the lead convert may be automatically subscribed to the new account, opportunity, or contact resulting from the lead convert. In one implementation, the auto subscription is controlled by user preference. That is a user or tenant can have the auto subscribe feature enabled or not. In one aspect, the default is to have the auto-subscribe turned on.

Figure 9B:
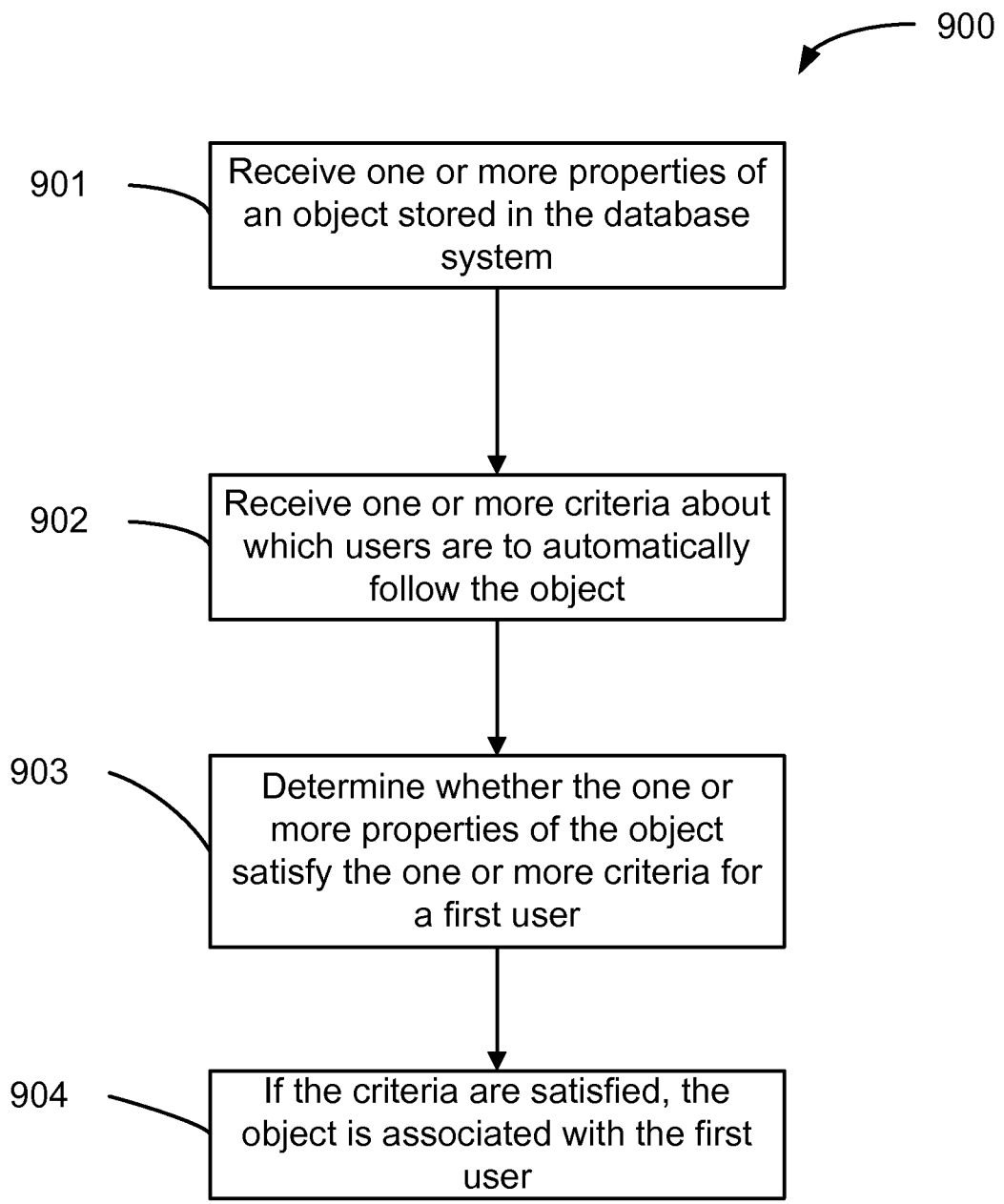
FIG. 9B shows a flowchart of an example of a method 900 for automatically subscribing a user to an object in a database system, performed in accordance with some implementations.

FIG. 9B shows a flowchart of an example of a method 900 for automatically subscribing a user to an object in a database system, performed in accordance with some implementations. Any of the following blocks can be performed wholly or partially with the database system, and in particular by one or more processor of the database system.

In block 901, one or more properties of an object stored in the database system are received. The properties can be received from administrators of the database system, or from users of the database system (which may be an administrator of a customer organization). The properties can be records or users, and can include any of the fields of the object that are stored in the database system. Examples of properties of a record include: an owner of the record, a user that converted the record from one record type to another record type, whether the first user has viewed the record, and a time the first user viewed the record. Examples of properties of a user include: which organization (tenant) the user is associated with, the second user's position in the same organization, and which other users the user had e-mailed or worked with on projects.

In block 902, the database system receives one or more criteria about which users are to automatically follow the object. The criteria can be received from administrators of the database system, or from one or more users of the database system. The users may be an administrator of a customer organization, which can set tenant-wide criteria or criteria for specific users (who may also set the criteria themselves). Examples of the criteria can include: an owner or creator of a record is to follow the record, subordinates of an owner or creator of a record are to follow the record, a user is to follow records recently viewed (potentially after a specific number of views), records that a user has changed values (potentially with a date requirement), records created by others in a same business group as the user. Examples of the criteria can also include: a user is to follow his/her manager, the user's peers, other users in the same business group as the user, and other users that the user has e-mailed or worked with on a project. The criteria can be specific to a user or group of users (e.g., users of a tenant).

In block 903, the database system determines whether the one or more properties of the object satisfy the one or more criteria for a first user. In one implementation, this determination can occur by first obtaining the criteria and then determining objects that satisfy the criteria. The determination can occur periodically, at time of creation of an object, or at other times. If different users have different criteria, then the criteria for a particular user or group could be searched at the same time. Since users of different tenants normally cannot view objects of another tenant, certain criteria does not have to be checked. In another implementation, this determination can occur by looking at certain properties and then identifying any criteria that are met. In yet another implementation, the criteria and properties can be used to find users that satisfy the criteria.

In block 904, if the criteria are satisfied, the object is associated with the first user. The association can be in a list that stores information as to what objects are being followed by the first user. User subscription table 940 is an example of such a list. In one implementation, the one or more criteria are satisfied if one property satisfies at least one criterion. Thus, if the criteria are that a user follows his/her manager and the object is the user's manager, then the first user will follow the object.

In one implementation, a user can also be automatically unsubscribed, e.g., if a certain action happens. The action could be a change in the user's position within the organization, e.g., a demotion or becoming a contractor. As another example, if a case gets closed, then users following the case may be automatically unsubscribed.

B. Feed and Subscription API

In one implementation, a feed and subscription center API can enable tenants to provide mechanisms for tracking and creating feed items, e.g., as described above for creating custom feeds by allowing users to add custom events for tracking. For example, after some initial feed items are created (e.g., by administrators of the database system), outside groups (e.g., tenants or software providers selling software to the tenants) can 'enable objects' for feeds through a standard API. The groups can then integrate into the subscription center and the feed tracked update feeds on their own. In one implementation, the feed and subscription center API can use a graphical user interface implemented for the default feed tracking. In one implementation, API examples include subscribing to an entity by creating a new entity subscription object for a particular user ID, or for all users of a tenant (e.g., user subscription table 940). In one implementation, obtaining all subscriptions for a given user can be performed by using a query, such as "select . . . from EntitySubscription where userid=' . . . '".

Some implementations have restriction on non-admin users, e.g., those without view all data permissions (VAD). One restriction can be a limit clause on entity subscription queries (e.g., queries on user subscription table 940), e.g., where the limit of the number of operations is less than 100. In one implementation, users are not required to specify an order-by, but if an order-by is specified they can only order on fields on the entity subscription entity. In one implementation, filters on entity subscription can likewise only specify fields on the entity subscription entity. In one aspect, the object ID being followed can be sorted or filtered, but not the object name.

In one implementation, one or more restrictions can also be placed on the identification of feed items in a feed that a user can access. For example, if a low-level user (i.e. user can access few objects) is attempting to see a profile feed of a high level user, a maximum number of checks (e.g., 500) for access rights may be allowed. Such a restriction can minimize a cost of a feed request. In some implementations, there are restriction on the type of queries (e.g., fields for filtering) allowed to construct on feeds (e.g., on tables in FIG. 9A).

C. Sharing

As mentioned above, users may be restricted from seeing records from other tenants, as well as certain records from the tenant to which the user belongs (e.g., the user's employer). Sharing rules can refer to the access rules that restrict a user from seeing records that the user is not authorized to see or access. Additionally, in one implementation, a user may be restricted to only seeing certain fields of a record, field-level security (FLS).

In an implementation, access rule checks are done upon subscription. For example, a user is not allowed to subscribe to a record or type of record that the user cannot access. In one aspect, this can minimize (but not necessarily eliminate) cases where a user subscribes to entities they cannot access. Such cases can slow down news feed queries, when an access check is performed (which can end up removing much of the feed items). Thus, a minimization of access checks can speed up operation. In another implementation, when feed items are created dynamically, access rule checks may be done dynamically at the time of subsequent access, and not upon subscription or in addition to at time of subscription.

An example case where access checks are still performed is when a first user follows a second user, but the second user performs some actions on records or is following records that the first user is not allowed to see. The first user may be allowed to follow the second user, and thus the subscription is valid even though the first user may not be able to see all of the feed items. Before a feed tracked update is provided to a news feed of the first user, a security check may be performed to validate whether the first user has access rights to the feed item. If not, the feed item is not displayed to the first user. In one implementation, users can be blocked from feed items that contain certain terms, symbols, account numbers, etc. In one implementation, any user can follow another user. In another implementation, users may be restricted as to which users, objects, and/or records he/she can follow.

Regarding viewing privileges of a feed, in one implementation, a user can see all of his own subscriptions (even if he's lost read access to a record). For example, a user can become a contractor, and then the user may lose access to some records. But, the user may still see that he/she is following the object. This can help if there is a limit to the number of objects that can be followed. To unsubscribe a user may need to know what they are following so they can unsubscribe and subscribe to objects the user can see. In another implementation, for access to other people's subscriptions, a user can be required to need read-access on the record-id to see the subscription. In some implementations, users with authorization to modify all data can create/delete any subscription. In other implementations, a user can create/delete subscriptions only for that user, and not anyone else.

D. Configuration of which Field to Follow

There can be various feed settings for which feed items get added to profile and record feeds, and which get added to news feeds. In one implementation, for profile feeds and entity feeds, feed tracked updates can be written for all standard and custom fields on the supported objects. In one implementation, feed settings can be set to limit how many and which fields of a record are tracked for determining whether a feed tracked update is to be generated. For example, a user or administrator can choose specific fields to track and/or certain ones not to track. In another implementation, there is a separate limit for the number of trackable fields (e.g., 20) for a record. Thus, only certain changes may be tracked in an entity feed tracked update and show up in the feed. In yet another implementation, default fields may be chosen for tracking, where the defaults can be exposed in the subscriptions center.

IX. Adding Items to a Feed

As described above, a feed includes feed items, which include feed tracked updates and messages, as defined herein. Various feeds can be generated. For example, a feed can be generated about a record or about a user. Then, users can view these feeds. A user can separately view a feed of a record or user, e.g., by going to a home page for the user or the record. As described above, a user can also follow another user or record and receive the feed items of those feeds through a separate feed application (e.g., in a page or window), which is termed "chatter" in certain examples. The feed application can provide each of the feeds that a user is following and, in some examples, can combine various feeds in a single information feed.

A feed generator can refer to any software program running on a processor or a dedicated processor (or combination thereof) that can generate feed items (e.g., feed tracked updates or messages) and combine them into a feed. In one implementation, the feed generator can generate a feed item by receiving a feed tracked update or message, identifying what feeds the item should be added to, and adding the feed. Adding the feed can include adding additional information (metadata) to the feed tracked update or message (e.g., adding a document, sender of message, a determined importance, etc.). The feed generator can also check to make sure that no one sees feed tracked updates for data that they don't have access to see (e.g., according to sharing rules). A feed generator can run at various times to pre-compute feeds or to compute them dynamically, or combinations thereof.

In one implementation, the feed generator can de-dupe events (i.e. prevent duplicates) that may come in from numerous records (and users). For example, since a feed tracked update can be published to multiple feeds (e.g., John Choe changed the Starbucks Account Status) and a person can be subscribed to both the Starbucks account and John Choe, implementations can filter out duplicates before adding or displaying the items in a news feed. Thus, the Feed Generator can collapse events with multiple records and users for a single transaction into a single feed tracked update and ensure the right number of feed tracked updates for the particular feed. In some implementations, an action by a user does not create a feed item for that user (e.g., for a profile feed of that user), and it is only the feed of the object being acted upon (e.g., updated) for which a feed item is created. Thus, there should not be duplicates. For example, if someone updates the status of a record, the feed item is only for the record and not the user.

In one implementation, processor 417 in FIG. 4 can identify an event that meets criteria for a feed tracked update, and then generate the feed tracked update. Processor 417 can also identify a message. For example, an application interface can have certain mechanisms for submitting a message (e.g., "submit" buttons on a profile page, detail page of a record, "comment" button on post), and use of these mechanisms can be used to identify a message to be added to a table used to create a feed or added directly to a list of feed items ready for display.

A. Adding Items to a Pre-Computed Feed

In some implementations, a feed of feed items is created before a user requests the feed. Such an implementation can run fast, but have high overall costs for storage. In one implementation, once a profile feed or a record feed has been created, a feed item (messages and feed tracked updates) can be added to the feed. The feed can exist in the database system in a variety of ways, such as a related list. The feed can include mechanisms to remove items as well as add them.

As described above, a news feed can be an aggregated feed of all the record feeds and profile feeds to which a user has subscribed. The news feed can be provided on the home page of the subscribing user. Therefore, a news feed can be created by and exist for a particular user. For example, a user can subscribe to receive entity feeds of certain records that are of interest to the user, and to receive profile feeds of people that are of interest (e.g., people on a same team, that work for the user, are a boss of the user, etc.). A news feed can tell a user about all the actions across all the records (and people) whom have explicitly (or implicitly) been subscribed to via the subscriptions center (described above).

In one implementation, only one instance of each feed tracked update is shown on a user's news feed, even if the feed tracked update is published in multiple entities to which the user is subscribed. In one aspect, there may be delays in publishing news articles. For example, the delay may be due to queued up messages for asynchronous entity feed tracked update persistence. Different feeds may have different delays (e.g., delay for new feeds, but none of profile and entity feeds). In another implementation, certain feed tracked updates regarding a subscribed profile feed or an entity feed are not shown because the user is not allowed access, e.g., due to sharing rules (which restrict which users can see which data). Also, in one implementation, data of the record that has been updated (which includes creation) can be provided in the feed (e.g., a file or updated value of a feed can be added as a flash rendition). Examples are provided below as how it can be determined which feed items to add to which news feeds. In one implementation, the addition of items to a news feed is driven by the following user. For example, the user's profile can be checked to determine objects the user is following, and the database may be queried to determine updates to these objects. In another implementation, the users and records being followed drive the addition of items to a news feed. Implementations can also combine these and other aspects. In one implementation, a database system can be follower-driven if the number of subscriptions (users and records the user is following) is small. For example, since the number subscriptions are small, then changes to a small number of objects need to be checked for the follower.

Regarding implementations that are follower-driven, one implementation can have a routine run for a particular user. The routine knows the users and records that the user is following. The routine can poll the database system for new feed tracked updates and messages about the users and records that are being followed. In one implementation, the polling can be implemented as queries. In one implementation, the routine can run at least partially (even wholly) on a user device.

Regarding implementations where a news feed is driven by the record (or user) being followed, processor 417 can identify followers of the record after a feed item is added to the record feed. Processor 417 can retrieve a list of the followers from the database system. The list can be associated with the record, and can be stored as a related list or other object that is a field or child of the record.

In one implementation, profile and record feeds can be updated immediately with a new feed item after an action is taken or an event occurs. A news feed can also be updated immediately. In another implementation, a news feed can be updated in batch jobs, which can run at periodic times.

B. Dynamically Generating Feeds

In some implementations, a feed generator can generate the feed items dynamically when a user requests to see a particular feed, e.g., a profile feed, entity feed, or the user's news feed. In one implementation, the most recent feed items (e.g., top 50) are generated first. In one aspect, the other feed items can be generated as a background process, e.g., not synchronously with the request to view the feed. However, since the background process is likely to complete before a user gets to the next 50 feed items, the feed generation may appear synchronous. In another aspect, the most recent feed items may or may not include comments, e.g., that are tied to feed tracked updates or posts.

In one implementation, the feed generator can query the appropriate subset of tables shown in FIG. 9A and/or other tables as necessary, to generate the feed items for display. For example, the feed generator can query the event history table 910 for the updates that occurred for a particular record. The ID of the particular record can be matched against the ID of the record. In one implementation, changes to a whole set of records can be stored in one table. The feed generator can also query for status updates, posts, and comments, each of which can be stored in different parts of a record or in separate tables, as shown in FIG. 9A. What gets recorded in the entity event history table (as well as what is displayed) can be controlled by a feed settings page in setup, which can be configurable by an administrator and can be the same for the entire organization, as is described above for custom feeds.

In one implementation, there can be two feed generators. For example, one generator can generate the record and profile feeds and another generator can generate news feeds. For the former, the feed generator can query identifiers of the record or the user profile. For the latter, the news feed generator can query the subscribed profile feeds and record feeds, e.g., user subscription table 940. In one implementation, the feed generator looks at a person's subscription center to decide which feeds to query for and return a list of feed items for the user. The list can be de-duped, e.g., by looking at the event number and values for the respective table, such as field name or ID, comment ID, or other information.

C. Adding Information to Feed Tracked Update Tables

Figure 10:
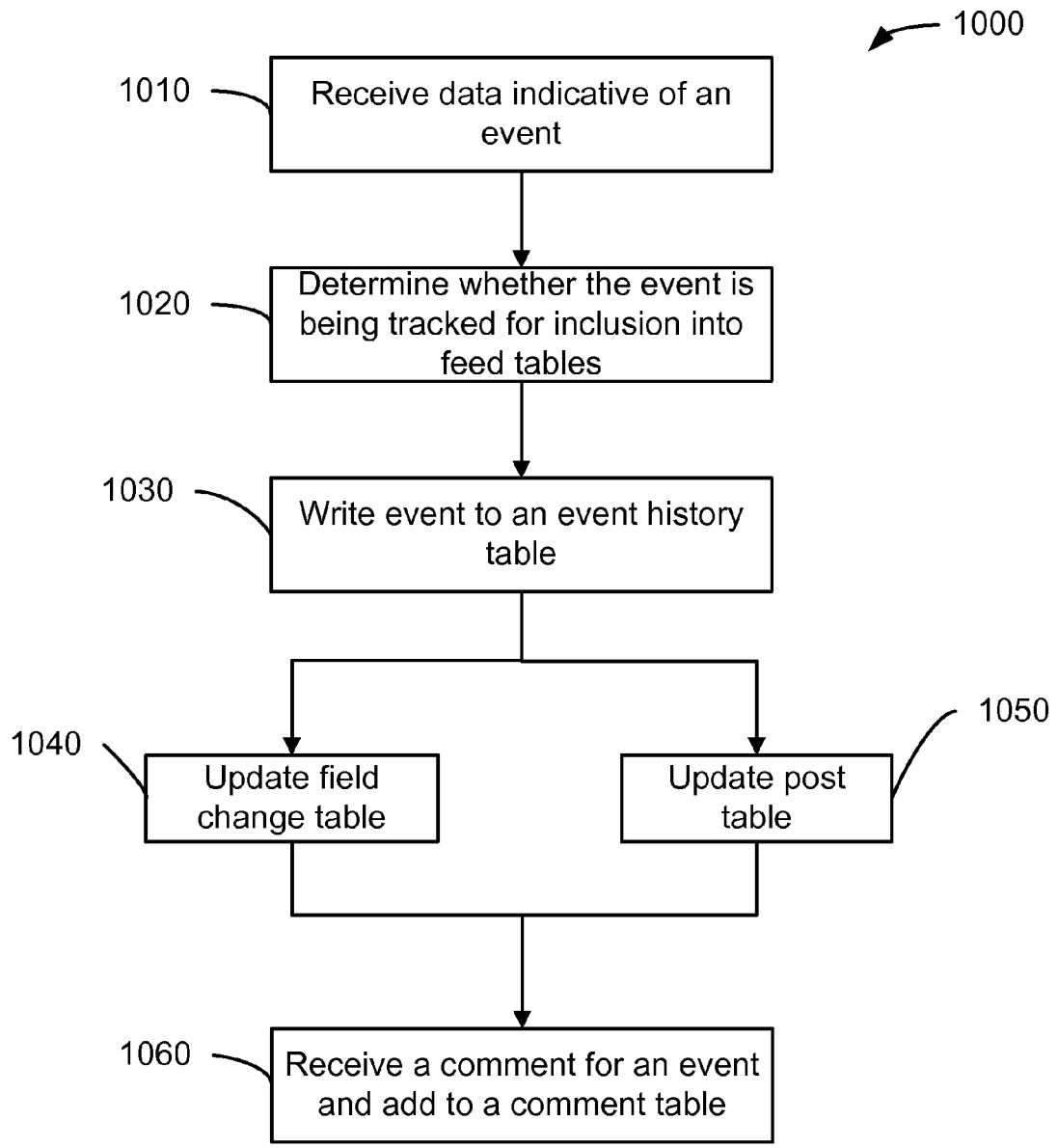
FIG. 10 shows a flowchart of an example of a method 1000 for saving information to feed tracking tables, performed in accordance with some implementations.

FIG. 10 shows a flowchart of an example of a method 1000 for saving information to feed tracking tables, performed in accordance with some implementations. In one implementation, some of the blocks may be performed regardless of whether a specific event or part of an event (e.g., only one field of an update is being tracked) is being tracked. In various implementations, a processor or set of processors (hardwired or programmed) can perform method 1000 and any other method described herein.

In block 1010, data indicative of an event is received. The data may have a particular identifier that specifies the event. For example, there may be a particular identifier for a field update. In another implementation, the transaction may be investigated for keywords identifying the event (e.g., terms in a query indicating a close, change field, or create operations).

In block 1020, it is determined whether the event is being tracked for inclusion into feed tracked update tables. The determination of what is being tracked can be based on a tenant's configuration as described above. In one aspect, the event has an actor (person performing an event), and an object of the event (e.g., record or user profile being changed).

In block 1030, the event is written to an event history table (e.g., table 910). In one implementation, this feed tracking operation can be performed in the same transaction that performs a save operation for updating a record. In another implementation, a transaction includes at least two roundtrip database operations, with one roundtrip being the database save (write), and the second database operation being the saving of the update in the feed tracked update table. In one implementation, the event history table is chronological. In another implementation, if user A posts on user B's profile, then user A is under the "created by" 913 and user B is under the object ID 912.

In block 1040, a field change table (e.g., field change table 920) can be updated with an entry having the event identifier and fields that were changed in the update. In one implementation, the field change table is a child table of the event history table. This table can include information about each of the fields that are changed. For example, for an event that changes the name and balance for an account record, an entry can have the event identifier, the old and new name, and the old and new balance. Alternatively, each field change can be in a different row with the same event identifier. The field name or ID can also be included to determine which field the values are associated.

In block 1050, when the event is a post, a post table (e.g., post table 950) can be updated with an entry having the event identifier and text of the post. In one implementation, the field change table is a child table of the event history table. In another implementation, the text can be identified in the transaction (e.g., a query command), stripped out, and put into the entry at the appropriate column. The various tables described herein can be combined or separated in various ways. For example, the post table and the field change table may be part of the same table or distinct tables, or may include overlapping portions of data.

In block 1060, a comment is received for an event and the comment is added to a comment table (e.g., comment table 930). The comment could be for a post or an update of a record, from which a feed tracked update can be generated for display. In one implementation, the text can be identified in the transaction (e.g., a query command), stripped out, and put into the entry at the appropriate column.

D. Reading Information from Feed Tracked Update Tables

Figure 11:
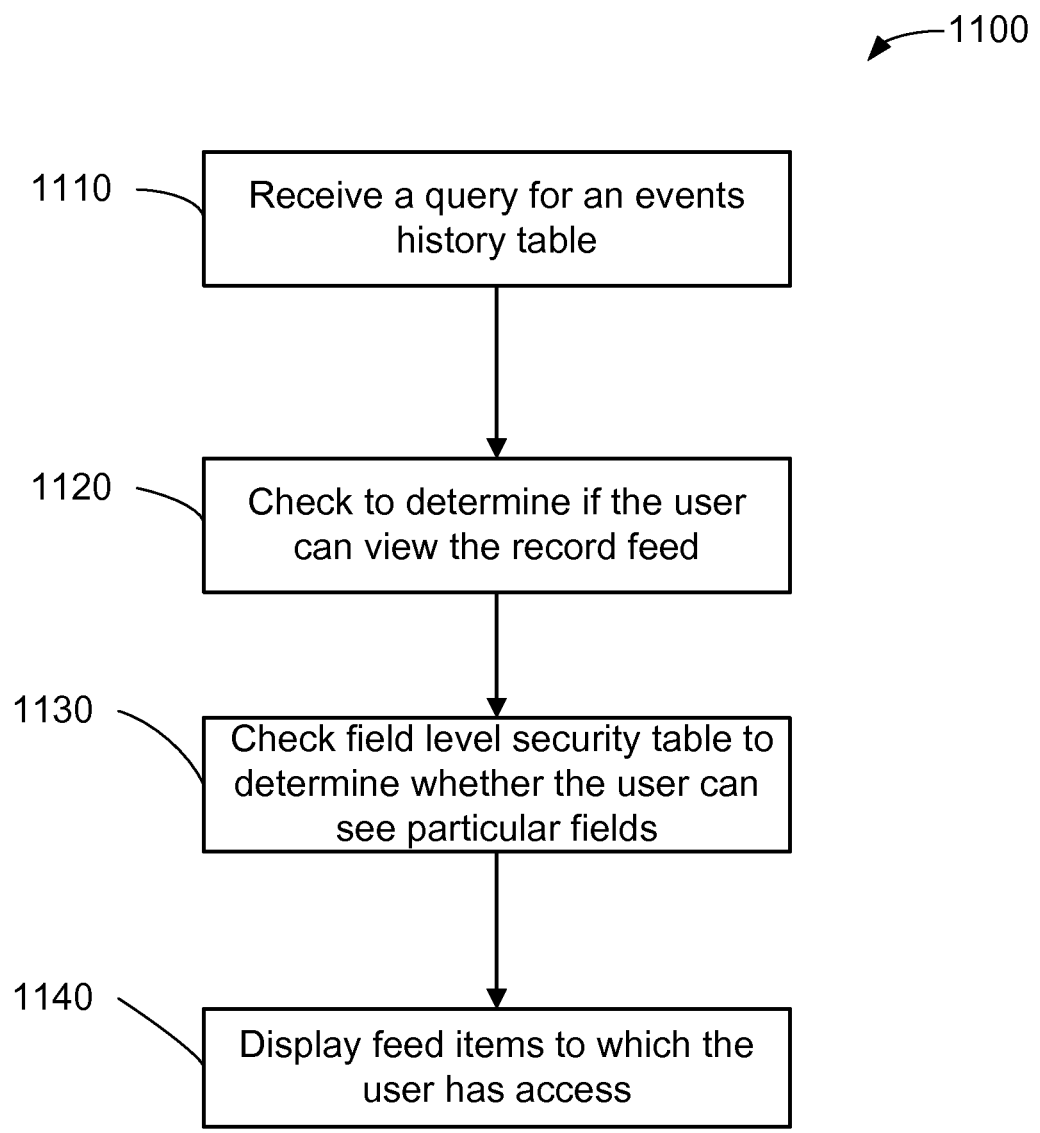
FIG. 11 shows a flowchart of an example of a method 1100 for reading a feed item as part of generating a feed for display, performed in accordance with some implementations.

FIG. 11 shows a flowchart of an example of a method 1100 for reading a feed item as part of generating a feed for display, performed in accordance with some implementations. In one implementation, the feed item may be read as part of creating a feed for a record.

In block 1110, a query is received for an events history table (e.g., event history table 910) for events related to a particular record. In one implementation, the query includes an identifier of the record for which the feed is being requested. In various implementations, the query may be initiated from a detail page of the record, a home page of a user requesting the record feed, or from a listing of different records (e.g., obtained from a search or from browsing).

In block 1120, the user's security level can be checked to determine if the user can view the record feed. Typically, a user can view a record feed, if the user can access the record. This security check can be performed in various ways. In one implementation, a first table is checked to see if the user has a classification (e.g., a security level that allows him to view records of the given type). In another implementation, a second table is checked to see if the user is allowed to see the specific record. The first table can be checked before the second table, and both tables can be different sections of a same table. If the user has requested the feed from the detail page of the record, one implementation can skip the security level check for the record since the check was already done when the user requested to view the detail page.

In one implementation, a security check is determined upon each request to view the record feed. Thus, whether or not a feed item is displayed to a user is determined based on access rights, e.g., when the user requests to see a feed of a record or a news feed of all the objects the user is following. In this manner, if a user's security changes, a feed automatically adapts to the user's security level when it is changed. In another implementation, a feed can be computed before being requested and a subsequent security check can be made to determine whether the person still has access right to view the feed items. The security (access) check may be at the field level, as well as at the record level.

In block 1130, if the user can access the record, a field level security table can be checked to determine whether the user can see particular fields. In one implementation, only those fields are displayed to the user. Alternatively, a subset of those the user has access to is displayed. The field level security check may optionally be performed at the same time and even using the same operation as the record level check. In addition, the record type check may also be performed at this time. If the user can only see certain fields, then any feed items related to those fields (e.g., as determined from field change table 920) can be removed from the feed being displayed.

In block 1140, the feed items that the user has access to are displayed. In one implementation, a predetermined number (e.g., 20) of feed items are displayed at a time. The method can display the first 20 feed items that are found to be readable, and then determine others while the user is viewing the first 20. In another implementation, the other feed items are not determined until the user requests to see them, e.g., by activating a see more link.

Figure 12:
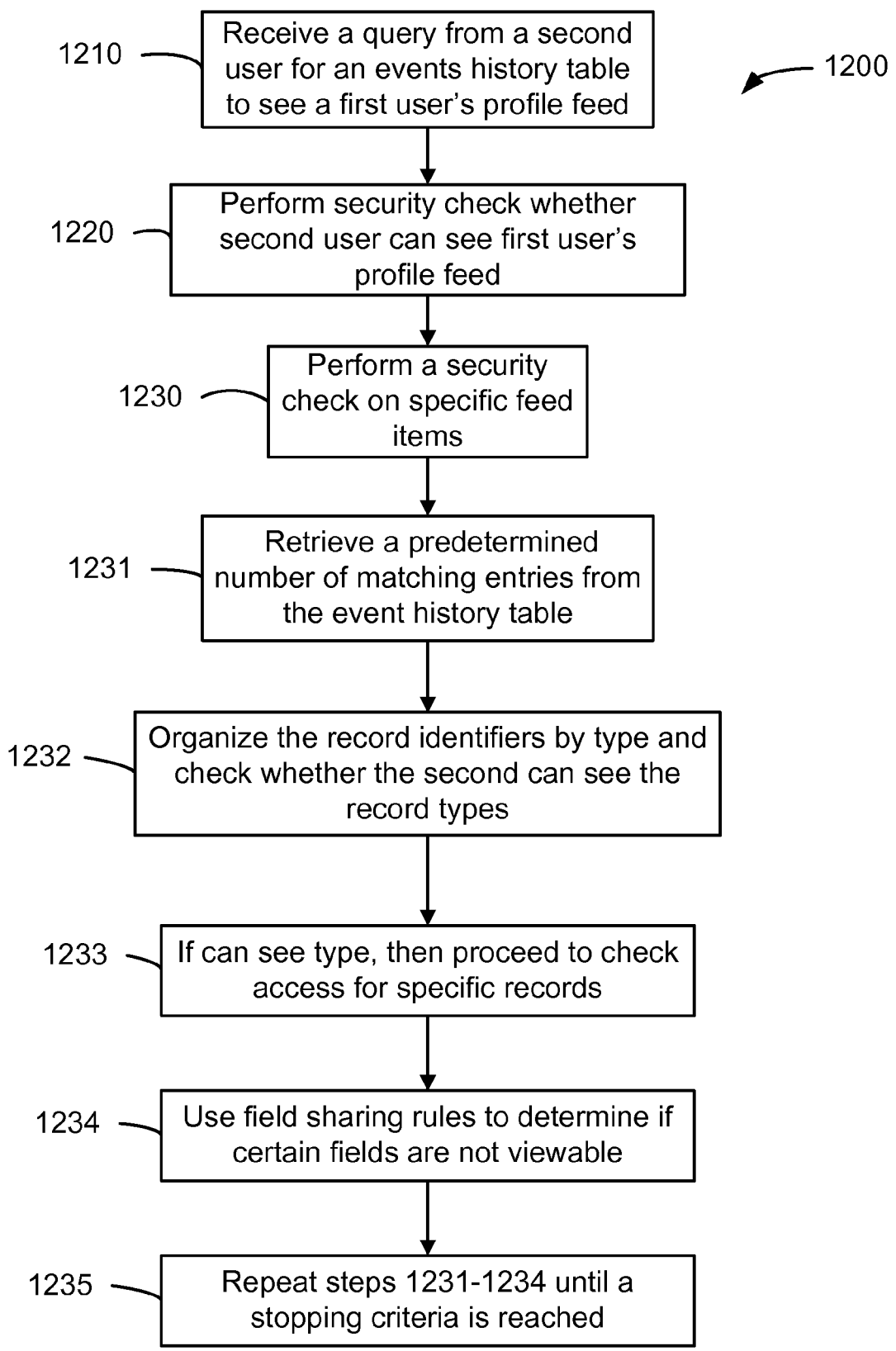
FIG. 12 shows a flowchart of an example of a method 1200 for reading a feed item of a profile feed for display, performed in accordance with some implementations.

FIG. 12 shows a flowchart of an example of a method 1200 for reading a feed item of a profile feed for display, performed in accordance with some implementations. In one implementation, the query includes an identifier of the user profile feed that is being requested. Certain blocks may be optional, as is also true for other methods described herein. For example, security checks may not be performed.

In block 1210, a query is directed to an event history table (e.g., event history table 910) for events having a first user as the actor of the event (e.g., creation of an account) or on which the event occurred (e.g., a post to the user's profile). In various implementations, the query may be initiated by a second user from the user's profile page, a home page of a user requesting the profile feed (e.g., from a list of users being followed), or from a listing of different users (e.g., obtained from a search or from browsing). Various mechanisms for determining aspects of events and obtaining information from tables can be the same across any of the methods described herein.

In block 1220, a security check may also be performed on whether the second user can see the first user's profile. In one implementation any user can see the profile of another user of the same tenant, and block 1220 is optional.

In block 1230, a security (access) check can be performed for the feed tracked updates based on record types, records, and/or fields, as well security checks for messages. In one implementation, only the feed tracked updates related to records that the person has updated are the ones that need security check as the feed items about the user are readable by any user of the same tenant. Users of other tenants are not navigable, and thus security can be enforced at a tenant level. In another implementation, messages can be checked for keywords or links to a record or field that the second user does not have access.

As users can have different security classifications, it is important that a user with a low-level security cannot see changes to records that have been performed by a user with high-level security. In one implementation, each feed item can be checked and then the viewable results displayed, but this can be inefficient. For example, such a security check may take a long time, and the second user would like to get some results sooner rather than later. The following blocks illustrate one implementation of how security might be checked for a first user that has a lot of feed items, but the second user cannot see most of them. This implementation can be used for all situations, but can be effective in the above situation.

In block 1231, a predetermined number of entries are retrieved from the event history table (e.g., starting from the most recent, which may be determined from the event identifier). The retrieved entries may just be ones that match the user ID of the query. In one implementation, entries are checked to find the entries that are associated with the user and with a record (i.e. not just posts to the user account). In another implementation, those entries associated with the user are allowed to be viewed, e.g., because the second user can see the profile of the first user as determined in block 1220.

In block 1232, the record identifiers are organized by type and the type is checked on whether the second user can see the record types. Other checks such as whether a record was manually shared (e.g., by the owner) can also be performed. In one implementation, the queries for the different types can be done in parallel.

In block 1233, if a user can see the record type, then a check can be performed on the specific record. In one implementation, if a user can see a record type, then the user can see all of the records of that type, and so this block can be skipped. In another implementation, the sharing model can account for whether a user below the second user (e.g., the second user is a manager) can see the record. In such an implementation, the second user may see such a record. In one implementation, if a user cannot see a specific record, then comments on that record are also not viewable.

In block 1234, field level sharing rules can be used to determine whether the second user can see information about an update or value of certain fields. In one implementation, messages can be analyzed to determine if reference to a particular field name is made. If so, then field level security can be applied to the messages.

In block 1280, blocks 1231-1234 are repeated until a stopping criterion is met. In one implementation, the stopping criteria may be when a maximum number (e.g., 100) of entries that are viewable have been identified. In another implementation, the stopping criteria can be that a maximum number (e.g., 500) of entries from the entity feed tracked update table have been analyzed, regardless of whether the entries are viewable or not.

In one implementation, a news feed can be generated as a combination of the profile feeds and the entity feeds, e.g., as described above. In one implementation, a list of records and user profiles for the queries in blocks 1110 and 1210 can be obtained form user subscription table 940. In one implementation, there is a maximum number of objects that can be followed.

In various implementations, the entity feed table can be queried for any one or more of the following matching variables as part of determining items for a feed: CreatedDate, CreatedById, CreatedBy.FirstName, CreatedBy.LastName, ParentId, and Parent.Name. The child tables can also be queried for any one or more of the following matching variables as part of determining items for a feed: DataType, FieldName, OldValue, and NewValue. A query can also specify how the resulting feed items can be sorted for display, e.g., by event number, date, importance, etc. The query can also include a number of items to be returned, which can be enforced at the server.

The two examples provided above can be done periodically to create the feeds ahead of time or done dynamically at the time the display of a feed is requested. Such a dynamic calculation can be computationally intensive for a news feed, particularly if many users and records are being followed, although there can be a low demand for storage. Accordingly, one implementation performs some calculations ahead of time and stores the results in order to create a news feed.

E. Partial Pre-Computing of Items for a Feed

Figure 13:
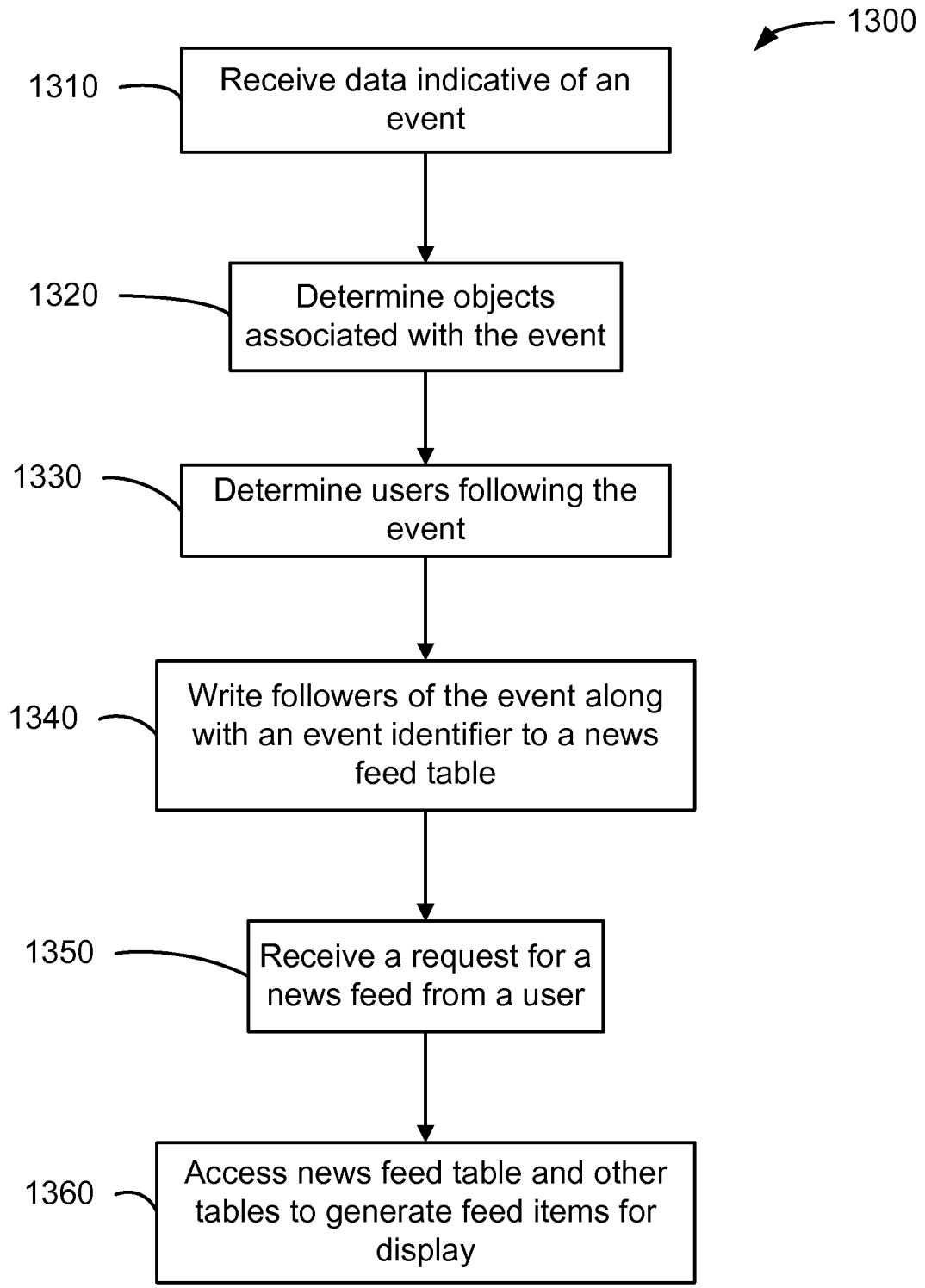
FIG. 13 shows a flowchart of an example of a method 1300 of storing event information for efficient generation of feed items to display in a feed, performed in accordance with some implementations.

FIG. 13 shows a flowchart of an example of a method 1300 of storing event information for efficient generation of feed items to display in a feed, performed in accordance with some implementations. In various implementations, method 1300 can be performed each time an event is written to the event history table, or periodically based on some other criteria (e.g., every minute, after five updates have been made, etc.).

In block 1310, data indicative of an event is received. The data may be the same and identified in the same way as described for block 1010. The event may be written to an event history table (e.g., table 910).

In block 1320, the object(s) associated with the event are identified. In various implementations, the object may be identified by according to various criteria, such as the record being changed, the user changing the record, a user posting a message, and a user whose profile the message is being posted to.

In block 1330, the users following the event are determined. In one implementation, one or more objects that are associated with the event are used to determine the users following the event. In one implementation, a subscription table (e.g., table 940) can be used to find the identified objects. The entries of the identified objects can contain an identifier (e.g., user ID 941) of each the users following the object In block 1340, the event and the source of the event, e.g., a record (for a record update) or a posting user (for a user-generated post) are written to a news feed table along with an event identifier. In one implementation, such information is added as a separate entry into the news feed table along with the event ID. In another implementation, each of the events for a user is added as a new column for the row of the user. In yet another implementation, more columns (e.g., columns from the other tables) can be added.

News feed table 960 shows an example of such a table with user ID 961 and event ID or pointer 962. The table can be organized in any manner. One difference from event history table 910 is that one event can have multiple entries (one for each subscriber) in the news feed table 960. In one implementation, all of the entries for a same user are grouped together, e.g., as shown. The user U819 is shown as following events E37 and E90, and thus any of the individual feed items resulting from those events. In another implementation, any new entries are added at the end of the table. Thus, all of the followers for a new event can be added as a group. In such an implementation, the event IDs would generally be grouped together in the table. Of course, the table can be sorted in any suitable manner.

In an implementation, if the number of users is small, then the feed items in one or more of the tables may be written as part of the same write transaction. In one implementation, the determination of small depends on the number of updates performed for the event (e.g., a maximum number of update operations may be allowed), and if more operations are performed, then the addition of the feed items is performed. In one aspect, the number of operations can be counted by the number of rows to be updated, including the rows of the record (which depends on the update event), and the rows of the feed tracked update tables, which can depend on the number of followers. In another implementation, if the number of users is large, the rest of the feed items can be created by batch. In one implementation, the feed items are written as part of a different transaction, i.e., by batch job.

In one implementation, security checks can be performed before an entry is added to the news feed table 960. In this manner, security checks can be performed during batch jobs and may not have to be performed at the time of requesting a news feed. In one implementation, the event can be analyzed and if access is not allowed to a feed item of the event, then an entry is not added. In one aspect, multiple feed items for a same user may not result from a same event (e.g., by how an event is defined in table 910), and thus there is no concern about a user missing a feed item that he/she should be able to view.

In block 1350, a request for a news feed is received from a user. In one implementation, the request is obtained when a user navigates to the user's home page. In another implementation, the user selects a table, link, or other page item that causes the request to be sent.

In block 1360, the news feed table and other tables are accessed to provide displayable feed items of the news feed. The news feed can then be displayed. In one implementation, the news feed table can then be joined with the event history table to determine the feed items. For example, the news feed table 960 can be searched for entries with a particular user ID. These entries can be used to identify event entries in event history table 910, and the proper information from any child tables can be retrieved. The feed items (e.g., feed tracked updates and messages) can then be generated for display.

In one implementation, the most recent feed items (e.g., 100 most recent) are determined first. The other feed items may then be determined in a batch process. Thus, the feed item that a user is most likely to view can come up first, and the user may not recognize that the other feed items are being done in batch. In one implementation, the most recent feed items can be gauged by the event identifiers. In another implementation, the feed items with a highest importance level can be displayed first. The highest importance being determined by one or more criteria, such as, who posted the feed item, how recently, how related to other feed items, etc.

In one implementation where the user subscription table 940 is used to dynamically create a news feed, the query would search the subscription table, and then use the object IDs to search the event history table (one search for each object the user is following). Thus, the query for the news feed can be proportional to the number of objects that one was subscribing to. The news feed table allows the intermediate block of determining the object IDs to be done at an earlier stage so that the relevant events are already known. Thus, the determination of the feed is no longer proportional to the number of object being followed.

In some implementations, a news feed table can include a pointer (as opposed to an event identifier) to the event history table for each event that is being followed by the user. In this manner, the event entries can immediately be retrieved without having to perform a search on the event history table. Security checks can be made at this time, and the text for the feed tracked updates can be generated.

X. Display of a Feed

Feeds include messages and feed tracked updates and can show up in many places in an application interface with the database system. In one implementation, feeds can be scoped to the context of the page on which they are being displayed. For example, how a feed tracked update is presented can vary depending on which page it is being displayed (e.g., in news feeds, on a detail page of a record, and even based on how the user ended up at a particular page). In another implementation, only a finite number of feed items are displayed (e.g., 50). In one implementation, there can be a limit specifically on the number of feed tracked updates or messages displayed. Alternatively, the limit can be applied to particular types of feed tracked updates or messages. For example, only the most recent changes (e.g., 5 most recent) for a field may be displayed. Also, the number of fields for which changes are displayed can also be limited. Such limits can also be placed on profile feeds and news feeds. In one implementation, feed items may also be subject to certain filtering criteria before being displayed, e.g., as described below.

A. Sharing Rules for Feeds

As mentioned above, a user may not be allowed to see all of the records in the database, and not even all of the records of the organization to which the user belongs. A user can also be restricted from viewing certain fields of a record that the user is otherwise authorized to view. Accordingly, certain implementations use access rules (also called sharing rules and field-level security FLS) to ensure that a user does not view a feed tracked update or message that the user is not authorized to see. A feed of a record can be subject to the same access rules as the parent record.

In one implementation, access rules can be used to prevent subscription to a record that the user cannot see. In one implementation, a user can see a record, but only some of the fields. In such instances, only items about fields that the user can access may be displayed. In another implementation, sharing rules and FLS are applied before a feed item is being added to a feed. In another implementation, sharing rules and FLS are applied after a feed item has been added and when the feed is being displayed. When a restriction of display is mentioned, the enforcement of access rules may occur at any stage before display.

In some implementations, the access rules can be enforced when a query is provided to a record or a user's profile to obtain feed items for a news feed of a user. The access rules can be checked and cross-references with the feed items that are in the feed. Then, the query can only return feed items for which the user has access.

In other implementations, the access rules can be enforced when a user selects a specific profile feed or record feed. For example, when a user arrives on a home page (or selects a tab to see the record feed), the database system can check to see which feed items the user can see. In such an implementation, each feed item can be associated with metadata that identifies which field the feed item is about. Thus, in one implementation, a feed tracked update is not visible unless the associated record and/or field are visible to the user.

In one example, when a user accesses a feed of a record, an access check can be performed to identify whether the user can access the object type of the record. In one implementation, users are assigned a profile type, and the profile type is cross-referenced (e.g., by checking a table) to determine whether the profile type of the user can see the object type of the record.

In some implementations, access to specific records can be checked, e.g., after it has been determined that the user can access the record type. Rules can be used to determine the records viewable by a user. Such rules can determine the viewable records as a combination of those viewable by profile type, viewable due to a profile hierarchy (e.g., a boss can view records of profile types lower in the hierarchy), and viewable by manual sharing (e.g., as may be done by an owner of a record). In one implementation, the records viewable by a user can be determined beforehand and stored in a table. In one implementation, the table can be cross-referenced by user (or profile type of a user) to provide a list of the records that the user can see, and the list can be searched to determine if the record at issue is among the list. In another implementation, the table can be cross-referenced by record to determine a list of the profile types that can access the record, and the list can be searched to find out if the requesting user is in the list. In another implementation, the records viewable by a user can be determined dynamically at the time of the access check, e.g., by applying rules to data (such as user profile and hierarchy information) obtained from querying one or more tables.

In other implementations, checks can be made as to whether a user has access to certain fields of a record, e.g., after it has been determined that the user can access the record. In one aspect, the access check on fields can be performed on results already obtained from the database, to filter out fields that the user cannot see. In one implementation, the fields associated with retrieved feed items are determined, and these fields are cross-referenced with an access table that contains the fields accessible by the user (e.g., using the profile type of the user). Such an access table could also be a negative access table by specifying fields that the user cannot see, as can other access tables mentioned herein. In one implementation, the field level access table is stored in cache at a server.

In one implementation, a user can see the same fields across all records of a certain type (e.g., as long as the user can see the record). In one implementation, there is a field level access table for each object type. The access table can be cross-referenced by user (e.g., via profile type) or field. For example, a field can be identified along with the profile types that can see the field, and it can be determined whether the user's profile type is listed. In another example, the user can be found and the fields to which the user has access can be obtained. In another implementation, the accessible fields could be specified for each record.

Regarding profile feeds and news feeds, a first user may perform an action on a record, and a feed tracked update may be generated and added to the first user's profile feed. A second user who is allowed to follow the first user may not have access rights to the record. Thus, the feed tracked update can be excluded from a news feed of the second user, or when the second user views the first user's profile feed directly. In one implementation, if a user is already on the detail page, then another access check (at least at the record level) may optionally not be performed since a check was already done in order to view the detail page.

In some implementations, for profile feeds and news feeds, the feed items can be organized by object type. IT can then be determined whether the requesting user can access to those object types. Other access checks can be done independently or in conjunction with these access checks, as is described above.

B. API Implementation

Various implementations can implement the access rules in various ways. In one implementation, all recent feed items (or more generally events) are retrieved from a feed that is ready for display (e.g., after a feed generator performs formatting)

or a table. Then, bulk sharing checks can be applied on the retrieved items. The viewable feed items of the most recent set can then be displayed.

In another implementation regarding a profile feed, for non-VAD (view all data) users, i.e. users who can see everything, certain functions can be overridden. In one implementation, a FROM clause in a query can be overridden to be a pipelined function, e.g., with different parts of the query being operated on at the same time, but with different operations of a pipeline. This pipeline function can be given a row limit and the maximum number of sharing checks to run. It can loop, selecting the next batch of rows, run sharing checks against them in bulk, and pipe back any IDs which are accessible. In one aspect, in nearly all cases, the user feed can contain accessible IDs so the sharing checks can pass on the first loop. However, it is possible the sharing may have changed such that this user's access is greatly reduced. In one worst case, implementations can run sharing checks on up to the maximum number of sharing check rows (e.g., a default 500) and then terminate the function with the IDs which passed so far, possibly zero. Such an example includes a low level person viewing profile feed of CEO.

In some implementations, if the user has a small number of subscriptions (e.g., <25), then implementations can first run sharing checks on those IDs and then drive the main query from those accessible IDs, as opposed to a semi-join against the subscription and running sharing checks on the resulting rows. In other implementations, FLS is enforced by building up a TABLE CAST of the accessible field IDs from the cached values. A main query can then join against this table to filter only accessible fields.

XI. Filtering and Searching Feeds

It can be possible that a user subscribes to many users and records, which can cause a user's news feed to be very long and include many feed items. In such instances, it can be difficult for the user to read every feed item, and thus some important or interesting feed items may not be read. In some implementations, filters may be used to determine which feed items are added to a feed or displayed in the feed, even though a user may be authorized to see more than what is displayed. Section VII.E also provides a description of filtering based on criteria.

In one implementation, an "interestingness" filter can function as a module for controlling/recommending which feed tracked updates make it to the news feed when the number of items that a user subscribes to is large. In one such implementation, a user can specify a filter, which is applied to a user's news feed or to record and profile feeds that the user requests. Different filters can be used for each. For example, processing can be done on the news feed to figure out which feed tracked updates are the most relevant to the user. One implementation can use an importance weight and level/ranking, as described herein. Other implementations can include a user specifying keywords for a message and specifying which records or users are most important.

In one implementation, a filter can be used that only allows certain feed items to be added to a feed and/or to be displayed as part of a feed. A filter can be used such that the removal or non-addition of certain feed items automatically occur for any new feed items after the filter criteria are entered. The filter criteria can also be added retroactively. The criteria of such a filter can be applied via a query mechanism as part of adding a feed item to a table or displaying a feed, as described in sections above. In various implementations, a user can directly write a query or create the query through a graphical user interface.

Figure 14:
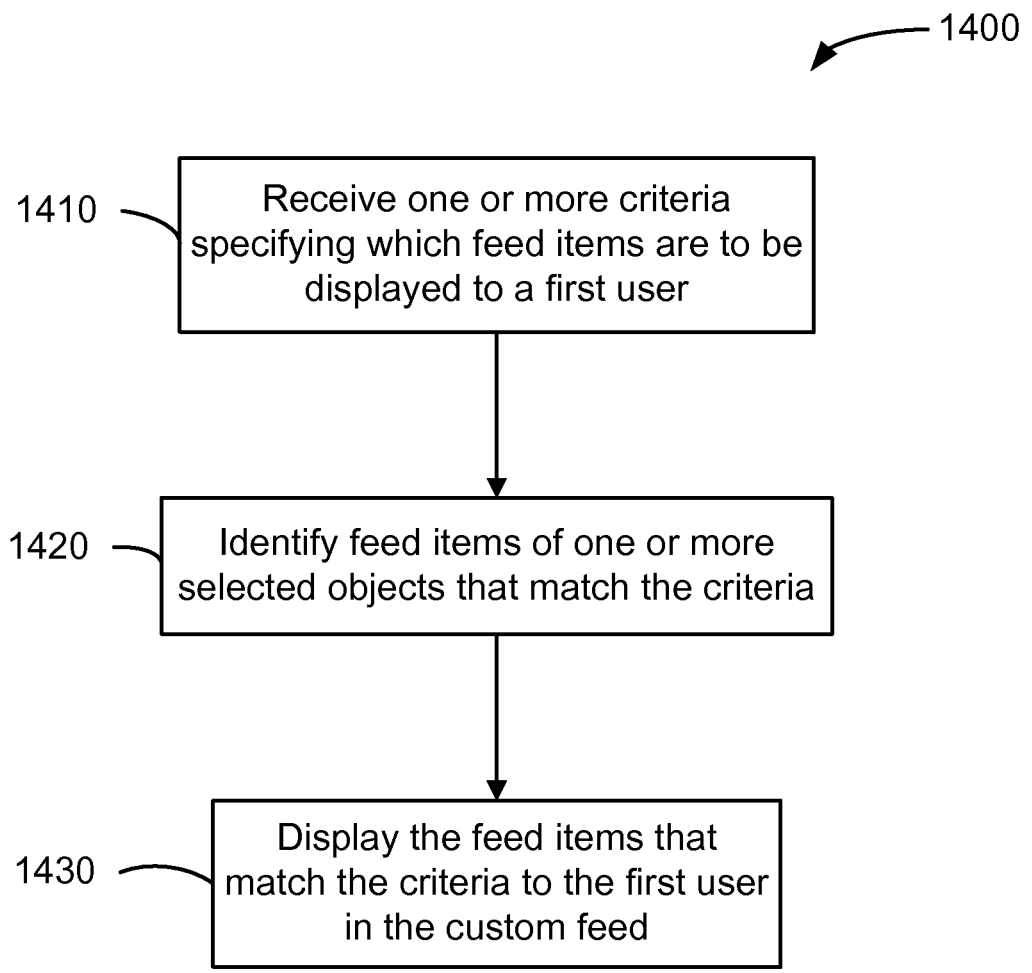
FIG. 14 shows a flowchart of an example of a method 1400 for creating a custom feed for users of a database system using filtering criteria, performed in accordance with some implementations.

FIG. 14 shows a flowchart of an example of a method 1400 for creating a custom feed for users of a database system using filtering criteria, performed in accordance with some implementations. Any of the following blocks can be performed wholly or partially with the database system, and in particular by one or more processor of the database system.

In block 1410, one or more criteria specifying which feed items are to be displayed to a first user are received from a tenant. In one implementation, the criteria specifies which items to add to the custom feed. For example, the criteria could specify to only include feed items for certain fields of a record, messages including certain keywords, and other criteria mentioned herein. In another implementation, the criteria specifies which items to remove from the custom feed. For example, the criteria could specify not to include feed items about certain fields or including certain keywords.

In block 1420, the database system identifies feed items of one or more selected objects that match the criteria. The feed items can be stored in the database, e.g., in one or more of the tables of FIG. 9A. In one implementation, the one or more selected objects are the objects that the first user is following. In another implementation, the one or more selected objects is a single record whose record feed the first user is requesting.

In block 1430, the feed items that match the criteria are displayed to the first user in the custom feed. The generation of text for a feed tracked update can occur after the identification of the feed items (e.g., data for a field change) and before the display of the final version of the feed item.

In one implementation, the criteria are received before a feed item is created. In another implementation, the criteria are received from the first user. In one aspect, the criteria may only used for determining feeds to display to the first user. In yet another implementation, the criteria are received from a first tenant and applies to all of the users of the first tenant. Also, in an implementation where a plurality of criteria are specified, the criteria may be satisfied for a feed item if one criterion is satisfied.

Some implementations can provide mechanisms to search for feed items of interest. For example, the feed items can be searched by keyword, e.g., as entered by a user. As another example, a tab (or other selection device) can show feed items about or from a particular user. In one implementation, only messages (or even just comments) from a particular user can be selected.

In another implementation, a user can enter search criteria so that the feed items currently displayed are searched and a new list of matching feed items is displayed. A search box can be used to enter keywords. Picklists, menus, or other mechanisms can be used to select search criteria. In yet another implementation, feed comments are text-indexed and searchable. Feed comments accessibility and visibility can apply on the search operation too.

In one implementation, when a user performs a search of feeds, there can be an implicit filter of the user (e.g., by user ID). This can restrict the search to only the news feed of the user, and thus to only record feeds and profile feeds that the user is subscribed. In another implementation, searches can also be done across feeds of users and records that are not being subscribed.

Besides searching for feed items that match a criteria, one also could search for a particular feed item. However, in one implementation, a user cannot directly query a feed item or feed comment. In such an implementation, a user can query to obtain a particular profile or record feed, and then navigate to the feed item (e.g., as child of the parent feed). In another implementation, the relationship from a feed to its parent entity (e.g., a record or user profile) is uni-directional. That is a user can navigate from the feed to the parent but not vice versa.

In one implementation, a user can directly query the child tables, e.g., comment table 930. Thus, a user could search for comments only that user has made, or comments that contain certain words. In another implementation, a user can search for a profile feed of only one user. In yet another implementation, a user can search for profile feeds of multiple users (e.g., by specifying multiple user names or IDs), which can be combined into a single feed.

XII. Maintaining Records for Follower's Feeds

If every feed item is stored and maintained on a follower's feed or even in the profile and/or record feeds, the amount of data to be stored could be massive, enough to cause storage issues in the system. In one implementation, the N (e.g., 50) most recent feed items for each feed are kept. However, there can be a need to keep certain older feed items. Thus, implementations can remove certain feed items, while keeping others. In other implementations, old feed tracked updates may be archived in a data store separate from where recent feed items are stored.

In some implementations, feeds are purged by a routine (also called a reaper) that can remove items deemed not worthy to keep (e.g., old items). Any underlying data structures from which feed items are created can also be purged. In one implementation, the reaper can remove certain items when new items are added (e.g., after every 5th item added). As another example, feed items may be deleted synchronously during the save operation itself. However, this may slow down each save operation. In one implementation, however, this may be better than incurring a larger cost when the items are removed at longer intervals. In another implementation, the reaper can run periodically as a batch process. Such routines can ensure that a table size does not become too large. In one aspect, a reaper routine can keep the event history table relatively small so the sharing checks are not extremely expensive.

In various implementations, the reaper can maintain a minimum number (e.g., 50 or 100) of feed items per record, maintain a minimum number of records per user (e.g., per user ID), and not deleting feed items (or entire records), which have comments against it. Such implementations can ensure that the detail page and profile page have sufficient data to display in a feed. Note that the sharing checks for feed queries can cut down the number of records further for users with less access. Thus, the number of records finally displayed for specific users can be significantly less than a minimum number for a specific profile or record feed. In one implementation, a reaper deletes data that is older than a specified time (e.g., 6 months or a year).

In one implementation, the reaper can perform the deletion of feed items (purging) as a batch up deletion. This can avoid deletion of large number of records that may lead to locking issues. In another implementation, the reaper can be run often so that the table does not become difficult to manage (e.g., size-wise). In this way the reaper can work on a limited set of records. In one implementation, the reaper may have logic that deletes certain items (e.g., by an identification) from tables (e.g., those in FIG. 9A), or sections of the tables.

XIII. Processing a Preference Indication for a Feed Item in an Information Feed

Some implementations disclosed herein provide mechanisms to configure and perform custom rules, described in greater detail below, to execute one or more actions to process a preference indication for a feed item in an information feed. A custom rule may be configured to process a variety of preference indications, such as a selection of a like button, a selection of an unlike button, detecting an information update and/or comment including keywords, or any other indication that an entity endorses information associated with a feed item.

In some implementations, a custom rule may be configured to process a preference indication based on a content type of a feed item. When a preference indication is received for a feed item including a specified content type, then one or more actions designated by the custom rule are performed. In some instances, the content type of a feed item may be determined by querying a database for information associated with a feed item. In other instances, a message including a unique identifier may be communicated from a client device to one more servers when a preference indication is transmitted to the one or more servers. The unique identifier may include information of the content type of the feed item.

The content type of a feed item may be any defined category of information that activates the custom rule to perform one or more actions in response to receiving a preference indication for a feed item. The content type may be specified by a menu selection, by custom code, or by any other mechanism.

In some implementations, a custom rule may be configured and performed to process a preference indication based on information associated with an entity. An entity may be a user, a group, a record, or other construct in the online social network, as described in the examples herein. When a preference indication is received from an entity associated with designated information, then one or more actions designated by the custom rule are performed. The entity information may be specified by menu selection, by custom code, or by any other mechanism.

In some implementations, a custom rule may be configured to perform one or more actions in response to receiving a preference indication for a feed item. The one or more actions are performed when it is determined that a feed item is associated with the custom rule. A feed item is determined to be associated with a custom rule if the feed item includes information, such as a content type, specified by the custom rule. In other instances, a feed item is associated with a custom rule based on entity information or based on a combination of entity information and the content type of a feed item. The one or more action may include any operation or activity within the social networking system or within a larger computing services environment associated with the feed item. The one or more actions may be specified by a menu selection, by custom code, or by any other mechanism.

In some implementations, a custom rule may be configured to perform one or more actions to modify information of a feed item associated with a preference indication and modify information of further feed items in a social networking system. For instance, the one or more actions may be performed when it is determined that the feed item associated with the preference indication is related to further feed items in the social networking system. A relationship between the feed items may be based on various types of information, such as based on the content types of the feed items, based on a user's profile information or a user's historical search information. The operations to determine a relationship among feed items may be specified by a menu selection, by custom code, or by any other mechanism.

Figure 15:
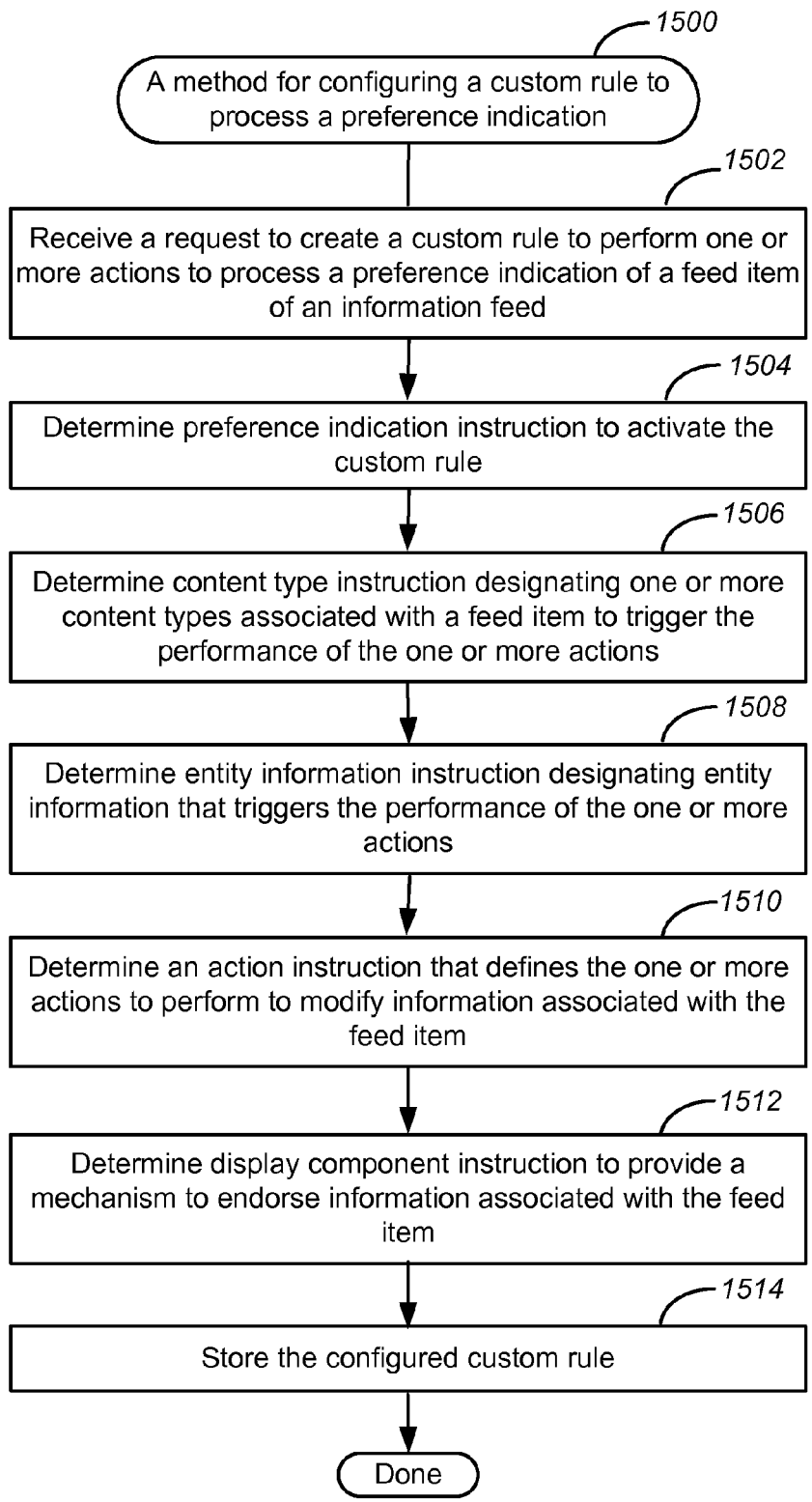
FIG. 15 shows a flow diagram of an example of a method 1500 for configuring a custom rule to process a preference indication, performed in accordance with some implementations.

FIG. 15 shows a flow diagram of an example of a method 1500 for configuring a custom rule to process a preference indication, performed in accordance with some implementations. In some implementations, the method 1500 may be performed at least in part at a computing device configured to provide computing services associated with a social networking system. The method 1500 may be initiated when a request to create a custom rule is received at 1502.

At 1502, a request to create a custom rule is received. In some implementations, the request may be generated at a client machine in communication with the computing device. For example, a user at the client machine may wish to create a user-defined custom rule to perform custom actions to process a preference indication of a feed item in an information feed.

In some implementations, the request to create a custom rule may be generated from within the social networking system. For example, an automatic process may identify and make statistical associations between preferences of an entity associated with specific information and content type of one or more feed items. This process may determine that a custom rule should be created to link the identified entity information and content type.

In some implementations, a custom rule may be created at least in part with the use of a software package that includes a custom rule framework or toolkit. The software package may be accessible via an on-demand service environment available via a network. The custom rule framework may be programmed in a programming language such as C++, Java or Apex. The custom rule framework may define a software programming factory object, such as a static or abstract factory object, to configure a custom rule. The software programming factory object can be used to create different programming objects to customize the processing of a preference indication. The custom rule framework may be utilized to define a custom factory object to create a variety of software objects that specify content type, entity information, one or more actions to process a preference indication, graphical user interface components to provide a mechanism to endorse content associated with a feed item, or other information related to configuring a custom rule.

Figure 19:
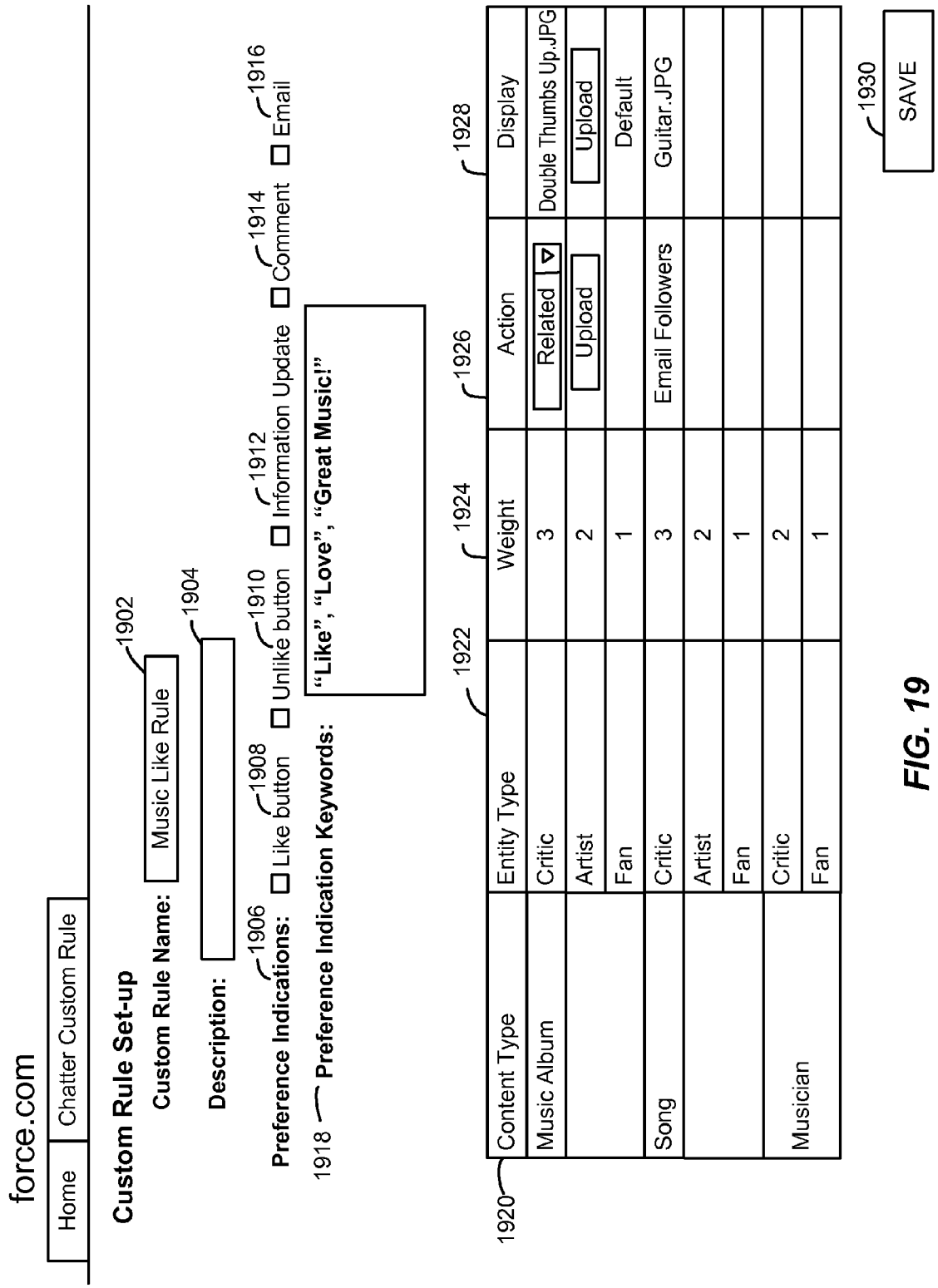
FIG. 19 shows an image of a user interface for configuring a custom rule, generated according to one or more implementations.

In some implementations, a user may create a custom rule at least in part with the use of a graphical user interface (GUI). FIG. 19 shows an image of a user interface for configuring a custom rule, generated according to one or more implementations. The custom rule name interface 1902 allows a user to provide a name of the custom rule. In FIG. 19, the name of the custom rule is "MusicLike Rule." The description interface 1904 allows a user to provide a description of the custom rule. The preference indication interface 1906 allows a user to indicate different trigger events, conditions or preference indication types that activate the custom rule. In FIG. 19, a user may select among various preference indication types, such as a button click of a like button 1908, a button click of an unlike button 1910, detecting a post of an information update 1912 on an information feed, detecting a post of a comment 1914 on an information feed, composition of an email message 1916. In this implementation, the user selected the like button 1908. As such, when one or more servers, such as servers described in FIG. 2B or other computing devices described herein, receive a preference indication after a user selects a like button, the one or more servers execute operations to activate the MusicLike rule.

In some implementations, a user may specify one or more preference indication keywords 1918 to activate the custom rule. In FIG. 19, the keywords specified are "Like," "Love" and "Great Music!". As such, when one or more of these trigger words are detected in a feed item, then one or more servers or computing devices described herein perform one or more actions as specified by the MusicLike Rule. The content type interface 1920 allows a user to specify one or more types of information that activate the custom rule. In FIG. 19, the content types selected are Music Album, Song and Musician. When a preference indication is received for a feed item including a music album, a song or information about a musician, then one or more actions defined by the MusicLike rule are performed. The entity type interface 1922 allows a user to specify information associated with an entity that triggers the activation of the custom rule. In FIG. 19, the entity types selected are critic, artist and fan. As such, when a critic selects a like button for a feed item including a music album, then one or more actions specified by the MusicLike rule are performed.

The weight interface 1924 allows a user to specify a quantitative value to indicate the importance of receiving a preference indication from one entity compared to another entity. For instance, in FIG. 19, the weight associated with a critic of a music album is 3, and the weights associated with an artist and a fan is 2 and 1, respectively. In this scenario, a weight of 3 indicates that a critic's preference indication is of higher importance than an artist's or a fan's preference indication. In some implementations, the weight may be used to rank and order the appearance of a preference indication associated with a feed item in an information feed. For example, a critic's preference indication may appear before the preference indications of an artist and a fan.

The action interface 1926 allows a user to designate one or more actions to perform when a custom rule is activated. In FIG. 19, a user selected the action "related," which causes one or more related feed to be updated to indicate that a critic also endorses the related feed items. In some instances, determining whether one or more feed items are related can be based on a relevance measure as described in greater detail below. Such a relevance measure may be used to determine whether one or more feed items include the same content type. For example, after a critic indicates a preference for a feed item including Michael Jackson's Thriller album, then the MusicLike rule include instructions to determine whether other feed items include songs from the Thriller album. If a feed item includes the song "Beat It" from the album, then the feed item is related and modified to indicate that the critic also likes the song "Beat It." Various other operations may be performed to determine a relevance measure as described in greater detail below. A user may select various other actions depending on the content type and/or the entity type. In FIG. 19, a user may upload a computer program including instruction to perform a user's custom actions. In some instance, in FIG. 19, may select an action, such as email followers. As such when a critic "likes" a feed item including a song, then an email notification is sent to the critic's followers that the critic "likes" a particular song.

The display component interface 1928 allows a user to specify custom selectable graphical user interface, such as a button or a link, that can be displayed on a client device. The display component can be used to allow a user on a client device to select the display component and transmit a preference indication for a feed item to one or more servers or computing devices described herein. In FIG. 19, a user selected a two thumbs up graphical display, such that when an entity views a feed item including a music album, then the graphical user interface button will include an image of two thumbs up. In some instances, a user may upload a custom computer program including instructions for a custom display component. In other instances, the user may select display components provided by the system. For example, in FIG. 19, a user selected a default display, which causes a single thumb up button to be displayed on a fan's client device while viewing a feed item including information about a music album.

After a user specifies different preference indications, content types, entity types and actions, the user may use the GUI to save the MusicLike Rule. When the user selects the save button 1930, the custom rule is stored on one or more servers or other computing devices as described herein. In some implementations, instead of using the GUI of FIG. 19, a custom rule may be created using an object-oriented computer programming language, such as C++, Java, or Apex. For instance, a user may program code to implement a computer programming factory object to create a custom rule. A computer programming factory object may be implemented to create instances of programming objects to process preference indications of feed items based on different conditions, such as a content type associated with a feed item or entity information.

At 1504, preference indication instruction to activate a custom rule is determined. The preference indication instruction may specify various preference indication types to trigger the activation of a custom rule. The preference indication instruction may include operations to detect a mouse click event of a like button, key press event, or monitor feed items for designated key words to trigger the activation of a custom rule.

For example and as illustrated in FIG. 19, a custom rule may designate various preference indicators to activate a custom rule, such as the selection of a Like button 1908, selection of an Unlike button 1910, detecting a post of an information update 1912 and/or a comment 1914, or the composition of an email 1916. The custom rule may further designate keywords, such as "like," "love" and "Great Music!" 1918, to activate a custom rule.

In some implementations, the preference indication instruction may include computer programming code specifying various preference indicators to activate a custom rule. The preference indication instruction may also include operations to monitor and/or detect a preference indication as specified by a custom rule. For example, the preference indication instruction may include operations for monitoring feed items that include keywords. In this example, the preference indication instruction may include operations for analyzing a string in an information update and/or a comment and determine if the string matches the string defined as a preference indication by the custom rule. These operations may include instruction for regular expression analysis. In another example, the preference indication instruction may include event-driven programming operations to detect a selection of a button, a mouse click event or any other event initiated on a client device.

In some implementations, the preference indication instruction designating a preference indication to activate a custom rule may be provided via user input. For example, a user may provide or select a script containing computer language instructions to designate and detect a preference indication to perform one or more action of a custom rule.

In some implementations, the preference indication instruction for specifying a preference indication to activate a custom rule may be generated at a server. For example in FIG. 19, a user may select among various trigger events, such as a button click of a like button 1908, a button click of an unlike button 1910, detecting a post of an information update 1912 on an information feed, detecting a post of a comment 1914, composition of an email message 1916. Additionally or alternatively, a user may select various keywords 1918 to activate a custom rule. In this case, the server may determine executable code to monitor information feeds or feed items for keywords specified by the user.

In FIG. 15, at 1506, content type instruction is determined. The content type instruction may designate one or more content types to trigger the performance of one or more actions to process a preference indication. The content type may be specified as any information related to a topic, genre or some other categorization of information.

In some implementations, the content type may be defined as a specific feed item. For instance, the content type may be defined as any post in an information feed. As such, when one or more servers receive a preference indication associated with a post, the one or more servers or other computing device perform one or more actions as defined by the custom rule. In some other instances, the content type may be defined as any user-submitted messages or comments. In some instances, the content type may be defined as any feed item including hyperlinks to social network data or other network data such as various documents and/or web pages on the Internet. In yet some other instances, the content type may be defined as a feed item including multimedia data.

In some implementations, the content type may be designated as a category of information. For instance, the content type may be specified as any information related to music, movies, books, celebrity gossip, cars, sports, travel or technology. For example, the content type may be specified as any feed item including information related to Kim Kardashian. In this example, when a preference indication is detected and associated with a feed item including a picture, words/phrases/statements or hyperlinks related to Kim Kardashian, then one or more actions may be performed according to a custom rule. In this example, the custom rule may define operations to provide a user associated with the preference indication a ticket to Kim's New Year's Eve party in Las Vegas.

In some implementations, the content type may be specified as any information related to records, such as cases, accounts, or opportunities, stored in a database. In some other implementations, the content type may be specified as any information related to a group of users of the online social networking system, a corporation, academic institutions or any other type of organization or group.

In some implementations, the content type instruction may include computer programming language code for detecting whether a feed item is associated with one or more content types designated by a custom rule. For example, the content type instruction may include code that includes operations for analyzing a string in an information update related to a designated content type. For instance, the code may include instructions for regular expression analysis to determine whether an information update includes the string "Kim Kardashian" or "Kardashian." In another example, the content type instruction may include code that includes operations for searching and analyzing metadata associated with a feed item that includes a keyword. For instance, the code may include instructions to analyze pictures for a tag that includes the keyword "Kim Kardashian." In some implementations, a message may be communicated from a client device to one or more servers. The message may include a unique identifier that specifies the content type of a feed item.

In some implementations, computer programming language code for designating one or more content types may be provided via user input. For instance, a user may provide code that overrides abstract methods to implement a custom rule.

In some implementations, computer programming language code for determining whether a feed item includes one or more designated content types may be generated at a server. For instance, a user may indicate that a custom rule should have one or more content types in which different properties associated with a feed item are analyzed to determine whether the feed item includes a designated content type. In this case, the server may determine executable code to search for a feed item based on the content type indicated by the user.

At 1508, entity information instruction for designating information associated with an entity to trigger the performance of one or more actions to process a preference indication is determined. The entity information may be defined as a particular entity or as a status or profile information associated with an entity. An entity may be a user, a group, a record, or other construct in the online social network.

In some implementations, the entity information instruction may designate particular users, groups or records that cause the activation of a custom rule. For example, Jay, Gloria and Manny may be designated as users whose preference indications activate a custom rule. As such, when a preference indication, such as a "Like" of an information update, is received from Jay, Gloria and/or Manny, then one or more actions may be performed to process the preference indication.

In some implementations, the entity information instruction may specify profile information associated with an entity that may cause one or more actions to be performed to process a preference indication. For instance, entity information instruction may be an entity associated with a specific geographic location. For example, a GeoLike custom rule may be configured to apply to any entity that lives in or is from San Francisco, Calif. In this example, when a user, who lives in San Francisco, views an information feed with feed items on a display of the user's computing device (e.g., laptop, mobile device), then each feed item is displayed on the computing device with a selectable graphical user interface button with a picture of the Golden Gate Bridge instead of a picture with a thumbs up. As such, a user living in San Francisco, can select a graphical user interface button depicting the Golden Gate Bridge to endorse content of a feed item.

In some other instances, the entity information instruction may include various other types of profile information, such as a specific user's education information, particular birth date, employment information, hobby information, relationship status and/or gender information. For example, a SalesTeamLike rule is configured to provide customized processing of a preference indication based on a user's role in ABC Corporation's sales team. In this example, if a Director of the sales team "likes" a feed item including information about ABC Corporation's quarterly sales figures, then each employee, such as the Program Managers and the Sales Associates, on the sales team receive an information update. The information update includes a message that the Director likes the quarterly sales figures. However, if a Program Manager of the sales team "likes" the feed item including information about ABC Corporation's quarterly sales figures, the SalesTeamLike rule may be configured to send information updates to only the Sales Associates managed by the Program Manager.

Typically, when an information feed is displayed on a client device, the feed items are displayed in a chronological order, with the new feed items presented first in an information feed and older feed items presented toward the end of the information feed. As a result, in some instances, it can be difficult for any user viewing the presentation of the information feed displayed on a client device to view the feed items in an order of importance of a feed item. As such, a user needs to scroll up and down through the information feed and independently make a determination of the relative importance of each feed item in an information feed, which can be time consuming and cumbersome.

In some implementations, a custom rule may be configured to associate a preference indication of a particular entity with a weighted value representing the importance of a preference indication of the particular entity. Referring back to the SalesTeamLike rule, the rule may be further configured to associate a weighted value based on a user's role in ABC Corporation's sales team. For instance, a Director of the sales team is associated with a quantitative value of 10 indicating that the Director's preference indication is of high importance. In contrast, a Program Manager and a Sales Associate are associated with quantitative values of 5 and 2 indicating that the Program Manager's and Sales Associate's preferences indications are of lower importance.

In this scenario, when the Director of the sales team "likes" a feed item including information about ABC Corporation's quarterly sales figures, then each employee in the sales team receives an information update that the Director "likes" the quarterly sales figures. Since the Director's "like" is associated with the quantitative value of 10, then the information update may appear in an employee's information update with an indication that the information update is of high importance. For instance, the information update may be colored red and appear as the first feed item in an employee's information feed for ten days.

In contrast, when a Program Manager "likes" information associated with a feed item, then only the Sales Associates working directly for the Program Manager receive an information update. Since a Program Manager's preference indication has a weight of five, the information update may be colored blue and appear as the first feed item in a Sales Associate's information feed for five days. However, if a Sales Associate receives information updates including information of the Director's and the Program Manager's preference indications, then the information updates appear in an order based on the weight associated with each preference indication. In this scenario, the information update including information of the Director's preference indication would appear before the information update of the Program Manager's preference indication. By using a weight to determine the order to display feed items in an information feed, the Sales Associate can quickly view information of higher importance, without requiring the Sales Associate to parse through numerous feed items to determine that the Director and the Program Manager "like" ABC Corporation's quarterly sales figures.

Although the example discloses associating a weight value based on a user's role in an organization, a weight value may be associated with other user profile information, group information or record information. In some implementation, a weight value may be associated to a content type as described in block 1504.

In some implementations, the entity information instruction may specify information related to a group account in an online social networking system. For example, the instruction may specify group information, such as receiving a preference indication from a specific member of the group, the number of members, based on entities or data objects followed by the group, and other group related information. In other implementations, the entity information instruction may specify information related to a record in an online social networking system, such as cases, account or opportunities.

In some implementations, the entity information instruction may include computer programming language code for determining whether a preference indication of a feed item is associated with one or more entity information designated by a custom rule. For example, the entity information instruction may include code that include operations to determine whether a user "liked" a feed item by retrieving information from various locations, such as a data record associated with a user's account, a data record associated with the feed item or other locations in an on-demand computing services environment. These operations may include instructions for querying a database to determine information associated with database records.

In some implementations, computer language code for determining whether a preference indication of a feed item is associated with one or more entity information may be provided via user input. For instance, a user may provide code that implements a computer programming factory object to implement a custom rule.

In some implementations, computer programming language code for determining whether a preference indication is associated with one or more entity information may be generated at a server. For instance, a user may indicate that a custom rule should be activated when a preference indication is received from a user who is of a specific entity type (e.g., a critic, artist or a fan as shown in FIG. 19). In this case, the server may determine executable code to access a computer programming factory object to create computer programming objects to process a preference indication for each specified entity type.

At 1510, an action instruction that defines one or more actions to perform when a preference indication is received is determined. In some implementations, the action instruction may include any type of instructions capable of being performed within the social networking system. For example, the instructions may include operations for modifying information associated with a feed item, creating a feed item, transmitting a message, creating or modifying a data object such as a database record, or some combination thereof.

In some implementations, one or more actions may be defined to modify a database record associated with a feed item when a preference indication for the feed item is received. For example, a user, Chet, indicates that he "likes" a feed item including information about San Francisco Giants baseball team. When one or more servers receive Chet's preference indication, then one or more servers may execute operations to determine whether the feed item is associated with a custom rule, such as a BaseballLike rule, to process Chet's preference indication. In this example, the Baseball-Like rule defines one or more actions to update a database record associated with a feed item that includes information about baseball. The one or more actions may be defined to update the total number of user that "like" the San Francisco Giants. In this example, the total number of users is updated by one to account for Chet's preference indication.

In some implementations, the action instructions may define operations to determine whether one or more feed items are related. If one or more feed items are related, then actions defined by the custom rule are performed to modify information associated with the one or more related feed items. Feed items may be identified as related based on a relevance measure. The relevance measure may be one or more operations to determine whether there is a relationship among feed items. For example, a user may indicate a preference for a first feed item including content about Starbucks® coffee. In this example, the relevance measure may be based on whether a second and a third feed item have the same content as the first feed item. If the second and third feed items include content regarding Starbucks® coffee, then the action instruction include operations to update data records associated with the first, second and third feed items to indicate that the user endorses the content of the related feed items. Various other measures may be applied to determine whether one or more feed items are related, as described in greater detail in FIG. 18.

In some implementations, the action instruction may include computer programming language code defining actions to perform when a custom rule is activated. For instance, the computer programming language code may include operations to override abstract classes to perform the actions defined in a custom rule. In other instances, the computer programming language code may include operations to create computer programming factory objects to perform specific actions based on whether a feed item includes a designated content type and/or based entity information associated with a preference indication as defined by a custom rule.

In some implementations, computer language code for specifying actions to perform when a custom rule is activated may be provided via user input. For instance, a user may provide code that includes operations to perform actions to implement a custom rule. For example, a user may utilize the action interface 1926 of FIG. 19 to upload a script or executable code to perform custom actions defined by a user.

In some implementations, computer language code for specifying actions to perform may be generated at a server. For instance, a user may indicate that a custom rule should perform a specific action to process a preference indication. For example, a user may select the action "Related" utilizing the action interface 1926 of FIG. 19 to cause performance of the custom rule in response to receiving a preference indication from a critic and a feed item that includes content about a music album. In this example, the server may determine executable code to determine whether one or more feed items are related and modify information of feed items that are identified as being related. In another example, a user may select an action "Email followers" utilizing the action interface 1926 of FIG. 19 to cause the performance of a custom rule when a critic's preference indication is received for a feed item including a song. In this case, the server may determine executable code to send an email message to the critic's followers and notify the critic's followers that the critic endorses a particular song.

At 1512, display component instructions are determined. The display component instruction may include instruction to provide a mechanism to endorse information associated with a feed item. For instance, the display component instructions may include instructions to create a custom display component. The custom display component may be a selectable graphical user interface that can be displayed on a client device. The custom display component may be a selectable graphical user interface button, link or any other user interface component that is operable to transmit a preference indication for a feed item from a client device to one or more servers described herein.

Figure 20:
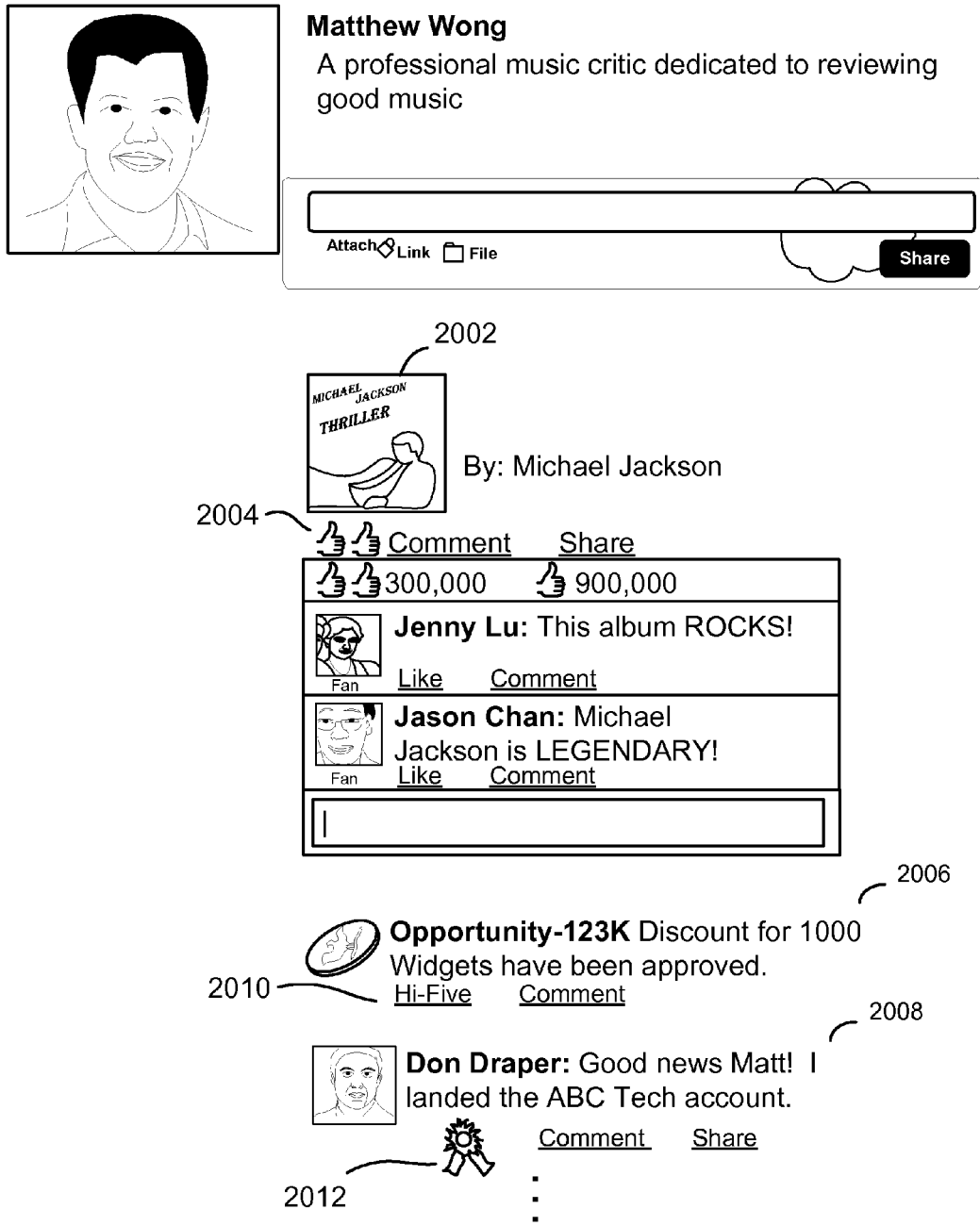
FIG. 20 shows an example of an information feed, according to some implementations.
Figure 20:
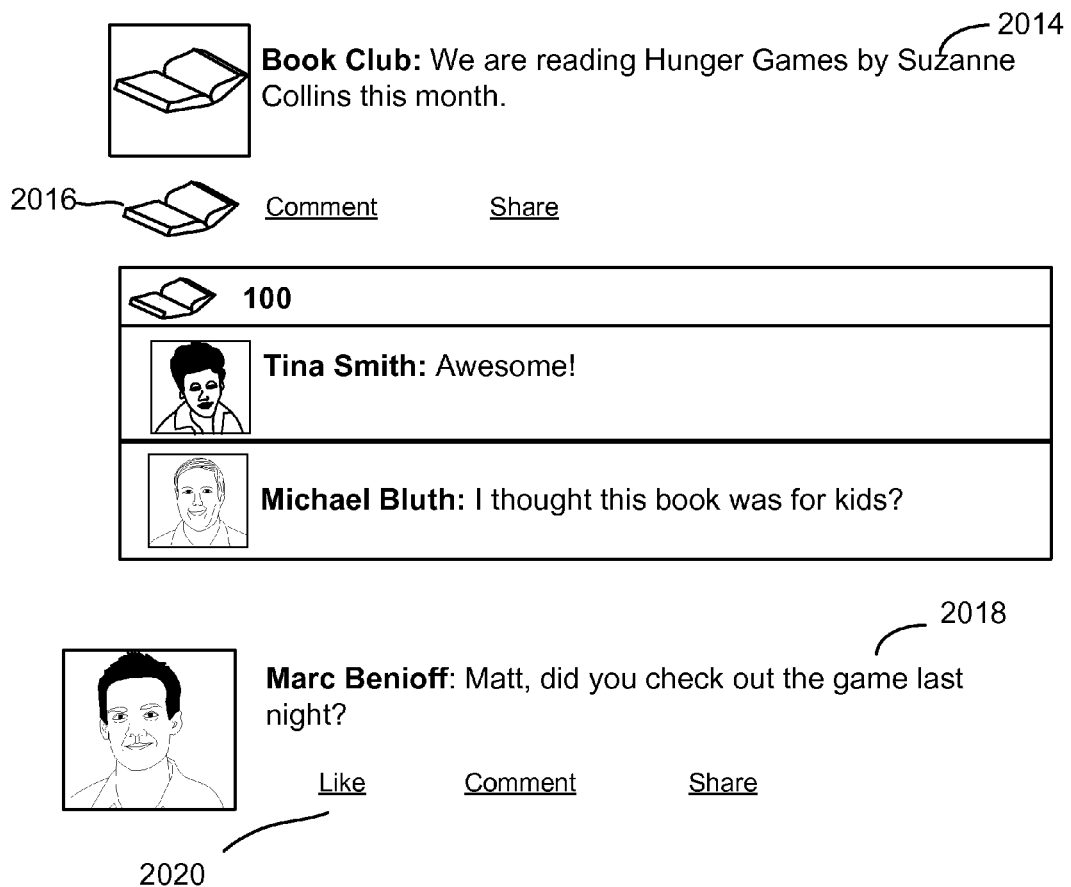

In some implementations, the display component instructions may specify a text label or image to display in a graphical user interface display component based on the content type and/or the entity information specified in blocks 1506 and 1508, respectively. FIG. 20 shows an example of an information feed, according to some implementations. In FIG. 20, the information feed includes information update 2002. Information update 2002 includes content about the Michael Jackson's Thriller music album. Referring back to the MusicLike rule of FIG. 19, in this example, the display component 2004 includes an image of two thumbs up because Mathew Wong is a music critic and information update 2002 includes information about a music album.

FIG. 20 also shows information updates 2006 and 2008 associated with custom display components 2010 and 2012 based on the content types of the information updates. For instance, information update 2006 includes information related to Opportunity-123K associated with a custom rule. As such, information update 2006 includes a "Hi-Five!" display component 2010 configured to allow Matthew to endorse the content of information update 2006. In this scenario, if Matthew selects "Hi-Five!" display component 2010, then the custom rule may be configured to automatically create a data record approving the discount for 1000 widgets. Information update 2008 includes information related to ABC Tech account associated with a custom rule. In this example, the display component instructions include operations to generate a display component 2012 including an image of a badge.

FIG. 20 shows information update 2014 associated with custom display component 2016 based on entity information specified by a custom rule. In this example, Matthew Wong is member of the group Book Club. As such, the display component instructions include operations to generate display component 2016 including an image of a book. In this example, if Matthew selects display component 2016, then custom rule may include operations to automatically update a database record indicating that Matthew will read Hunger Games this month. Additionally, Matthew may automatically receive messages related to the book Hunger Games. If Matthew does not select display component 2016, then Matthew will not receive any information updates related to Hunger Games.

Figure 22:
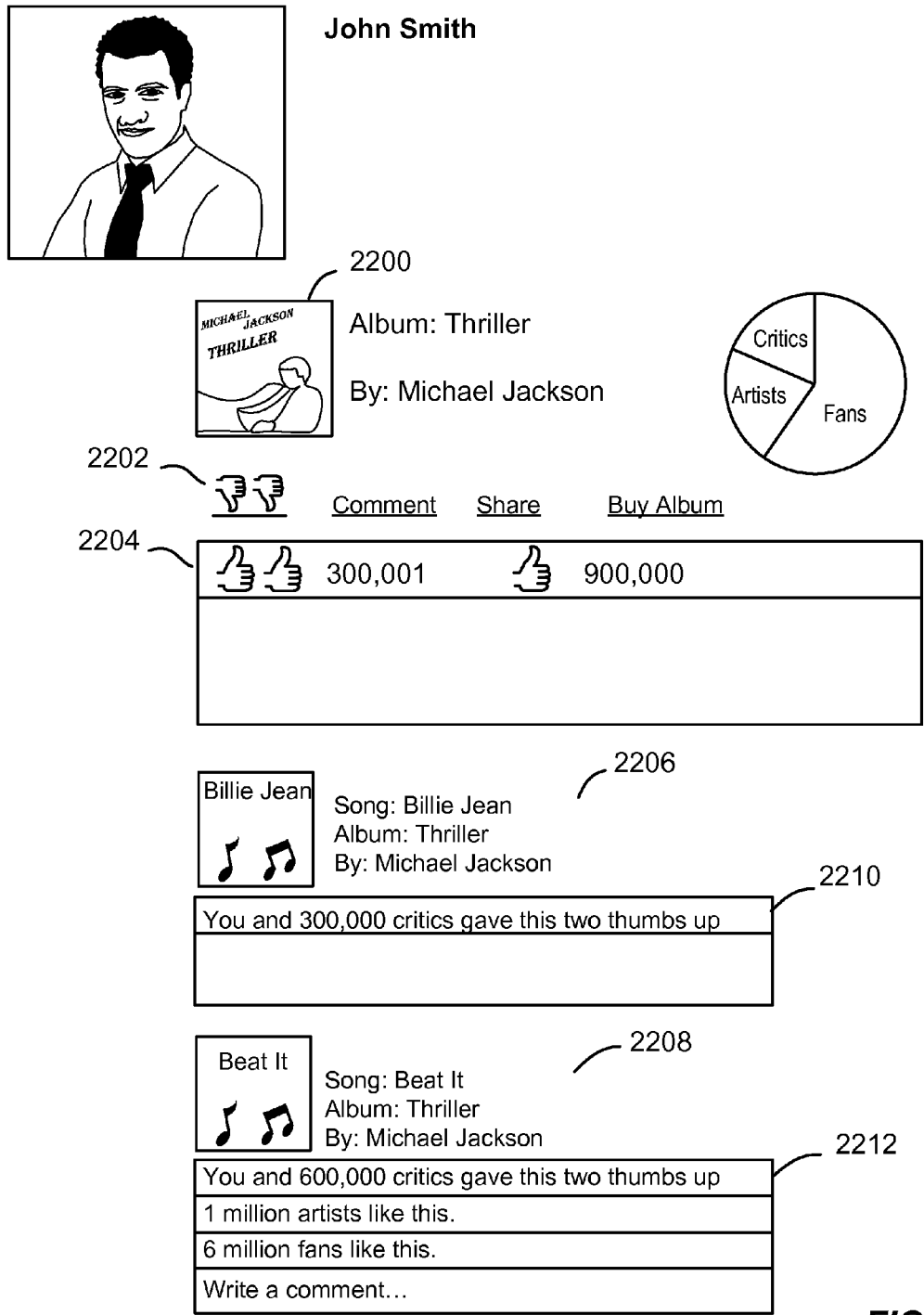
FIG. 22 shows an example of an information feed, according to some implementations.

In some implementations, the display component instructions may further include operations to update a display component in response to detecting a preference indication. For example, if Matthew Wong indicates that he "likes" the information update 2018 from Marc Benioff, then an updated display component may display a text label "Unlike" (not shown) to trigger the activation of a different custom rule. In another example, if a music critic, John Smith, selects the two thumbs up display component 2102 to endorse the Michael Jackson's Thriller album 2104, then an updated display component may display a two thumbs down 2202 as shown in FIG. 22. The two thumbs down display component 2202 may be configured to trigger the activation of another custom rule.

Figure 21:
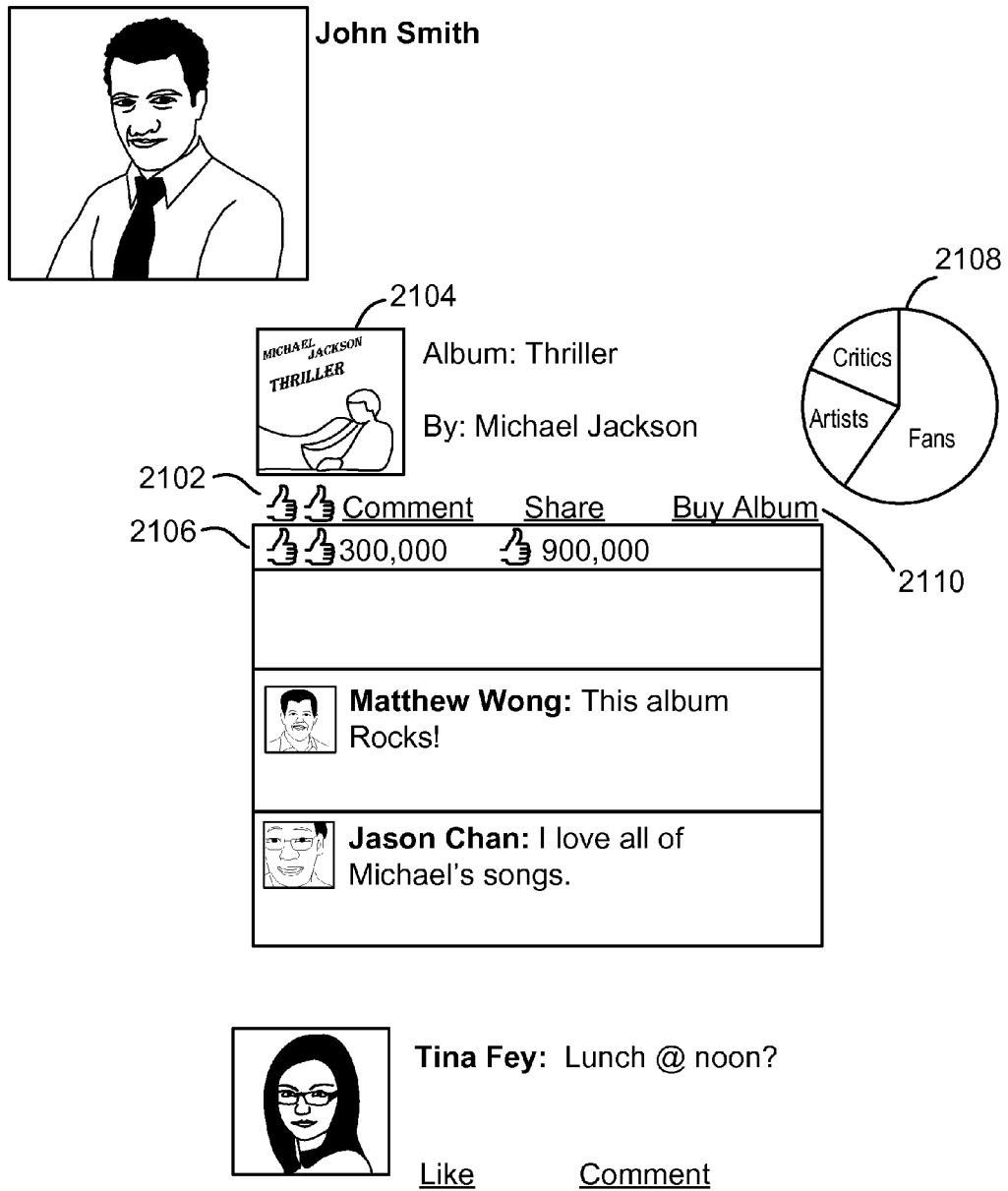
FIG. 21 shows an example of an information feed, according to some implementations.

In some implementations, the display component instructions may include operations to generate other graphical user interface components. For example, in FIG. 21, the display component instructions may include operations to generate a display of a quantitative value 2106 of the number of users that endorsed Michael Jackson's Thriller music album. Here, the display instructions categorized the preference indications based on whether an entity was a critic depicted with two thumbs up or a non-critic depicted with a thumbs up. In some implementations, the display component instructions may include operations to generate a visual representation of the entities that have endorsed specific content of a feed item. In FIG. 21, a pie chart 2108 provides a visual representation of the different entities that endorse the Thriller album 2104.

In some implementations, the display component instructions may include computer programming language code defining graphical user interface components to display on a client device. For example, the computer programming language may include operations to override an abstract class. In another example, the computer programming language may include HTML snippets that execute on a client device to display a custom display component on a user interface displayed on the client device.

In some implementations, the display component instructions may be provided via user input. For instance, a user may use the display component interface 1928 of FIG. 19 to upload computer programming language code defining a custom display component and include operations to respond to a selection of a custom display component.

In some implementations, computer language code for specifying a custom display component may be generated at a server. For instance, a user may use the display component interface 1928 of FIG. 19 to select an image, such as a DoubleThumbsUp.JPG or a Guitar.JPG, to display a custom display component. The server may determine executable code to generate a graphical user interface component using the selected image.

At 1514, the configured custom rule is stored. In some implementations, the configured custom rule may be stored on one or more storage mediums, such as any of the various databases and/or memory devices described herein. The configured custom rule may be stored for later use and/or activated when it is created.

Figure 16:
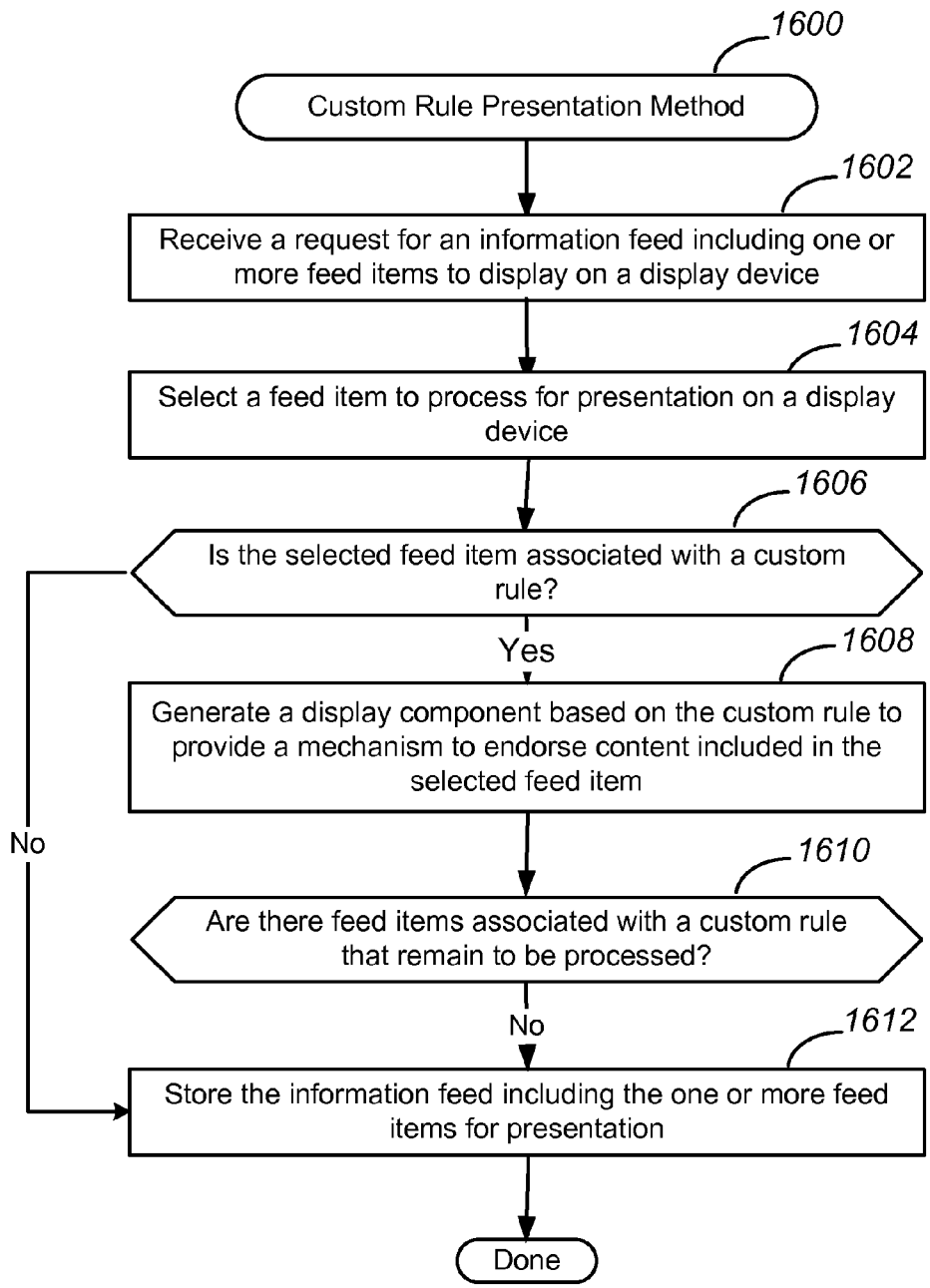
FIG. 16 shows a flow diagram of a method 1600 for presenting a custom rule, performed in accordance with one implementation.

FIG. 16 shows a flow diagram of a method 1600 for presenting a custom rule, performed in accordance with one implementation. The method 1600 provides a mechanism to present a custom display component associated with a feed item in an information feed to be displayed on a display device.

In some implementations, the method 1600 may be performed at least in part at a computing device configured to provide computing services associated with a social networking system.

In some implementations, the method 1600 may be performed for each feed item associated with a custom rule. In other implementations, the method 1600 may be performed once for all feed items in an information feed associated with one or more custom rules. In yet other implementations, some portions of the method 1600 may be performed once for all feed items associated with a custom rule, while other portions may be performed for each feed item associated with a custom rule.

At 1602, a request for an information feed including one or more feed items to display on a client device is received by one or more servers. In some implementations, the request may be received as part of a request for a web page or user interface component that contains the feed. For example, a client machine may transmit a request for a page to the server. As part of providing the requested web page, the server may initiate the request for the information feed.

At 1604, a feed item is selected to process for presentation on a display device. In some implementations, a feed item may be selected by querying a feed table for information updates, comments, records or other data objects associated with a user account of a user that requested the information feed at 1602.

At 1606, it is determined whether the selected feed item is associated with a custom rule. In some implementations, the determination is made by querying a database. For instance, a feed table is queried for a feed item and each feed item may be associated with a unique custom rule identifier for a custom rule. For example, a custom rule identifier may simply indicate a custom rule, such as "MusicLike" rule, or may be a computer programming pointer that points to a computer programming factory object implementing a custom rule.

In some implementations, a determination of whether a feed item is associated with a custom rule may be based on information associated with a user account, content included in a feed item and/or a combination thereof. For example, a database query may be performed for a list of custom rules and parameters may be passed to each custom rule to determine whether a feed item is associated with the custom rule. The parameters passed to a custom rule may be information associated with a user account (e.g., a critic, artist, fan), content included in a feed item (e.g., music album, song, artist) and/or a combination thereof. Then, the custom rule, such as MusicLike rule, may return an indication, such as a "yes" or "no", of whether a feed item is associated with a custom rule.

In some implementations, the determination is made based on information included in the request described in block 1602. The request may specify a list of custom rules associated with one or more feeds items included in the requested information feed. For example, the request may include a unique identifier associated with a MusicLike rule, such as "MusicLike."

In some implementations, if it is determined that the selected feed item is not associated with a custom rule, then method 1600 proceeds to block 1612. Otherwise, method 1600 proceeds to block 1608.

At 1608, a display component based on the custom rule is generated for the selected feed item to provide a mechanism to endorse content included in a selected feed item. In some implementations, the generation of the display component may depend upon the configuration of the custom rule. For example, a custom display component may be generated at a server in accordance with custom display component instructions specified as described in block 1512 of FIG. 15. The procedure for generating the display component may include operations such as identifying text or images for presentation of a display component, determining a value associated with a display component, such as whether the display component is selected or not selected, retrieving information for creating the display component, and combining the identified or retrieved information to create the custom display component. In another example, if the custom rule includes a pre-defined display component, then the designated pre-defined display component will be generated. As another example, if the custom rule defines a custom display component via custom computer programming language code, then the custom display component is generated at 1608 by executing the custom computer programming language code.

In some implementations, the generation of the display component may be based on the content type of a feed item and/or entity information designated by a custom rule. Referring back to FIG. 21, after it is determined that information feed 2104 is associated with a MusicLike rule, the rule executes operations to generate a two thumbs up display component 2102. In this example, a two thumbs up display component 2102 is generated because John Smith is a music critic and information update 2104 includes a music album in accordance with the MusicLike rule. Additionally, because John is a music critic, various other display components may be generated to provide John with additional features. For example, in FIG. 21, information update 2104 includes a pie graph 2108 that provides a visual representation of the users that also endorse Michael Jackson's Thriller album. The information update 2104 further includes a "Buy Album" GUI link that allows John to buy the album.

Figure 23:
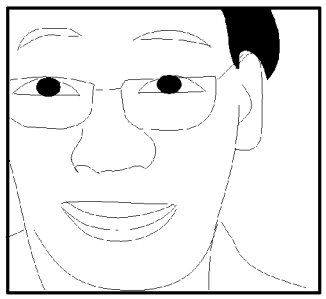
FIG. 23 shows an example of an information feed, according to some implementations.
Figure 23:
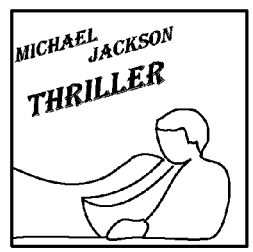
Figure 23:
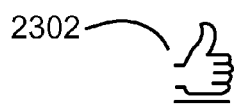
Figure 23:
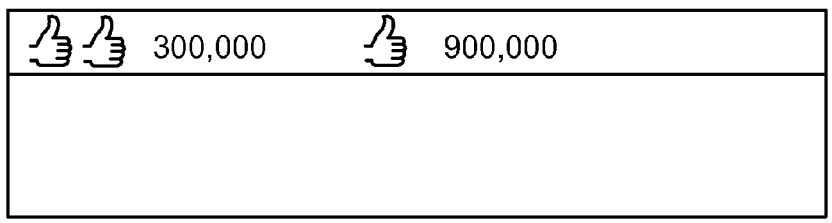

In contrast, in FIG. 23, a thumbs up display component 2302 is generated. FIG. 23 shows an example of an information feed, according to some implementations. FIG. 23 shows an information feed of a user, Jason Chan, who is a fan of music. The information feed includes an information update 2304 similar to the information update 2104 of FIG. 21. In this case, because Jason is a music fan and not a music critic, a thumbs up display component is generated in accordance with the MusicLike rule. Furthermore, Jason Chan's information update 2304 does not include the additional features provided to John Smith in FIG. 21 because Jason is not a music critic. As FIGS. 21 and 23 illustrate, a custom rule may be configured to provide different display components and visual representation of feed items based on conditions and information designated by a custom rule.

At 1610, it is determined whether there are feed items associated with a custom rule that remain to be processed. In some implementations, the determination may be based at least in part on whether any unprocessed feed items, such as information updates, comments or data objects remain that are associated with the requested information feed.

At 1612, the requested information feed including the one or more feed items are stored for presentation. In some implementations, the requested information feed may be stored on a storage medium or storage device. For instance, the requested information feed may be stored in a database, such as a multitenant database accessible to a plurality of tenants.

In some implementations, rather than storing the requested information feed for presentation at block 1612, the requested information feed is immediately communicated and displayed on a client display device.

Figure 17:
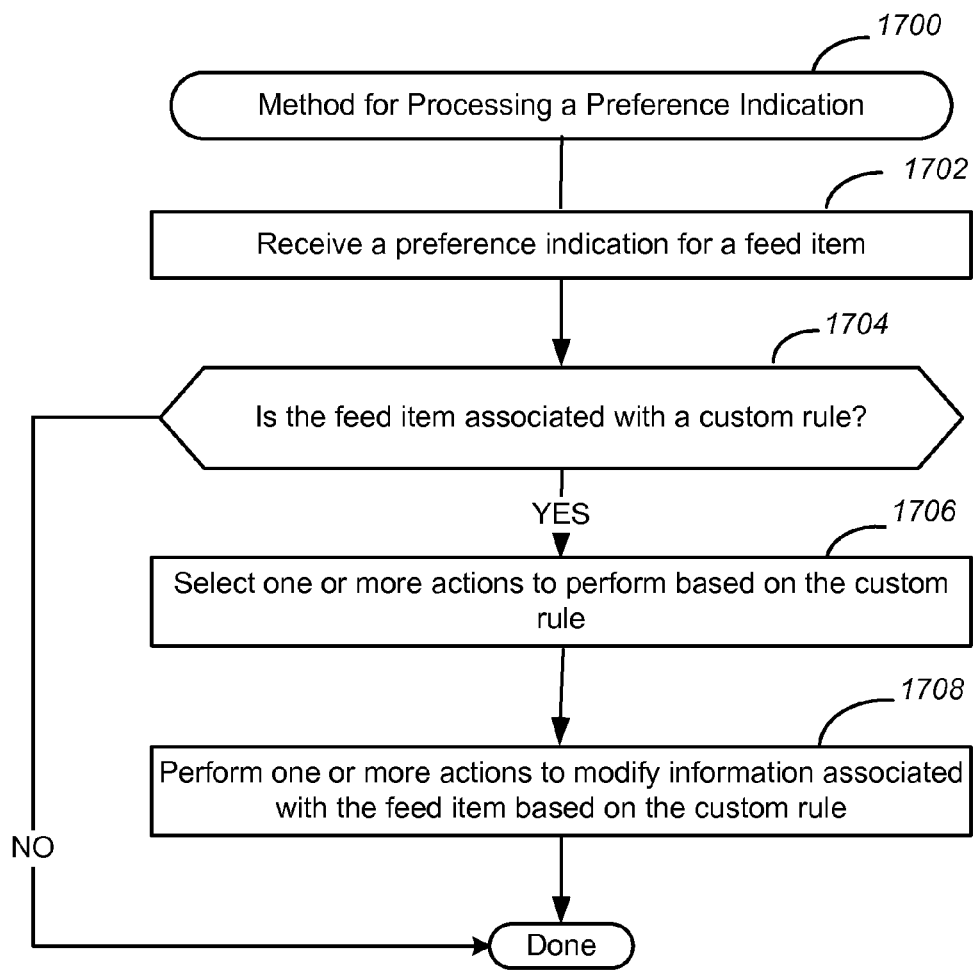
FIG. 17 shows a flow diagram of an example method 1700 for processing a preference indication, performed in accordance with some implementations.

FIG. 17 shows a flow diagram of an example method 1700 for processing a preference indication, performed in accordance with some implementations. In some implementations, the method 1700 may be used to activate a custom rule that was configured using method 1500 shown in FIG. 15.

At 1702, a preference indication for a feed item is received. In some implementations, a message including a preference indication for a feed item may be communicated from a client device to one or more servers in response to detecting a trigger event. For example, a message communicating a preference indication may be transmitted to one or more servers when a selection of like button, posting of an information update or a comment is detected.

In some implementations, the one or more servers may be configured to execute operations to monitor feed items that include keywords indicating a preference for a feed item. For example, when a feed item includes words such as "like," "love," or "dislike" then one or more servers may execute operations to determine whether the feed item is associated a custom rule as described below in block 1704.

At 1704, a determination is made whether the feed item is associated with a custom rule. In some implementations, a message is communicated to one or more servers. The message may include a preference indication for a feed item and a unique identifier that identifies a custom rule. For example, a database query may be performed using the unique identifier to search for an associated custom rule that is stored in a custom rule table that includes a list of various custom rules.

In some implementations, information associated with the feed item is used to determine whether the feed item is associated with a custom rule. For example, a message is received by one or more servers that includes a preference indication and the content type of the feed item and/or entity information (e.g., user account information, user profile information, group account). In this example, the content type and/or entity information may be passed as parameters to a computer programming factory object implementing a custom rule. The computer programming factory object may execute operations to determine whether the custom rule processes a feed item with the specified parameters. Then, the computer programming factory object may return an indication, such as 0/1 or yes/no, that the feed item is associated with a custom rule.

In some implementations, if it is determined that the first feed item is not associated with a custom rule, then method 1700 may end. In other implementations, the method 1700 may proceed to create a record in a database of the preference indication of the feed item. In some implementations, if it is determined that the feed item is associated with the custom rule, then method 1700 proceeds to block 1706.

At 1706, one or more actions are selected to perform based on the custom rule. In some implementations, the selection of one or more actions may involve executing operations defined by the action instructions configured in block 1510 of method 1500. The implementation of the selection 1706 may depend upon the configuration of the custom rule. For instance, the selection of one or more actions may depend on various parameters designated by a custom rule. The selection of an action may be based on the content type of a feed item, entity information or a combination thereof. For example, referring to the MusicLike rule described in FIGS. 15 and 19, the selection of one or more actions may be based on whether the content includes information related to a music album, a song or a musician. Then, the selection of one or more actions may be further narrowed based on whether a user is a critic, an artist or a fan.

In this example, the MusicLike rule may be implemented using a computer programming factory object as shown in FIG. 24 to select and perform actions based on the custom rule. FIG. 24 provides an illustration of a custom rule (i.e., MusicLike rule) stored as a computer program factory object to process a preference indication, according to some implementations. The system 2400 includes a client device 2402 in communication with one or more servers 2404 or computing devices over a network 2406.

In some implementations, the client device 2402 includes a display device 2408, a processor 2410 and a memory 2412. The client device 2402 may be any device or group of devices capable of communication with the one or more servers 2404 and facilitating the display of, and interaction with, user interface components such as an information feed.

The one or more servers 2404 are configured to store one or more custom rules as one or more factory objects. In this example, the one or more servers store the MusicLike rule of FIG. 15 as a MusicLike Factory object 2414 to process a preference indication. The MusicLike Factory object 2414 is configured to create other instances of computer programming objects as specified in the configuration of the Music-Like rule to perform one or more actions.

In some implementations, the client device 2402 generates a communication 2416 requesting an information feed. The communication 2416 may be generated based on a user action, such as a request for a web page that includes a user interface component displaying the information feed. Alternately, or additionally, the communication 2416 may be generated based on a computer generated action. For example, computer code running on the client device 2402 may trigger the communication 2416 requesting the information feed based on a detected condition.

In some implementations, the one or more servers 2404 transmit the information feed 2418 to the client device 2402. In some instances, the information feed may be transmitted to the client device 2402 even in the absence of an explicit request for the information feed from the client device. In other instances, the client device 2402 may be executing a web browser that is displaying a dynamic web page in communication with the one or more servers 2404. The one or more servers 2404 may then update the web page, or a portion of the web page, based on an event or condition detected at the one or more servers 2404. In some instances, an information feed may be provided to the client device without reloading a web page and/or user interface component displayed at the client machine (e.g., in a web browser).

In some implementations, when a user at the client device 2402 indicates a preference of a feed item, then a message 2420 including the preference indication is transmitted from the client device to the one or more servers 2404.

In some implementations, the message 2420 may be received by one or more servers 2404 as described in block 1702 of FIG. 17. The message may include one or more of the following information: a unique identifier associated with a custom rule, information related to the feed item (e.g., content type), and/or information related to the user at the client device (e.g., profile information, status information).

In some implementations, the one or more servers 2404 may receive the message 2420 including the preference indication. The one or more servers may perform operations to determine whether the feed item is associated with a custom rule based on the information included in the message as described in block 1704 of FIG. 17. In this example, if it is determined that a feed item is associated with a MusicLike rule, then the one or more servers may execute operations based on the MusicLike Factory object 2414 to create an instance of a computer programming object. The instance of a computer programming object may include operations to process a preference indication based on the content type and entity information of a feed item. As such, if a preference indication is received from a Critic and the feed item includes a music album, then a Music Album Critic MusicLike Object 2422 is created to process the preference indication. Object 2422 includes display component instruction 2424 and action instruction 2426 that may include instructions as described in blocks 1510 and 1512 of FIG. 15. Once object 2422 is created, then one or more actions defined by the action instruction 2426 are performed to process a preference indication. However, if a preference indication is received from an artist, then the MusicLike Factory object may execute operations to create the Music Album Artist MusicLike Object 2428 to process a preference indication. If a preference indication is received from a fan instead, then a Music Album Fan MusicLike Object 2430 is created and the actions designated by object 2430 are performed to process a preference indication.

Although FIG. 24 shows three programming objects to process a preference indication based on the content type and entity information of a feed item, the MusicLike Factory object may be configured to create any number of objects to process a preference indication. For example, the MusicLike Factory may create a separate object to process a preference indication for a feed item including a song and a preference indication associated with a critic, artist or a fan. Furthermore, each computer programming object may further specify display component instructions and action instructions to perform in response to receiving a preference indication.

Returning to block 1706 of FIG. 17, if a custom rule defines the selection of one or more actions via a custom computer programming language code, then the selection of one or more actions may be made by executing the custom computer programming language code.

At 1708, one or more actions to modify information associated with the feed item based on the custom rule are performed. In some implementations, performing one or more actions may involve executing operations defined by the action instructions configured in block 1510 of method 1500. For example, the one or more action include modifying information associated with a feed item, creating a feed item, transmitting a message, creating or modifying a data object such as a database record, or some combination thereof.

In some implementations, performing of one or more action may depend upon the configuration of the custom rule. For example, if the custom rule includes adding a designated pre-defined action, the designated pre-defined action will be performed. As another example, if the custom rule defines one or more actions via custom computer programming language code, then one or more action may be performed at 1708 by executing the custom computer programming language code.

In some implementations, as described in greater detail below, one or more actions performed may include a determination of whether a further feed item should be modified. The determination may include a determination of whether a further feed item of the information feed is related to the feed item identified at block 1702 based on a relevance measure. The relevance measure may be based on one or more operations to determine whether there is a relationship among one or more feed items of an information feed. For example, the relevance measure may be based on whether content type of the further feed item is the same as the content type of the feed item identified at block 1502. If the content type is the same, then the further feed item is identified as a related feed item. As such, the one or more actions defined by the custom rule are executed to modify information of the feed item identified at block 1702 and to modify information of the further feed item. In another example, the relevance measure may be based on whether an entity that indicated a preference for the feed item at block 1702 also follows a further feed item in the information feed. If the entity follows the further feed item, then the further feed item is identified as a related feed item and is selected and modified as defined by the custom rule.

Figure 18:
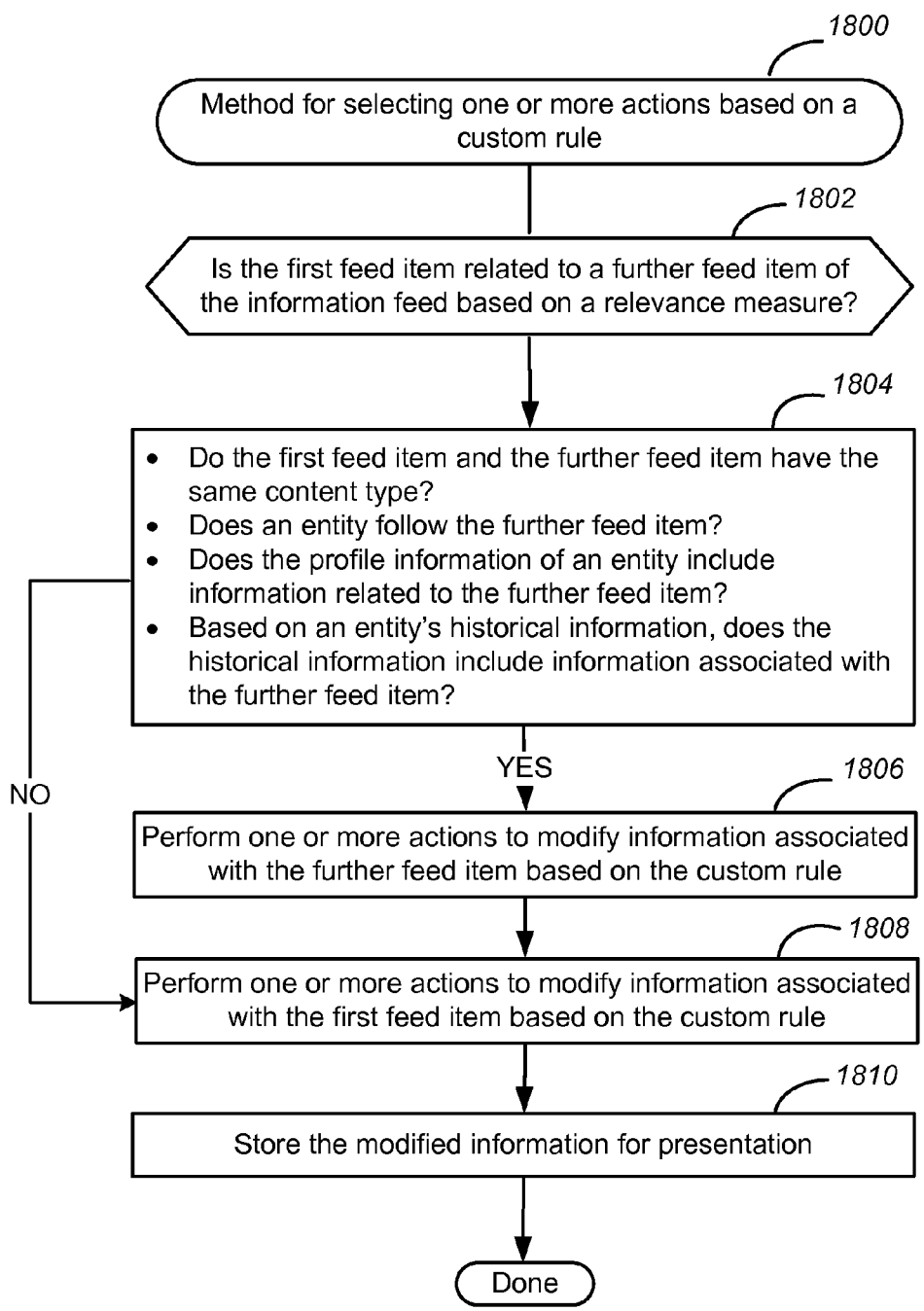
FIG. 18 shows a flow diagram of an example method of 1800 for selecting one or more actions based on the custom rule.

FIG. 18 shows a flow diagram of an example method of 1800 for selecting one or more actions based on the custom rule. In some implementations, the method 1800 may be used to select actions configured as discussed with respect to a custom rule configuration method 1500 shown in FIG. 15. In some implementations, the method of 1800 may be performed by one or more servers or computing device described herein.

At 1802, a determination is made whether a further feed item of an information feed is related to a feed item associated with the preference indication (i.e., a first feed item) received at block 1702 discussed in method 1700 based on a relevance measure. In some implementations, a relevance measure may be the result of one or more operations that may be applied to determine whether a first feed item and a further feed item are related.

In some implementations, at block 1804, one or more operations may be used to determine a relationship between one or more feed items. For example, if a first feed item and a further feed item have the same content type, then the first feed item and the further feed item are determined to be related. As such, one or more actions are executed to modify information associated with the first and further feed item as specified by a custom rule. For instance, referring back to FIG. 21, when John Smith, a music critic, selects the two thumbs up display component 2102, the MusicLike rule is activated. The MusicLike rule may be configured to search for feed items that are related to information update 2104 by comparing the content of the information update 2104 to other feed items in the information feed. In this scenario, the rule may execute operations to query a database for other feed items that include songs from the Michael Jackson's Thriller album. If a feed item includes a song from the album, then the information associated with the feed item is updated to indicate that John Smith also endorses the song from the album.

FIG. 22 shows an example GUI displaying an information feed, according to some implementations. FIG. 22 shows an information feed after John Smith endorses the Michael Jackson's Thriller album 2200 in FIG. 22. In this example, the information update 2200 is updated to indicate that John Smith endorses Michael Jackson's Thriller album. Here, the number of critics 2204 that gave the album two thumbs up is increased from 300,000 to 300,001 to reflect that John Smith also endorses the music album. Additionally, John Smith's endorsement is automatically associated with information updates 2206 and 2208 that include songs Billie Jean and Beat It. Information update 2206 and 2208 are updated to indicate 2210 and 2212 that John Smith also endorses the songs from the album.

In another example, one or more feed items may be determined to be related by analyzing data attached to, identified, or otherwise associated with a feed item, such as documents, images, audio files, video files, and other files to determine that feed items have the same content type.

In some implementations, determining whether one or more feed items are related may be based on information independent of the content included in a feed item. For example, the relevance measure may be based on information of the user that indicated a preference for a first feed item. For instance, a relevance measure may be based on whether a user follows a further feed item. If the user follows a further feed item, then the custom rule may include instructions to automatically update information associated with the further feed item to indicate that the user also endorses the further feed item. In some instances, a relevance measure may be based on whether a user's profile information includes information about the further feed item. For example, a user's status information may state "I love starbucks coffee!" Then, a custom rule may include instructions to automatically endorse all feed items including information about Starbucks® coffee on the user's behalf.

In other instances, the relevance measure may include an operation to determine whether a further feed item is related based an entity's historical information. For instance, one or more servers may store information of recent search activity of a user. The recent search activity may reveal that the user was searching specific feed items including specific content or feed items authored by a specific user, group or record. As such, the specific feed items may be identified as a relevant feed item and information associated with the specific feed item may be modified based on a custom rule. For instance, the information associated with the specific feed item may be updated to indicate that the user "likes" the specific feed item. In this example, a time frame may be defined to analyze a certain amount of historical information associated with a user's search. For instance, the time frame may be specified as searches performed in the past hour, past day, past week, past month, or past year. Additionally, a feed item may be identified as relevant based on the frequency a feed item is searched for by a user. For instance, if a user, Brenda, has performed several searches for information updates posted by basketball player, Jeremy Lin, then the frequency of searches may trigger the activation of a custom rule. The frequency of searches may be an indication that the Brenda "likes" Jeremy Lin. As such, the custom rule may be configured to automatically update all information updates posted by Jeremy Lin to indicate that Brenda "likes" Jeremy Lin's posts.

In some implementations, numerical weights can be applied to any one or more of the various operations, based on importance of the particular operation in the implementation. The weighting information may be used to indicate a degree of relatedness between one or more feed items. For example, weighted values can be summed to determine whether the weighted sum meets, exceeds, or is less than a designated threshold value. If a feed item meets the threshold value, then the feed item may be identified as a related feed item and information associated with related feed item may be modified in accordance with a custom rule. Otherwise, the feed item may not be identified as related feed item.

In some implementations, various GUIs can be constructed and made available to users to personalize and customize the relevance measures to determine whether one or more feed items are related. For example, a system administrator or other user can personally select the one or more operations to apply and thus define parameters to determine a relevance measure or other association between a first recipient and an entity. In one example, a pre-defined set of operations exists, and a user selects one or more of the pre-defined set. For instance, in FIG. 19, a user may use the action interface 1926 to select the pre-defined set of operations "Related." In other examples, a user inputs and customizes the user's own operations. In one implementation, a user interface provides graphical slide bars to set weights applied to the selected operations. A list of operations can be presented in a GUI with a check box beside each operation for the user to select. The user can then select whether the user wants to apply weights and, if so, a pane with the slide bar mentioned above appears. In some instances, a user has a custom box in which the user defines his or her own operations. Such interfaces can be operated by the author of a post, system administrator, or other user.

If it is determined that one or more feed items are related at blocks 1802 and 1804, then method 1800 proceeds to block 1806. Otherwise, method 1800 proceeds to block 1808.

At 1806, one or more actions to modify information associated with the further feed item based on the custom rule is performed. In some implementations, the operations to modify a further feed item may be similar to executing the one or more actions as described above with respect to block 1708 of method 1700.

At 1808, one or more actions to modify information associated with first feed item based on the custom rule is performed as described above with respect to block 1708 of method 1700.

At 1810, the modified information is stored for presentation. In some implementations, the modified information is stored on a storage medium or a storage device for presentation in an information feed. For instance, the modified information may be stored in a database, such as a multitenant database accessible to a plurality of tenants.

In some implementations, rather than storing the modified information for presentation at block 1810, the modified information may be immediately communicated and displayed on a client device.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects.

While the disclosed examples are often described herein with reference to an implementation in which an on-demand database service environment is implemented in a system having an application server providing a front end for an on-demand database service capable of supporting multiple tenants, the present implementations are not limited to multi-tenant databases nor deployment on application servers. Implementations may be practiced using other database architectures, i.e., ORACLE®, DB2® by IBM and the like without departing from the scope of the implementations claimed.

It should be understood that some of the disclosed implementations can be embodied in the form of control logic using hardware and/or using computer software in a modular or integrated manner. Other ways and/or methods are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer-readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer-readable medium may be any combination of such storage or transmission devices. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A method of processing a personal preference indication submitted by a user for a feed item of a social network feed established through an associated database system having at least one server, the method comprising:

receiving, at a server of the database system from a computing device associated with the user, a personal preference indication submitted by the user to apply to a first feed item of the social network feed, the personal preference indication indicating that the user feels positive or negative about information indicated by the first feed item, the social network feed being displayable on computing devices of one or more users of the social network;

identifying, using a server of the database system, a characteristic of the first feed item;

identifying, using a server of the database system, one or more further feed items of the social network feed as being related to the first feed item based on the feed item characteristic, the one or more further feed items not being a count of personal preference indications;

determining, using a server of the database system, one or more computing actions operative to modify data contained in or attached to the one or more further feed items of the social network feed based on the first feed item characteristic and on the received personal preference indication; and causing performance of, using a server of the database system, the one or more computing actions to modify the data contained in or attached to the one or more further feed items of the social network feed.

2. The method of claim 1, wherein a custom rule associated with the first feed item defines a custom display component operable to transmit the personal preference indication for the first feed item from the computing device to one or more servers.

3. The method of claim 2, wherein the custom display component is a selectable graphical component capable of being displayed on a display of the computing device.

4. The method of claim 1, further comprising:
selecting, using a server of the database system, the one or more computing actions based on a content type of the first feed item and on status information of the user.

5. The method of claim 4, wherein selecting the one or more computing actions to perform is further based on profile information of the user.

6. The method of claim 1, further comprising:
determining a quantitative value to represent the personal preference indication for the first feed item.

7. The method of claim 6, wherein the quantitative value is weighted based on status information of the user.

8. The method of claim 1, wherein
the feed item characteristic is a relevance measure.

9. The method of claim 1, wherein identifying a further feed item as being related to the first feed item includes one or more of: determining whether a content type of the further feed item is the same as a content type of the first feed item, determining whether the user follows the further feed item, determining whether profile information of the user includes information related to the further feed item, determining whether the user indicated a preference for the further feed item, and determining whether historical information related to the user includes information related to the further feed item.

10. The method recited in claim 1, wherein the database system is part of an on-demand service environment through which a plurality of organizations can access on-demand computing services.

11. The method recited in claim 10, wherein the first feed item and the one or more further feed items are stored in a multi-tenant database accessible to one or more of a plurality of tenants in communication with the on-demand service environment.

12. One or more computing devices comprising:
one or more processors capable of executing instructions configured to cause:
identifying, using a database system, a characteristic of a first feed item of a social network feed, the first feed item having an associated personal preference indication submitted by a user to apply to the first feed item, the personal preference indication indicating that the user feels positive or negative about information indicated by the first feed item, the social network feed being displayable on computing devices of one or more users of the social network;
identifying, using the database system, one or more further feed items of the social network feed as being related to the first feed item based on the feed item characteristic, the one or more further feed items not being a count of personal preference indications;
determining, using the database system, one or more computing actions operative to modify data contained in or attached to the one or more further feed items of the social network feed based on the first feed item characteristic and on the received personal preference indication; and
causing performance of, using the database system, the one or more computing actions to modify the data contained in or attached to the one or more further feed items of the social network feed.

13. The one or more computing devices of claim 12, the one or more processors capable of executing instructions further configured to cause:
selecting, using the database system, the one or more computing actions based on a content type of the first feed item and on status information of the user.

14. The one or more computing devices of claim 12, the one or more processors capable of executing instructions further configured to cause:
determining a quantitative value to represent the personal preference indication for the first feed item.

15. The one or more computing devices of claim 14, wherein the quantitative value is weighted based on status information of the user.

16. The one or more computing devices of claim 14, wherein the quantitative value is determined using a multiplier based on profile information of the user.

17. A system comprising:
database system software stored on a non-transitory data storage medium for execution by at least one server of a database system, the database system software operable to cause:
identifying, using the database system, a characteristic of a first feed item of a social network feed, the first feed item having an associated personal preference indication submitted by a user to apply to the first feed item, the personal preference indication indicating that the user feels positive or negative about information indicated by the first feed item, the social network feed being displayable on computing devices of one or more users of the social network;
identifying, using the database system, one or more further feed items of the social network feed as being related to the first feed item based on the feed item characteristic, the one or more further feed items not being a count of personal preference indications;
determining, using the database system, one or more computing actions operative to modify data contained in or attached to the one or more further feed items of the social network feed based on the first feed item characteristic and on the received personal preference indication; and
causing performance of, using the database system, the one or more computing actions to modify the data contained in or attached to the one or more further feed items of the social network feed.

18. The system of claim 17, the database system software further operable to cause:
selecting, using a server of the database system, the one or more computing actions based on a content type of the first feed item and on status information of the user.

19. The system of claim 17, wherein
the feed item characteristic is a relevance measure.

20. The system of claim 17, wherein identifying a further feed item as being related to the first feed item includes one or more of: determining whether a content type of the further feed item is the same as a content type of the first feed item, determining whether the user follows the further feed item, determining whether profile information of the user includes information related to the further feed item, determining whether the user indicated a preference for the further feed item, and determining whether historical information related to the user includes information related to the further feed item.

* * * * *